(12) United States Patent
Asami

(10) Patent No.: US 9,405,101 B2
(45) Date of Patent: Aug. 2, 2016

(54) IMAGING LENS AND IMAGING APPARATUS

(71) Applicant: FUJIFILM Corporation, Tokyo (JP)

(72) Inventor: Taro Asami, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/579,008

(22) Filed: Dec. 22, 2014

(65) Prior Publication Data

US 2015/0177493 A1 Jun. 25, 2015

(30) Foreign Application Priority Data

Dec. 25, 2013 (JP) ................................. 2013-267018

(51) Int. Cl.
| | | |
|---|---|---|
| *G02B 3/02* | (2006.01) | |
| *G02B 9/62* | (2006.01) | |
| *G02B 13/00* | (2006.01) | |
| G02B 5/00 | (2006.01) | |
| G02B 13/18 | (2006.01) | |
| G02B 13/04 | (2006.01) | |
| G02B 15/177 | (2006.01) | |
| G02B 3/04 | (2006.01) | |

(52) U.S. Cl.
CPC ............. *G02B 13/0045* (2013.01); *G02B 9/62* (2013.01); *G02B 3/04* (2013.01); *G02B 5/005* (2013.01); *G02B 13/002* (2013.01); *G02B 13/0015* (2013.01); *G02B 13/04* (2013.01); *G02B 13/18* (2013.01); *G02B 15/177* (2013.01)

(58) Field of Classification Search
CPC ...... G02B 13/0045; G02B 9/62; G02B 13/18; G02B 13/04; G02B 13/0015; G02B 3/04; G02B 13/002; G02B 5/005; G02B 15/177

USPC .................. 359/713, 740, 749, 752, 756, 761
See application file for complete search history.

(56) References Cited

U.S. PATENT DOCUMENTS

| | | |
|---|---|---|
| 2009/0219630 A1 | 9/2009 | Yamamoto |
| 2013/0265656 A1 | 10/2013 | Asami |
| 2015/0131169 A1* | 5/2015 | Asami ................ G02B 13/0045 359/713 |

FOREIGN PATENT DOCUMENTS

| | | |
|---|---|---|
| JP | 2009-204997 | 9/2009 |
| WO | WO2012/086199 | 6/2012 |

* cited by examiner

*Primary Examiner* — Evelyn A Lester
(74) *Attorney, Agent, or Firm* — Young & Thompson

(57) ABSTRACT

An imaging lens substantially consists of six lenses, composed of a negative first lens, a positive second lens, a negative third lens, a positive fourth lens, a positive fifth lens, and a negative sixth lens, disposed in order from the object side, and satisfies, when the distance between the first lens and the second lens is taken as Db12, the center thickness of the second lens is taken as D3, the focal length of the second lens is taken as f2, the focal length of the entire system is taken as f, the paraxial radius of curvature of the object side surface of the first lens is taken as R1f, and the paraxial radius of curvature of the image side surface of the first lens is taken as R1r, conditional expressions given below:

$1.0 < (Db12 + D3)/f$      (1)

$f2/f < 1.68$      (2)

$1.1 < (R1f + R1r)/(R1f - R1r) < 2.2$      (3-3).

19 Claims, 23 Drawing Sheets

EXAMPLE 1

EXAMPLE 2

EXAMPLE 3

EXAMPLE 4

EXAMPLE 5

EXAMPLE 10

EXAMPLE 11

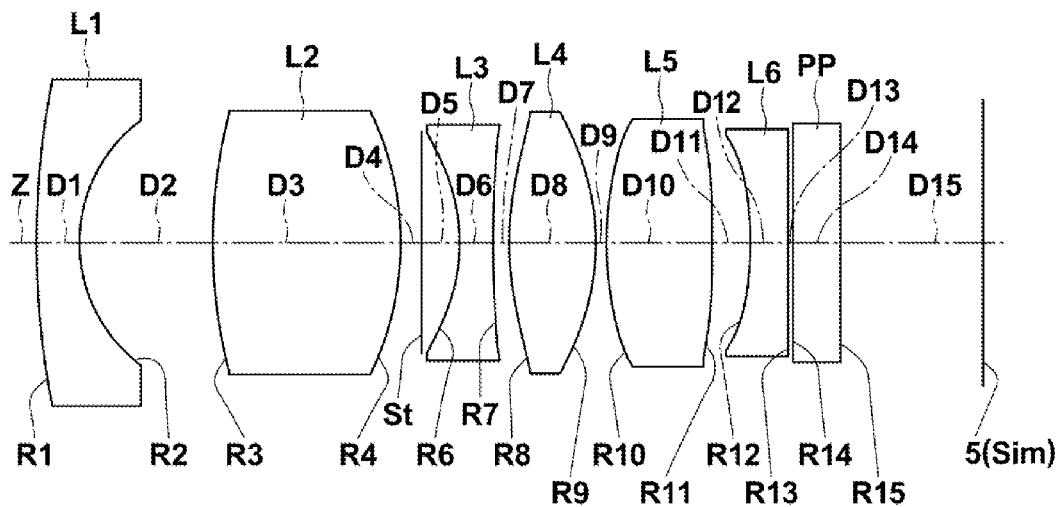
FIG.15 EXAMPLE 14
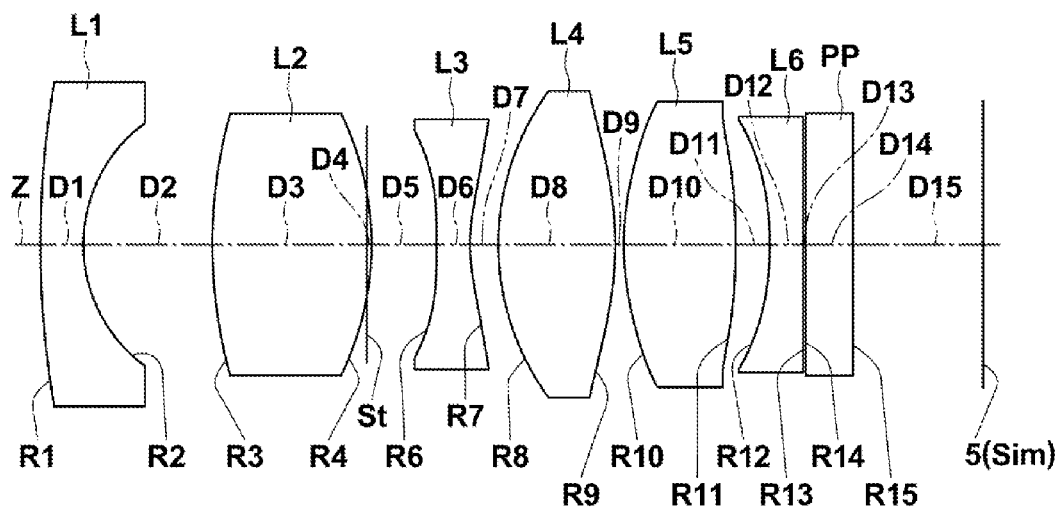
FIG.16 EXAMPLE 15

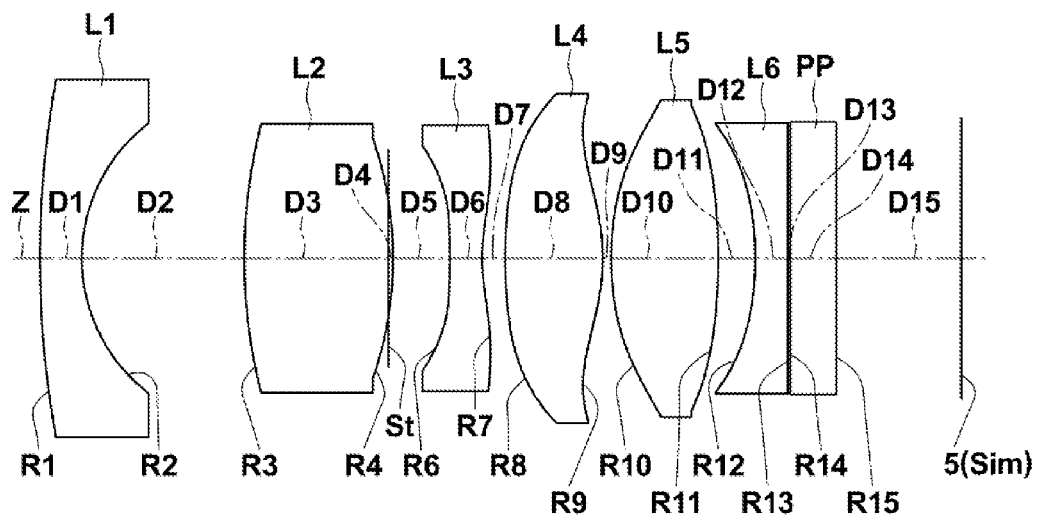
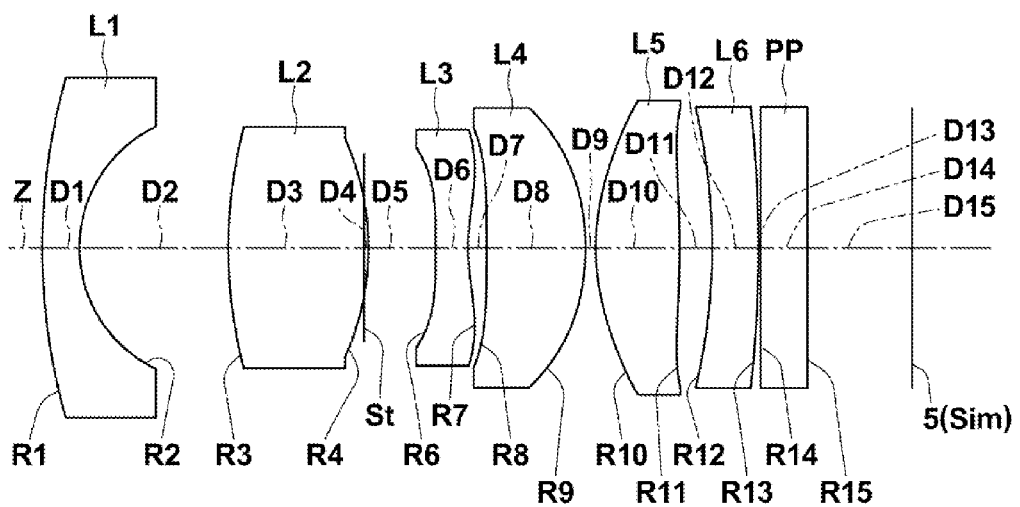

EXAMPLE 22

EXAMPLE 1

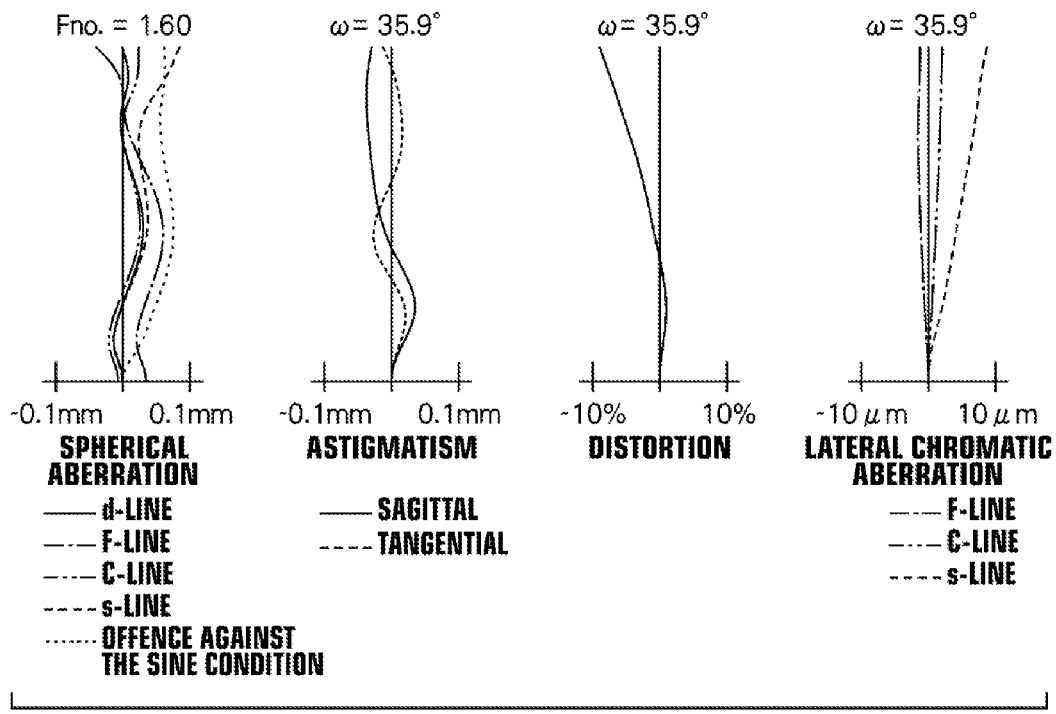
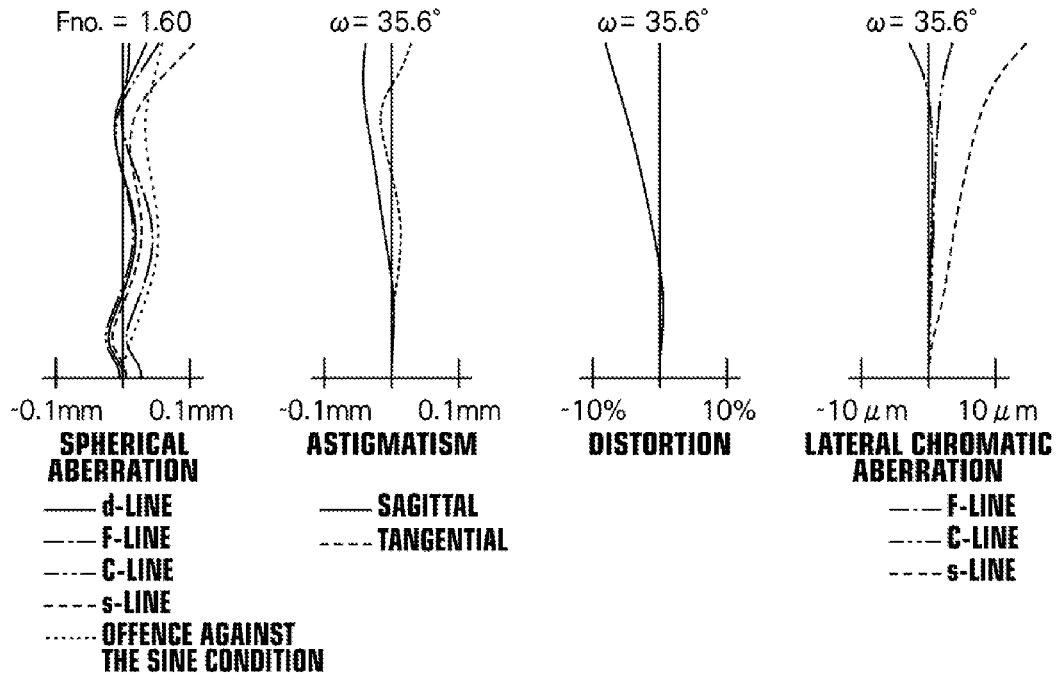

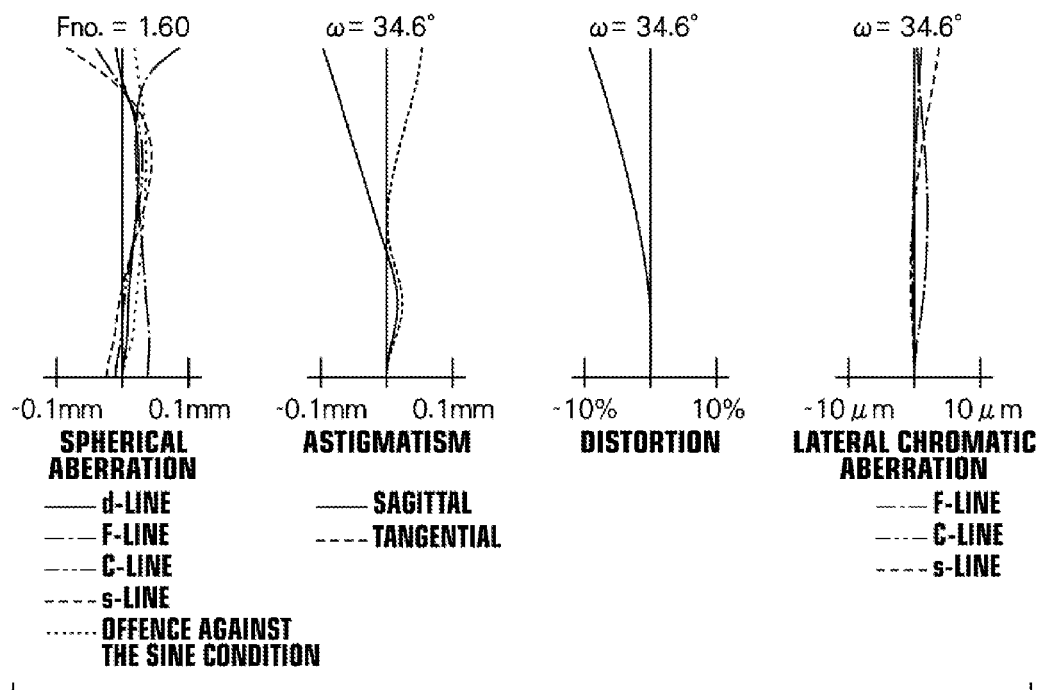
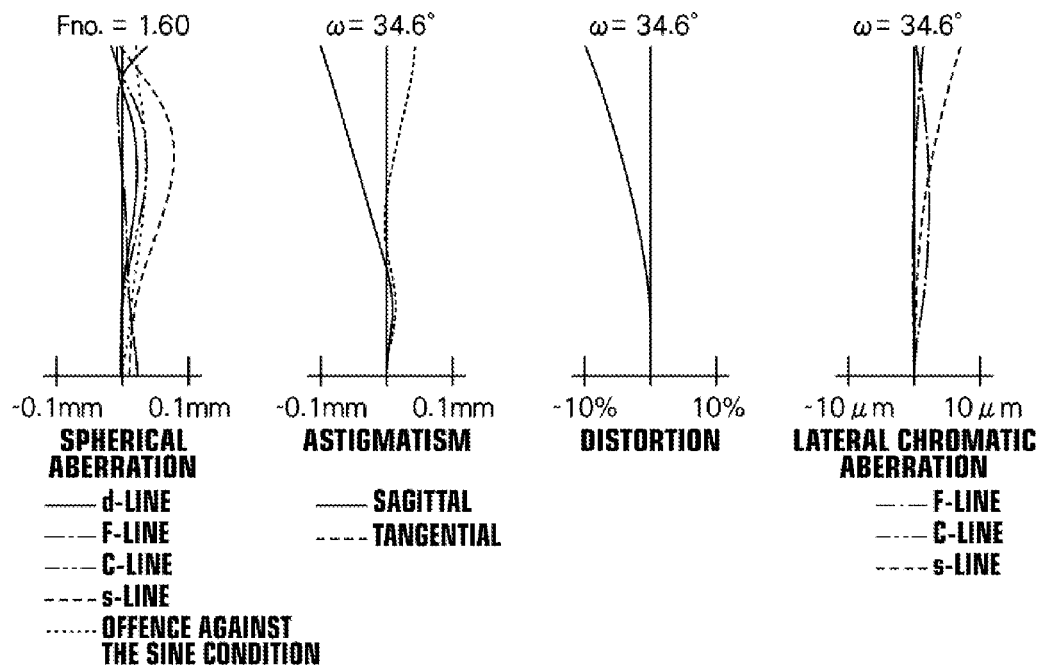

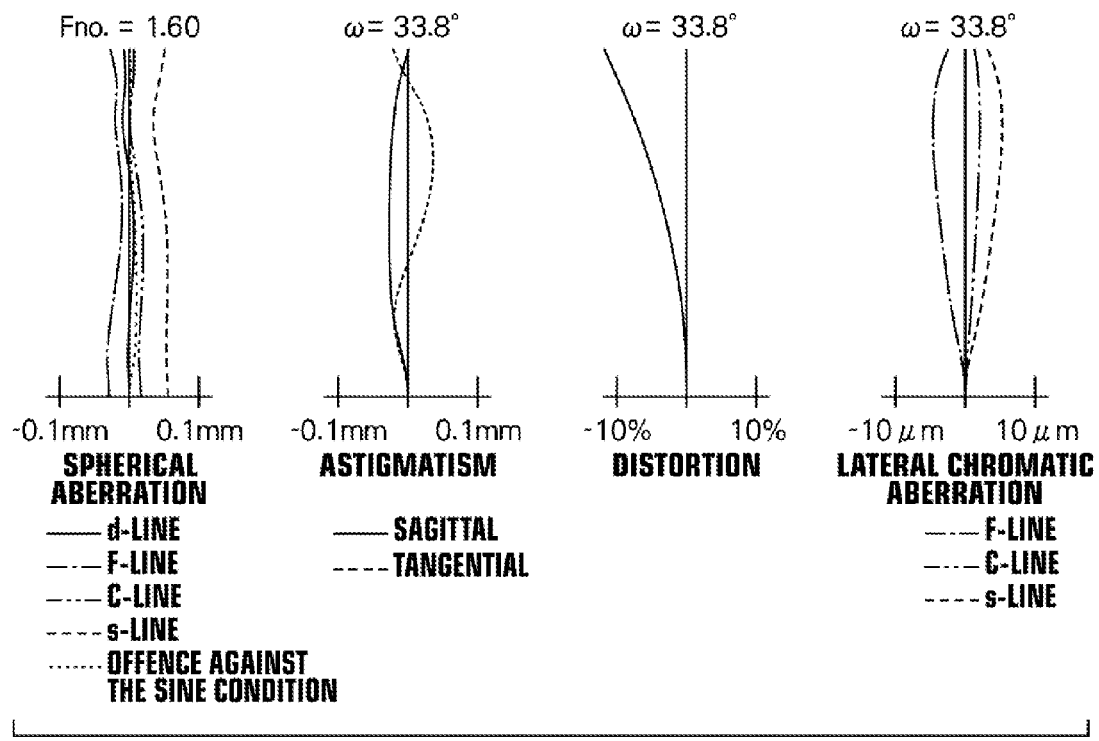
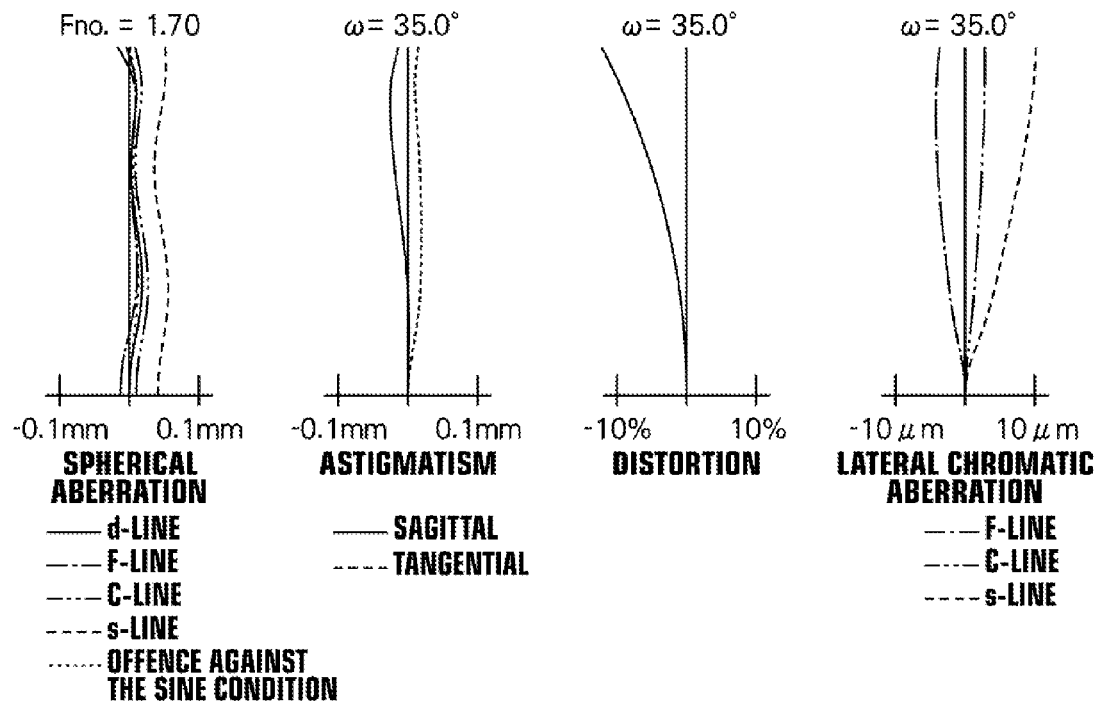

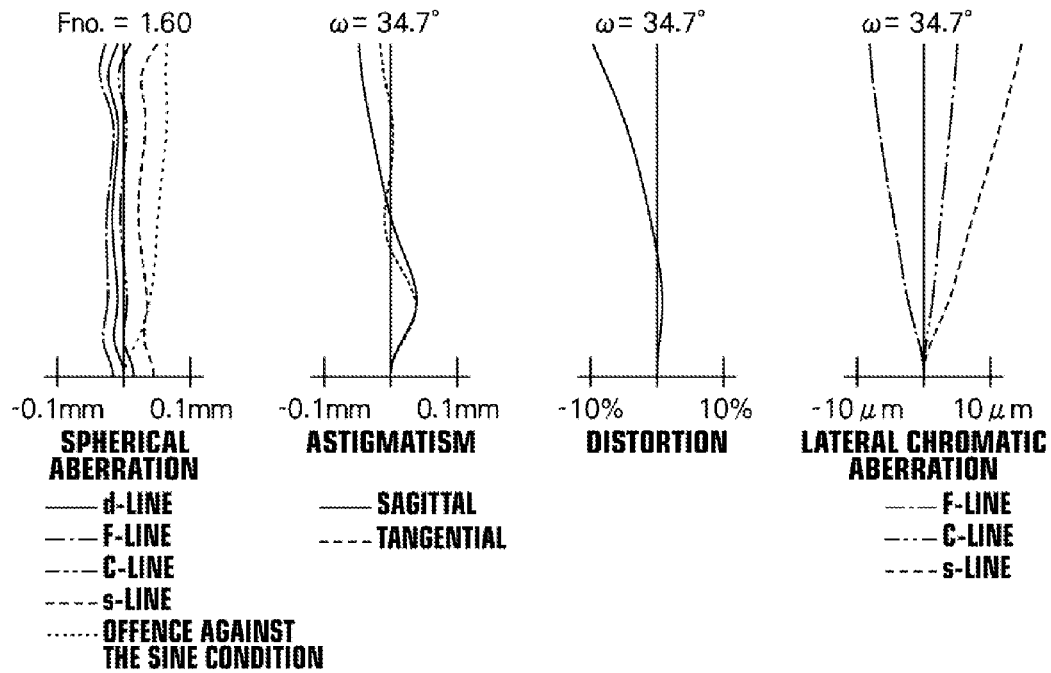
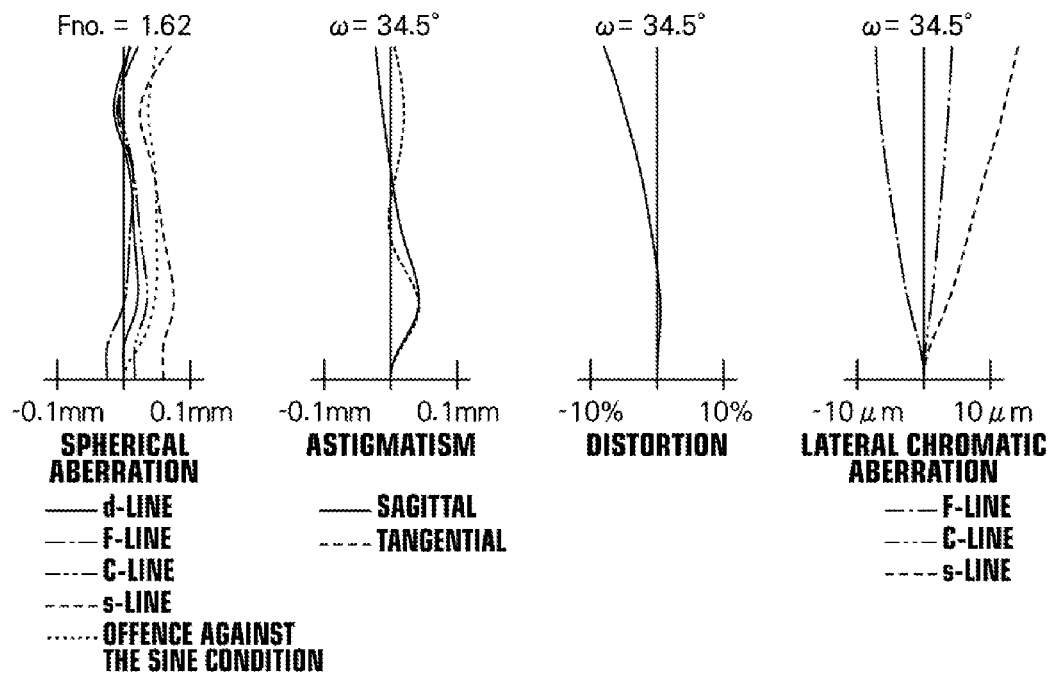

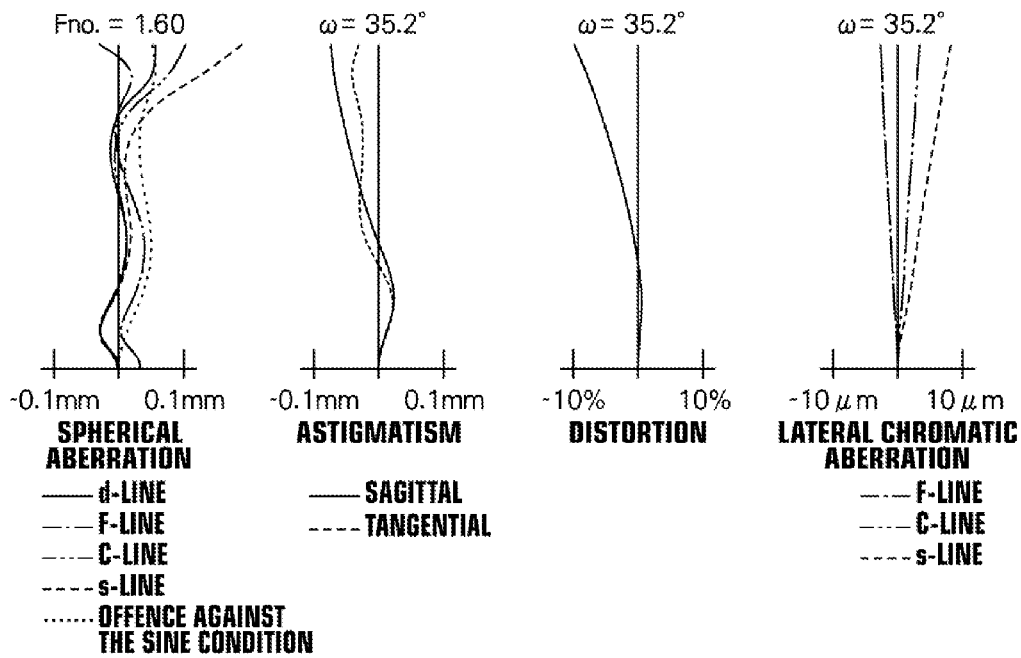
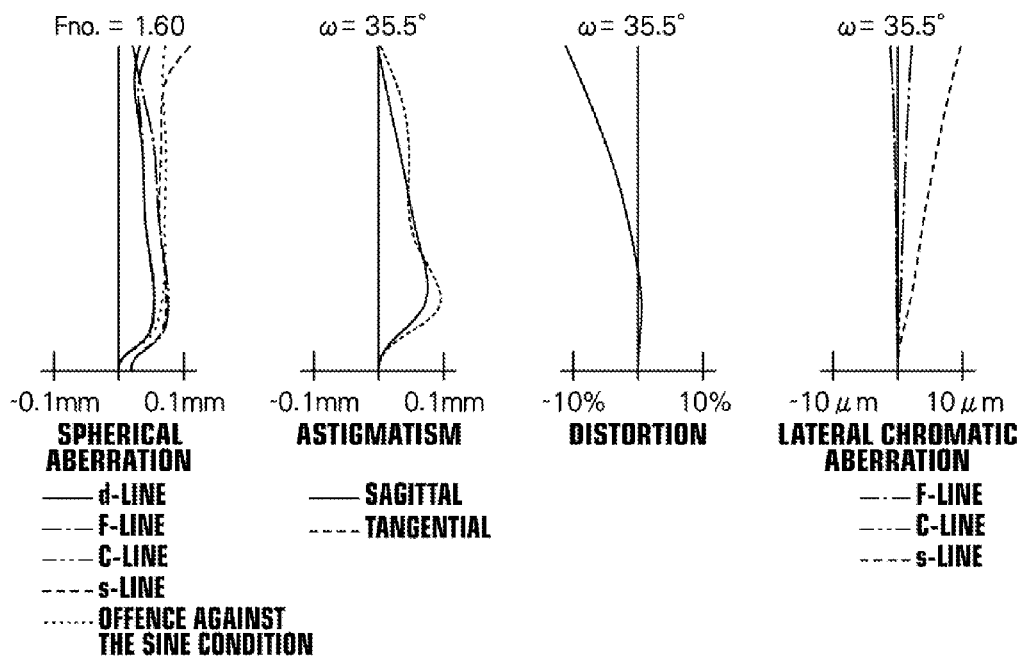

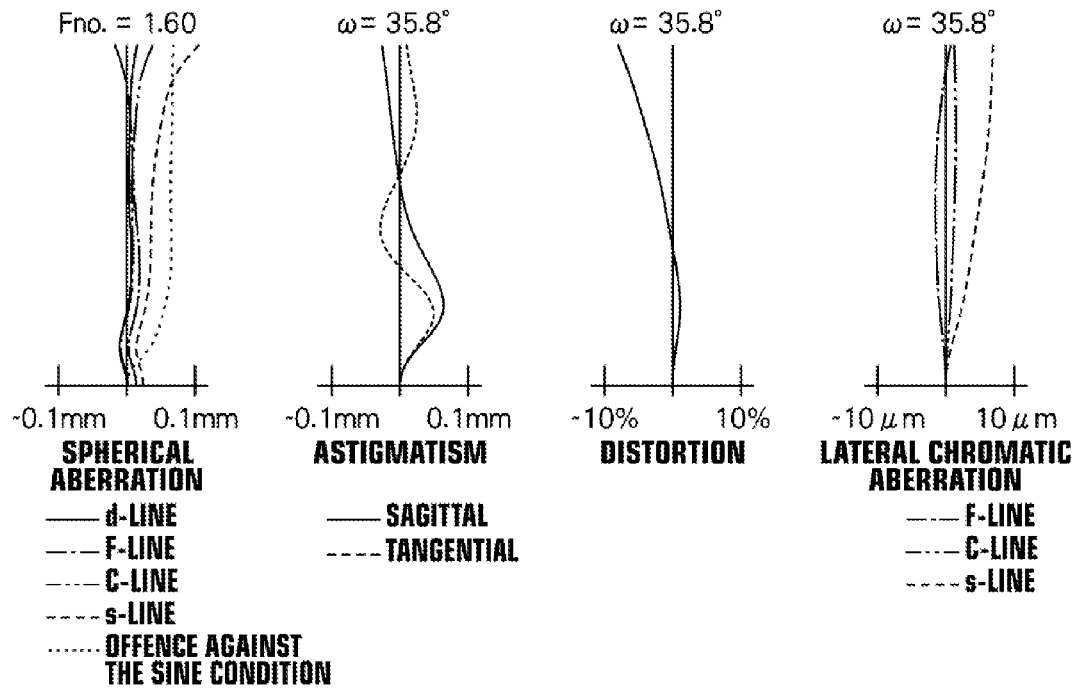
FIG.35 EXAMPLE 12
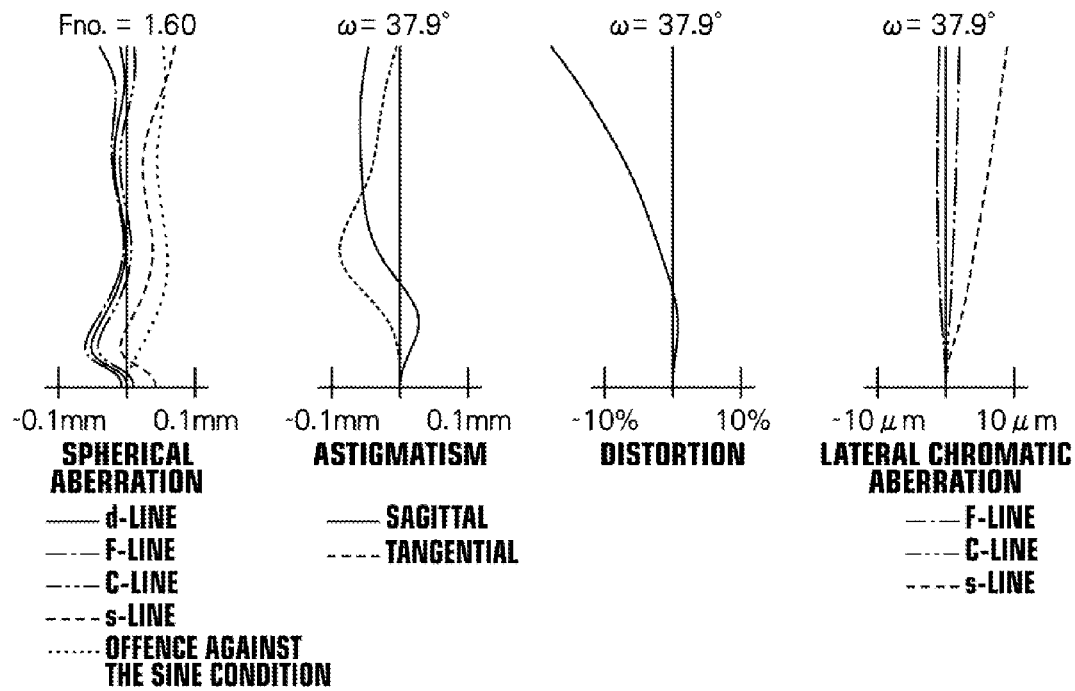
FIG.36 EXAMPLE 13

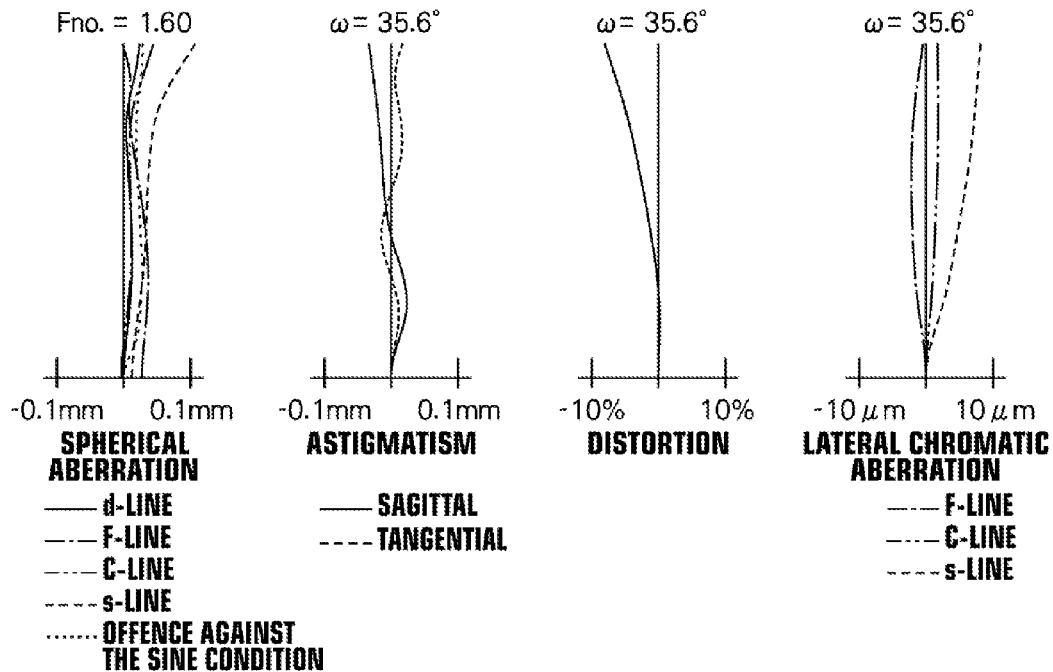
FIG.37 EXAMPLE 14
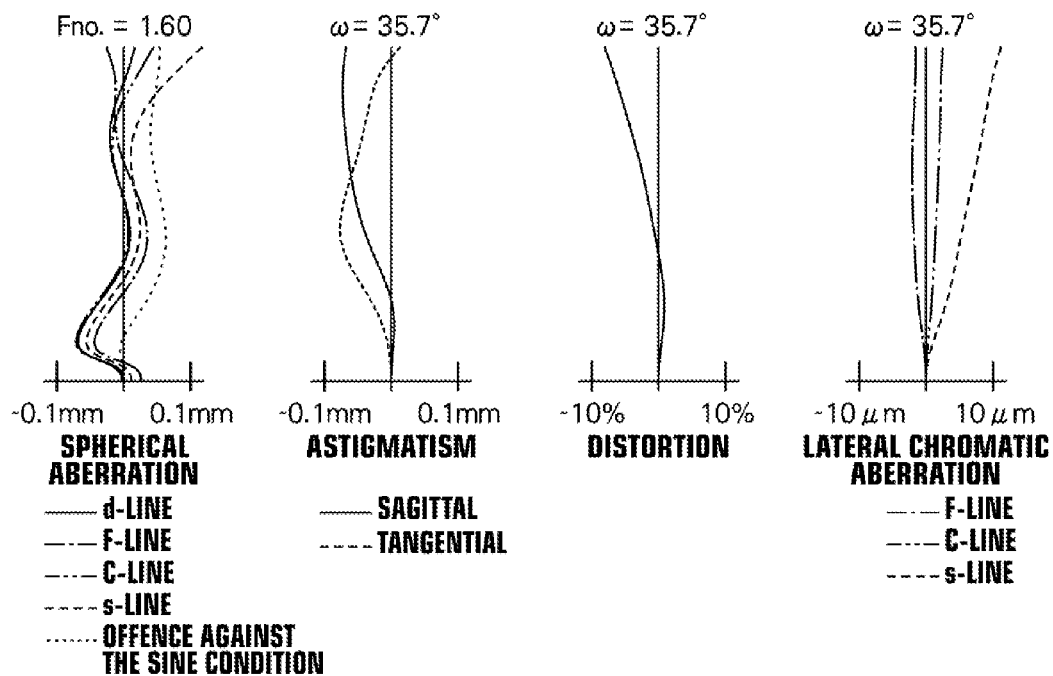
FIG.38 EXAMPLE 15

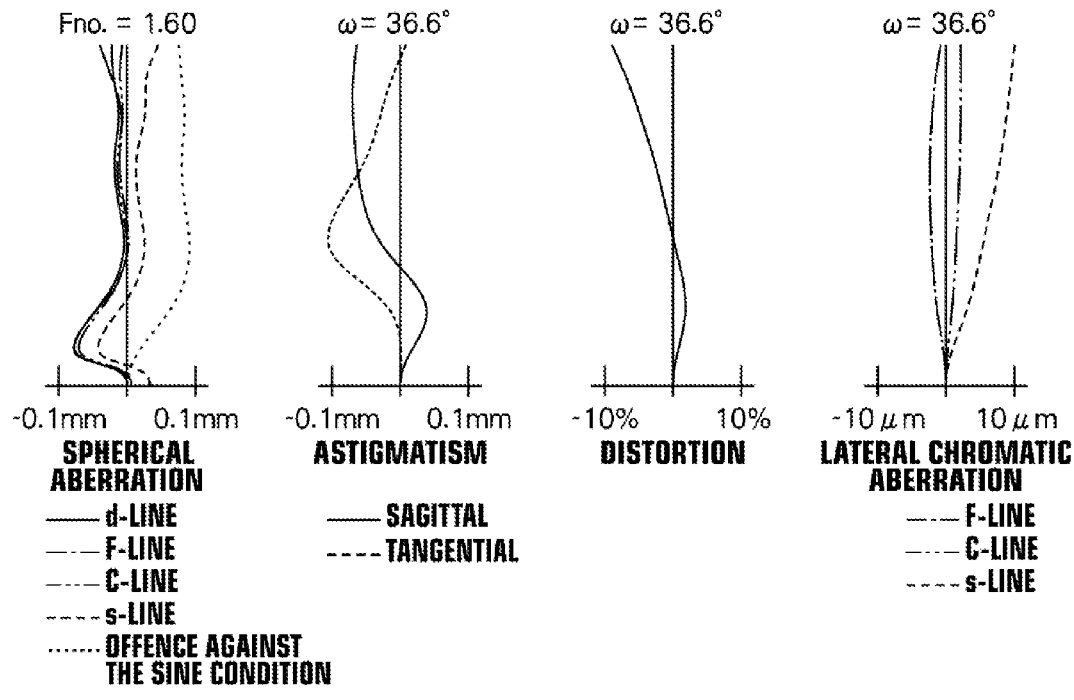
FIG.39 EXAMPLE 16
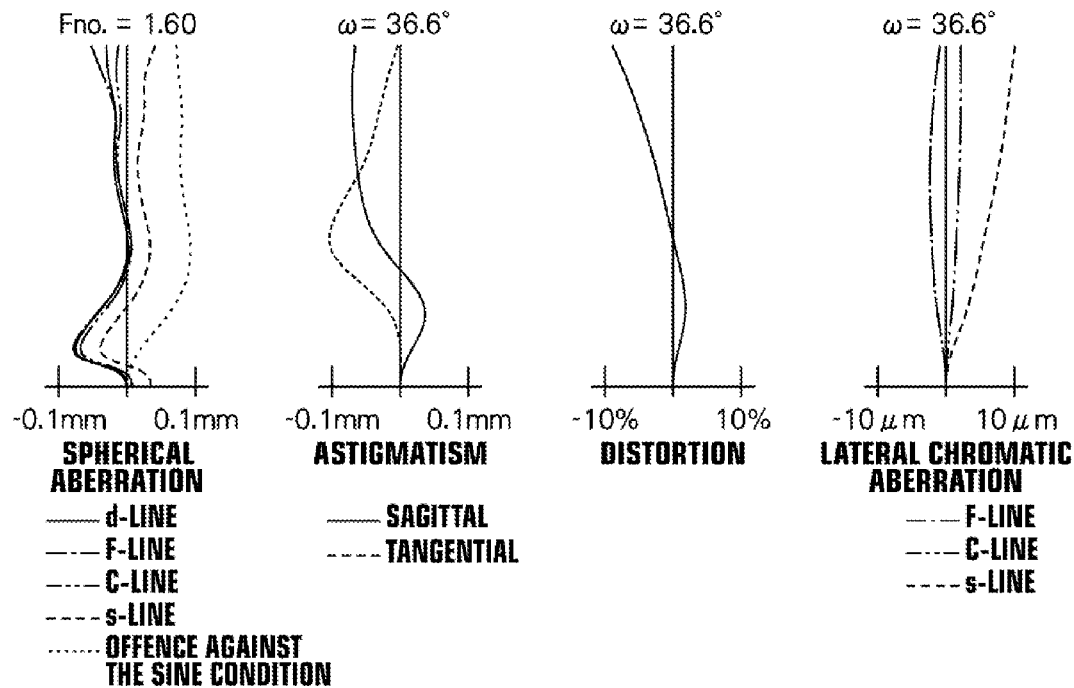
FIG.40 EXAMPLE 17

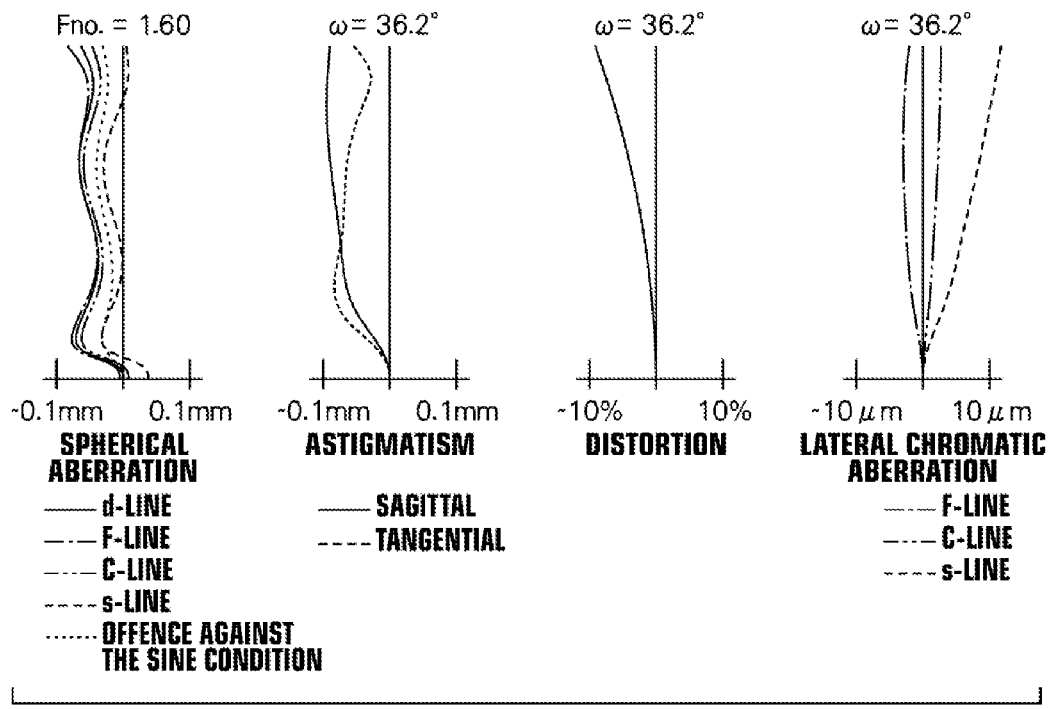
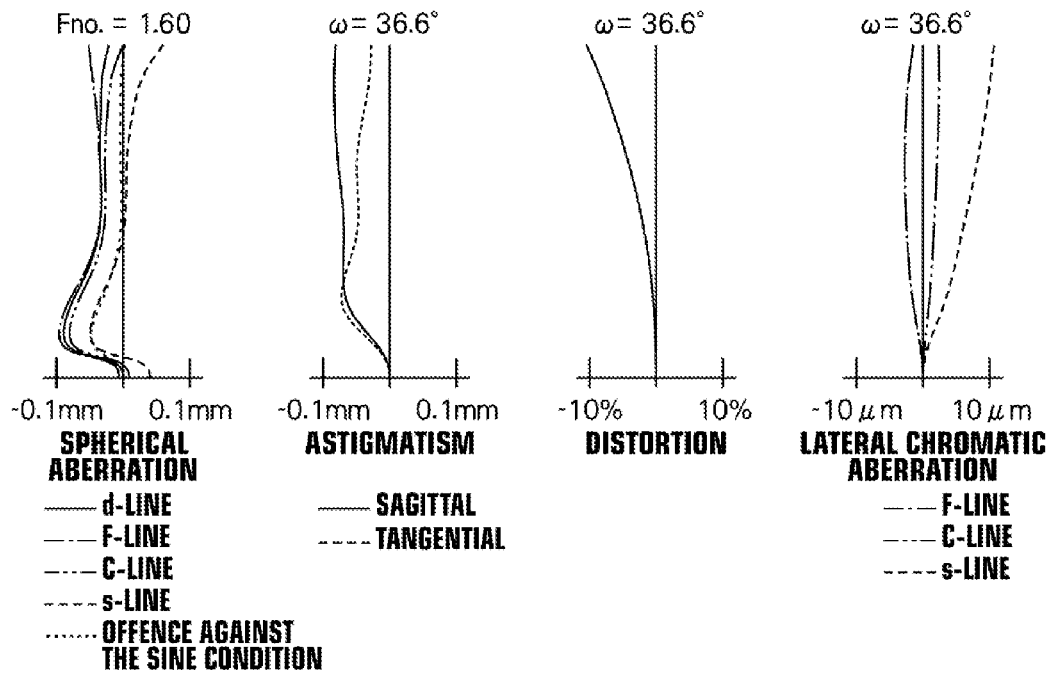

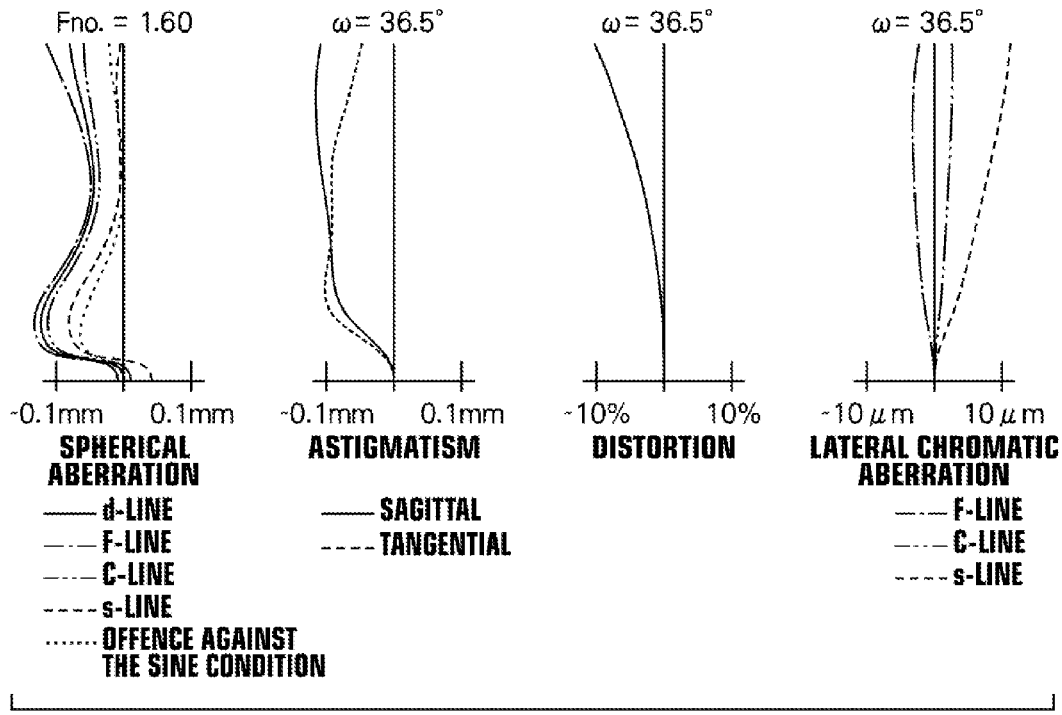
FIG.43 EXAMPLE 20
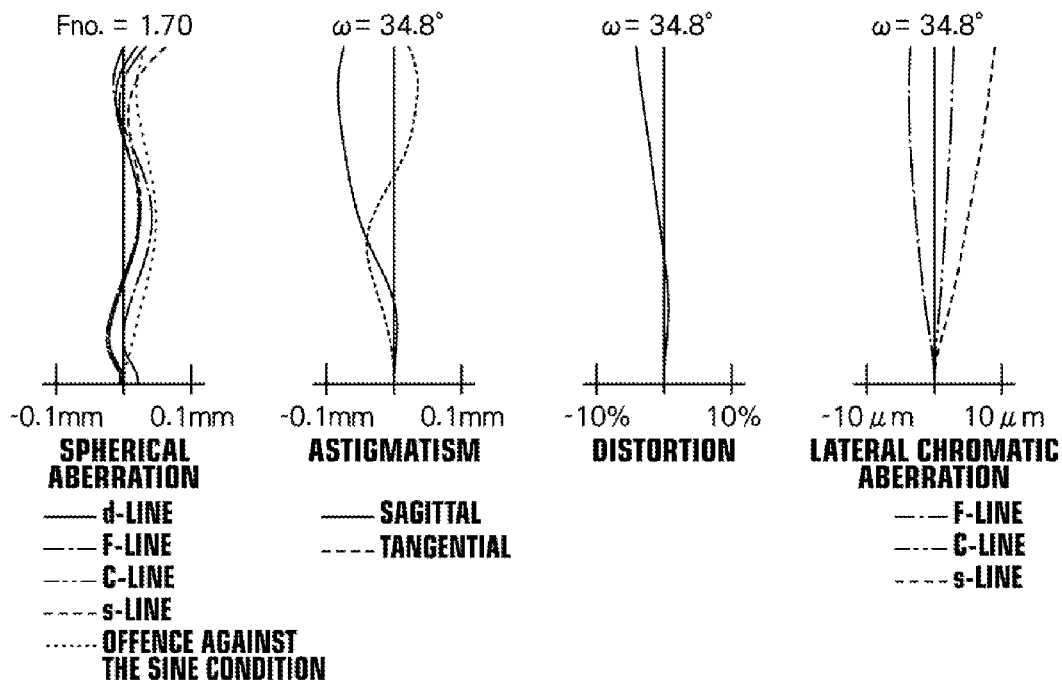
FIG.44 EXAMPLE 21

IMAGING LENS AND IMAGING APPARATUS

CROSS-REFERENCE TO RELATED APPLICATIONS

The present application claims priority under 35 U.S.C. §119 to Japanese Patent Application No. 2013-267018 filed on Dec. 25, 2013, the content of which is hereby expressly incorporated herein by reference in its entirety.

BACKGROUND OF THE INVENTION

1. Field of the Invention

The present invention relates to an imaging lens and an imaging apparatus, and more specifically to an imaging lens that can be favorably used in, for example, vehicle cameras, portable terminal cameras, and surveillance cameras that use a CCD (Charge Coupled Device), a CMOS (Complementary Metal Oxide Semiconductor), and the like, and an imaging apparatus equipped with the imaging lens.

2. Description of the Related Art

Recently, the downsizing and the trend towards high pixel count in image sensors such as, for example, a CCD and a CMOS have been advancing rapidly. Along with this, the downsizing of the bodies of imaging devices and systems is also in progress. As such, imaging lenses mounted on these devices and systems are also demanded to be downsized, in addition to satisfactory optical performance. In the meantime, inexpensive configurations, wide angles, and high performance are demanded for the applications of vehicle cameras and surveillance cameras, along with the downsizing.

As an imaging lens used in vehicle cameras, International Patent Publication No. WO2012/086199 describes a six-element lens system, composed of a negative lens, a positive lens, a negative lens, a positive lens, a positive lens, and a negative lens disposed in order from the object side. Japanese Unexamined Patent Publication No. 2009-204997 describes a six-element image reading lens having a refractive power (hereinafter, also referred to as "power") arrangement identical to that described above.

SUMMARY OF THE INVENTION

In the meantime, the requirements for imaging lenses used in vehicle cameras, surveillance cameras, and the like are getting severe year after year, and it is demanded that further improvement in performance be realized, while having a compact and wide angle configuration.

In view of the circumstances described above, it is an object of the present invention to provide a small and wide angle imaging lens capable of further enhancing the performance, and an imaging apparatus equipped with the imaging lens.

A first imaging lens of the present invention substantially consists of six lenses, composed of a first lens having a negative refractive power, a second lens having a positive refractive power, a third lens having a negative refractive power, a fourth lens having a positive refractive power, a fifth lens having a positive refractive power, and a sixth lens having a negative refractive power, disposed in order from the object side, wherein the imaging lens satisfies conditional expressions given below:

$$1.0 < (Db12+D3)/f \tag{1}$$

$$f2/f < 1.68 \tag{2}$$

$$1.1 < (R1f+R1r)/(R1f-R1r) < 2.2 \tag{3-3}$$

where
- Db12: air space on the optical axis between the first lens and the second lens
- D3: center thickness of the second lens
- f2: focal length of the second lens
- f: focal length of the entire system
- R1f: paraxial radius of curvature of the object side surface of the first lens
- R1r: paraxial radius of curvature of the image side surface of the first lens A second imaging lens of the present invention substantially consists of six lenses, composed of a first lens having a negative refractive power, a second lens having a positive refractive power, a third lens having a negative refractive power, a fourth lens having a positive refractive power, a fifth lens having a positive refractive power, and a sixth lens having a negative refractive power, disposed in order from the object side, wherein the imaging lens satisfies conditional expressions given below:

$$1.1 < (R1f+R1r)/(R1f-R1r) < 2.0 \tag{3-4}$$

$$1.6 < f3456/f \tag{4}$$

$$0.0 < f4/f < 2.45 \tag{5}$$

$$vd6 < 30 \tag{6}$$

where
- R1f: paraxial radius of curvature of the object side surface of the first lens
- R1r: paraxial radius of curvature of the image side surface of the first lens
- f4: focal length of the fourth lens
- f3456: combined focal length of the third lens to the sixth lens
- f: focal length of the entire system
- vd6: Abbe number of the material of the sixth lens with respect to the d-line A third imaging lens of the present invention substantially consists of six lenses, composed of a first lens having a negative refractive power, a second lens having a positive refractive power, a third lens having a negative refractive power, a fourth lens having a positive refractive power, a fifth lens having a positive refractive power, and a sixth lens having a negative refractive power, disposed in order from the object side, wherein the imaging lens satisfies conditional expressions given below:

$$0.38 < Db12/f \tag{7}$$

$$f12/f < 2.5 \tag{8}$$

$$f5/f < 5.0 \tag{9}$$

$$vd6 < 30 \tag{6}$$

where
- Db12: air space on the optical axis between the first lens and the second lens
- f: focal length of the entire system
- f5: focal length of the fifth lens
- f12: combined focal length of the first lens and the second lens
- vd6: Abbe number of the material of the sixth lens with respect to the d-line A fourth imaging lens of the present invention substantially consists of six lenses, composed of a first lens having a negative refractive power, a second lens having a positive refractive power, a third lens having a negative refractive power, a fourth lens having a positive refractive power, a fifth lens having a positive refractive power, and a sixth lens having a negative refractive power, disposed in order from the object side, wherein the imaging lens satisfies conditional expressions given below:

$$-0.15 < (R2f+R2r)/(R2f-R2r) \quad (10)$$

$$-2.5 < (R5f+R5r)/(R5f-R5r) < -0.25 \quad (11)$$

$$-4.0 < (R6f+R6r)/(R6f-R6r) \quad (12)$$

where
- R2f: paraxial radius of curvature of the object side surface of the second lens
- R2r: paraxial radius of curvature of the image side surface of the second lens
- R5f: paraxial radius of curvature of the object side surface of the fifth lens
- R5r: paraxial radius of curvature of the image side surface of the fifth lens
- R6f: paraxial radius of curvature of the object side surface of the sixth lens
- R6r: paraxial radius of curvature of the image side surface of the sixth lens Preferably, the first, the second, the third, and the fourth imaging lenses satisfy conditional expressions (2), (3-4), (5), (7), (8), (10), (11), and (13) to (18) given below. Preferred aspects may include an imaging lens having a configuration of any one or any combination of two or more of the conditional expressions.

$$f2/f < 1.68 \quad (2)$$

$$1.1 < (R1f+R1r)/(R1f-R1r) < 2.0 \quad (3-4)$$

$$0.0 < f4/f < 2.45 \quad (5)$$

$$0.38 < Db12/f \quad (7)$$

$$f12/f < 2.5 \quad (8)$$

$$-0.15 < (R2f+R2r)/(R2f-R2r) \quad (10)$$

$$-2.5 < (R5f+R5r)/(R5f-R5r) < -0.25 \quad (11)$$

$$0.0 < R1f/f \quad (13)$$

$$-3.0 < f1/f < -0.5 \quad (14)$$

$$0.1 < f12/f3456 < 2.0 \quad (15)$$

$$0.2 < (D3+Db23)/f < 3.0 \quad (16)$$

$$-3.0 < f1/f2 < -0.2 \quad (17)$$

$$vd3 < 30 \quad (18)$$

where
- R1f: paraxial radius of curvature of the object side surface of the first lens
- R1r: paraxial radius of curvature of the image side surface of the first lens
- R2f: paraxial radius of curvature of the object side surface of the second lens
- R2r: paraxial radius of curvature of the image side surface of the second lens
- R5f: paraxial radius of curvature of the object side surface of the fifth lens
- R5r: paraxial radius of curvature of the image side surface of the fifth lens
- D3: center thickness of the second lens
- Db12: air space on the optical axis between the first lens and the second lens
- Db23: air space on the optical axis between the second lens and the third lens
- f: focal length of the entire system
- f1: focal length of the first lens
- f2: focal length of the second lens
- f4: focal length of the fourth lens
- f12: combined focal length of the first lens and the second lens
- f3456: combined focal length of the third lens to the sixth lens
- vd3: Abbe number of the material of the third lens with respect to the d-line In the first, the second, the third, and the fourth imaging lenses, the fourth lens is preferably a biconvex lens.

In the present invention, the sign of a refractive power (power) and a concave or convex shape of a surface are considered in the paraxial region if it includes an aspherical surface unless otherwise specifically described. Further, in the present invention, the sign of radius of curvature is positive for a surface shape with a convex surface on the object side and negative for a surface shape with a convex surface on the image side.

The term "substantially" in the context of "substantially consists of six lenses" described above intends to that the imaging lens of the present invention may include a lens having substantially no refractive power, an optical element other than a lens, such as a stop, a cover glass, and the like, a lens flange, a lens barrel, and a mechanical component, for example, a camera shake correction mechanism, in addition to the six lenses.

The imaging apparatus of the present invention is equipped with the imaging lens of the present invention described above.

According to the imaging lens of the present invention, in a six-element lens system, the power arrangement is set appropriately and the lens system is configured to satisfy given conditional expressions. This allows a small and wide angle lens system capable of further enhancing the performance to be realized.

According to the imaging apparatus of the present invention, the apparatus may be constructed small with a wide angle of view and may obtain a high resolution image, as the apparatus is equipped with the imaging lens of the present invention.

BRIEF DESCRIPTION OF THE DRAWINGS

FIG. 15 is a cross-sectional view of an imaging lens of Example 14 of the present invention, illustrating the configuration thereof.

FIG. 16 is a cross-sectional view of an imaging lens of Example 15 of the present invention, illustrating the configuration thereof.

FIG. 21 is a cross-sectional view of an imaging lens of Example 20 of the present invention, illustrating the configuration thereof.

FIG. 22 is a cross-sectional view of an imaging lens of Example 21 of the present invention, illustrating the configuration thereof.

FIG. 25 shows aberration diagrams of the imaging lens of Example 2, in which diagrams of spherical aberration, astigmatism, distortion, and lateral chromatic aberration are arranged from the left in the drawing.

FIG. 26 shows aberration diagrams of the imaging lens of Example 3, in which diagrams of spherical aberration, astigmatism, distortion, and lateral chromatic aberration are arranged from the left in the drawing.

FIG. 27 shows aberration diagrams of the imaging lens of Example 4, in which diagrams of spherical aberration, astigmatism, distortion, and lateral chromatic aberration are arranged from the left in the drawing.

FIG. 28 shows aberration diagrams of the imaging lens of Example 5, in which diagrams of spherical aberration, astigmatism, distortion, and lateral chromatic aberration are arranged from the left in the drawing.

FIG. 29 shows aberration diagrams of the imaging lens of Example 6, in which diagrams of spherical aberration, astigmatism, distortion, and lateral chromatic aberration are arranged from the left in the drawing.

FIG. 30 shows aberration diagrams of the imaging lens of Example 7, in which diagrams of spherical aberration, astigmatism, distortion, and lateral chromatic aberration are arranged from the left in the drawing.

FIG. 31 shows aberration diagrams of the imaging lens of Example 8, in which diagrams of spherical aberration, astigmatism, distortion, and lateral chromatic aberration are arranged from the left in the drawing.

FIG. 32 shows aberration diagrams of the imaging lens of Example 9, in which diagrams of spherical aberration, astigmatism, distortion, and lateral chromatic aberration are arranged from the left in the drawing.

FIG. 33 shows aberration diagrams of the imaging lens of Example 10, in which diagrams of spherical aberration, astigmatism, distortion, and lateral chromatic aberration are arranged from the left in the drawing.

FIG. 34 shows aberration diagrams of the imaging lens of Example 11, in which diagrams of spherical aberration, astigmatism, distortion, and lateral chromatic aberration are arranged from the left in the drawing.

FIG. 35 shows aberration diagrams of the imaging lens of Example 12, in which diagrams of spherical aberration, astigmatism, distortion, and lateral chromatic aberration are arranged from the left in the drawing.

FIG. 36 shows aberration diagrams of the imaging lens of Example 13, in which diagrams of spherical aberration, astigmatism, distortion, and lateral chromatic aberration are arranged from the left in the drawing.

FIG. 37 shows aberration diagrams of the imaging lens of Example 14, in which diagrams of spherical aberration, astigmatism, distortion, and lateral chromatic aberration are arranged from the left in the drawing.

FIG. 38 shows aberration diagrams of the imaging lens of Example 15, in which diagrams of spherical aberration, astigmatism, distortion, and lateral chromatic aberration are arranged from the left in the drawing.

FIG. 39 shows aberration diagrams of the imaging lens of Example 16, in which diagrams of spherical aberration, astigmatism, distortion, and lateral chromatic aberration are arranged from the left in the drawing.

FIG. 40 shows aberration diagrams of the imaging lens of Example 17, in which diagrams of spherical aberration, astigmatism, distortion, and lateral chromatic aberration are arranged from the left in the drawing.

FIG. 41 shows aberration diagrams of the imaging lens of Example 18, in which diagrams of spherical aberration, astigmatism, distortion, and lateral chromatic aberration are arranged from the left in the drawing.

FIG. 42 shows aberration diagrams of the imaging lens of Example 19, in which diagrams of spherical aberration, astigmatism, distortion, and lateral chromatic aberration are arranged from the left in the drawing.

FIG. 43 shows aberration diagrams of the imaging lens of Example 20, in which diagrams of spherical aberration, astigmatism, distortion, and lateral chromatic aberration are arranged from the left in the drawing.

FIG. 44 shows aberration diagrams of the imaging lens of Example 21, in which diagrams of spherical aberration, astigmatism, distortion, and lateral chromatic aberration are arranged from the left in the drawing.

DESCRIPTION OF THE PREFERRED EMBODIMENTS

Hereinafter, embodiments of the present invention will be described in detail with reference to the accompanying drawings.

[Embodiment of Imaging Lens]

Figure 1:
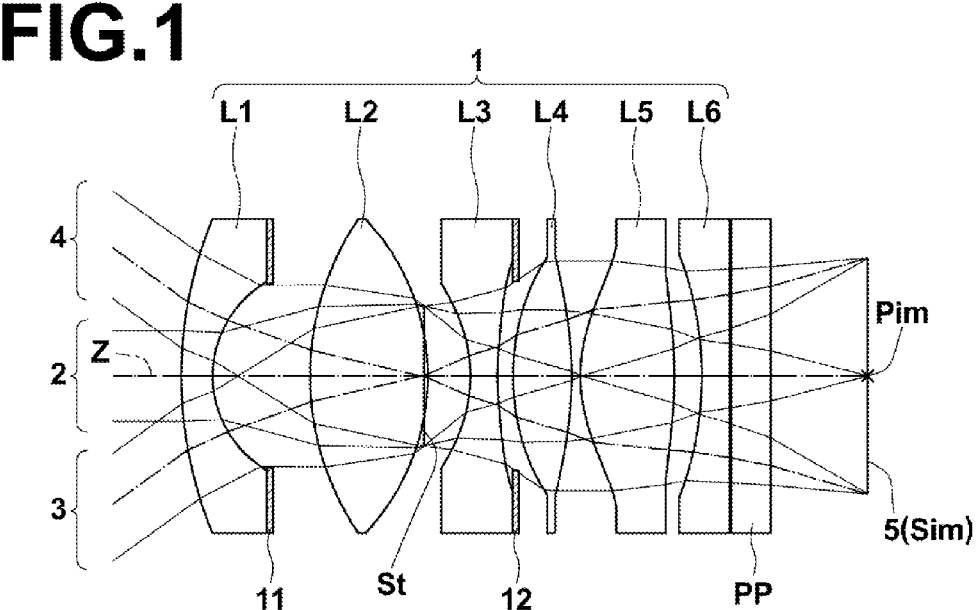
FIG. 1 shows a configuration and optical paths of an imaging lens according to one embodiment of the present invention.
Figure 2:
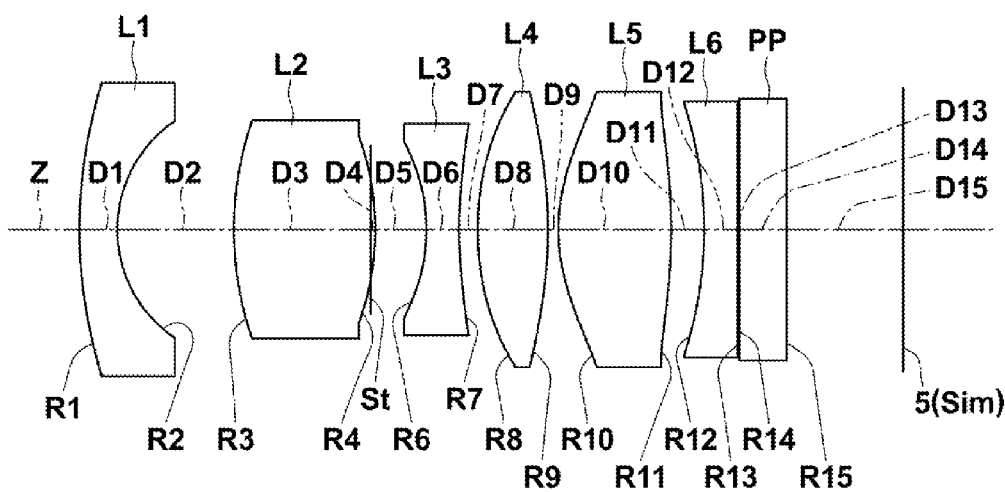
FIG. 2 is a cross-sectional view of an imaging lens of Example 1 of the present invention, illustrating the configuration thereof.
Figure 3:
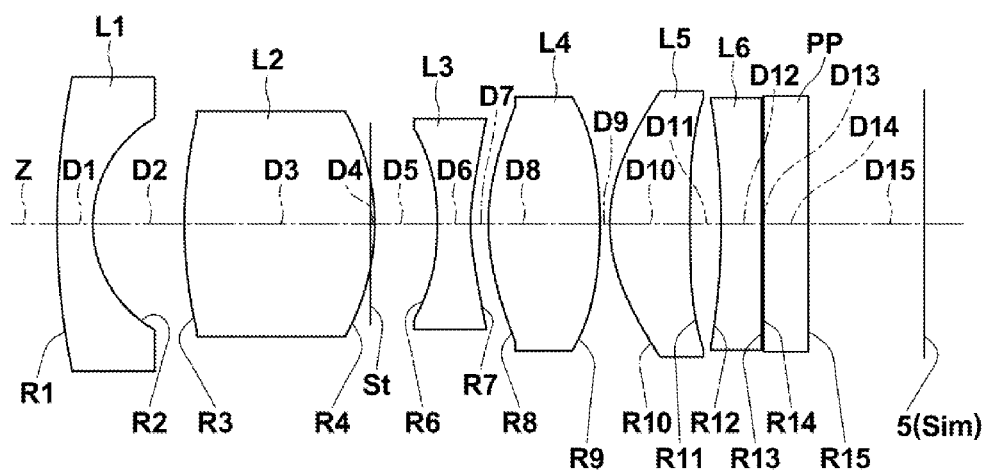
FIG. 3 is a cross-sectional view of an imaging lens of Example 2 of the present invention, illustrating the configuration thereof.
Figure 4:
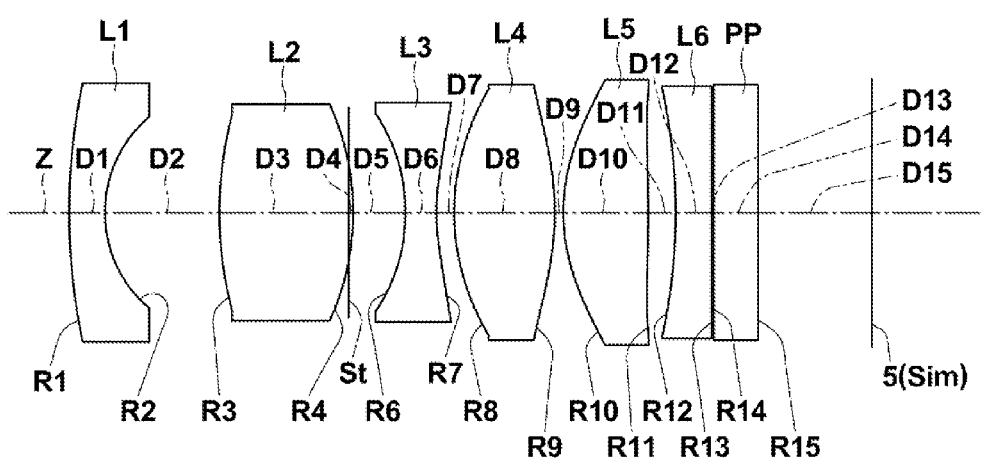
FIG. 4 is a cross-sectional view of an imaging lens of Example 3 of the present invention, illustrating the configuration thereof.
Figure 5:
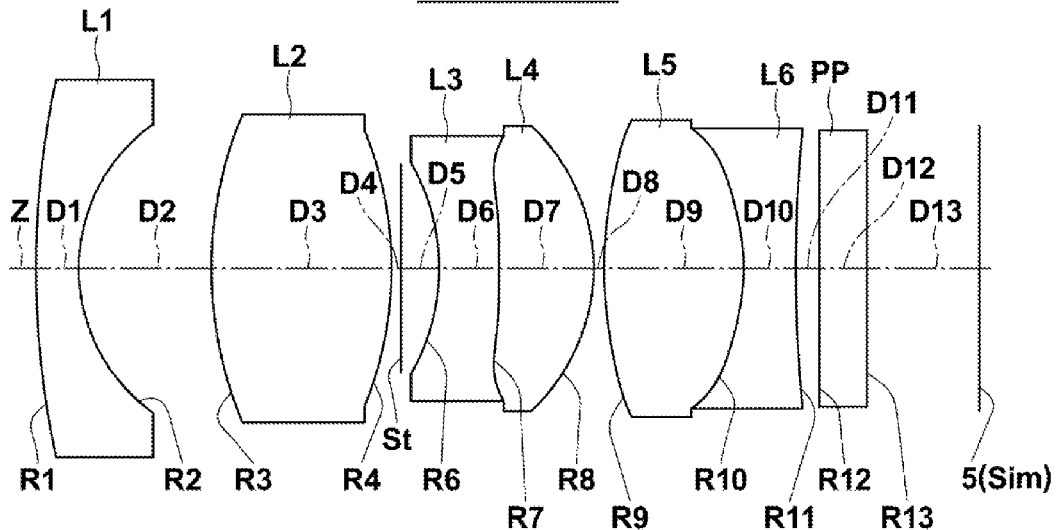
FIG. 5 is a cross-sectional view of an imaging lens of Example 4 of the present invention, illustrating the configuration thereof.
Figure 6:
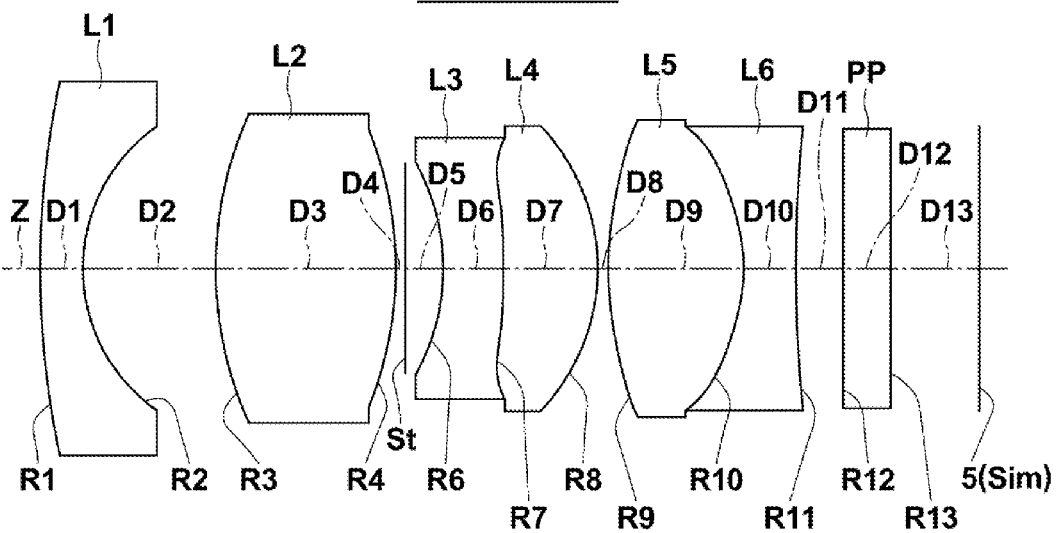
FIG. 6 is a cross-sectional view of an imaging lens of Example 5 of the present invention, illustrating the configuration thereof.
Figure 7:
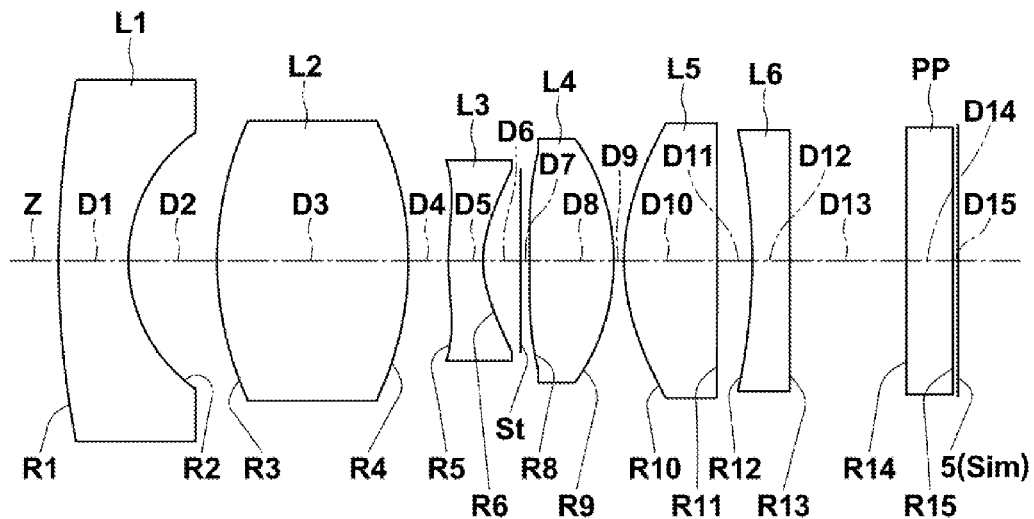
FIG. 7 is a cross-sectional view of an imaging lens of Example 6 of the present invention, illustrating the configuration thereof.
Figure 8:
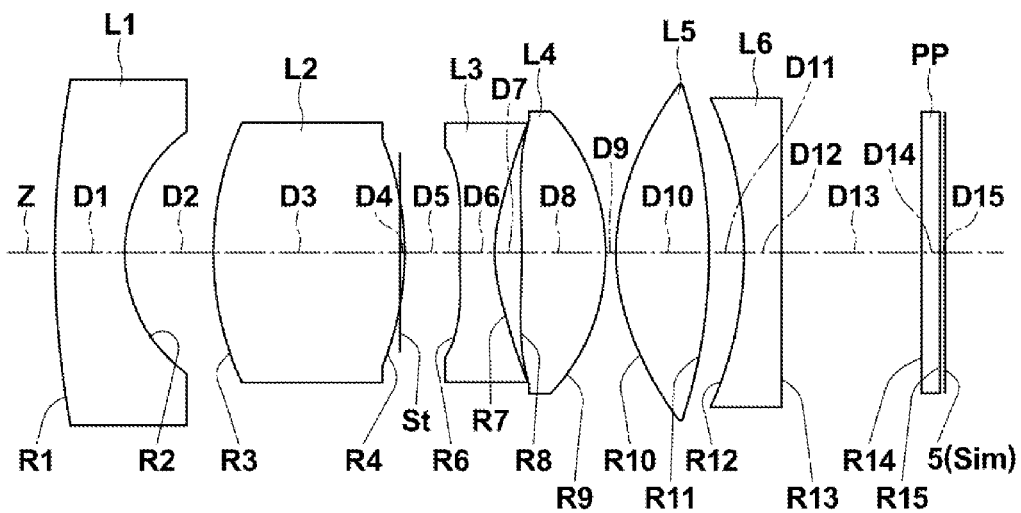
FIG. 8 is a cross-sectional view of an imaging lens of Example 7 of the present invention, illustrating the configuration thereof.
Figure 9:
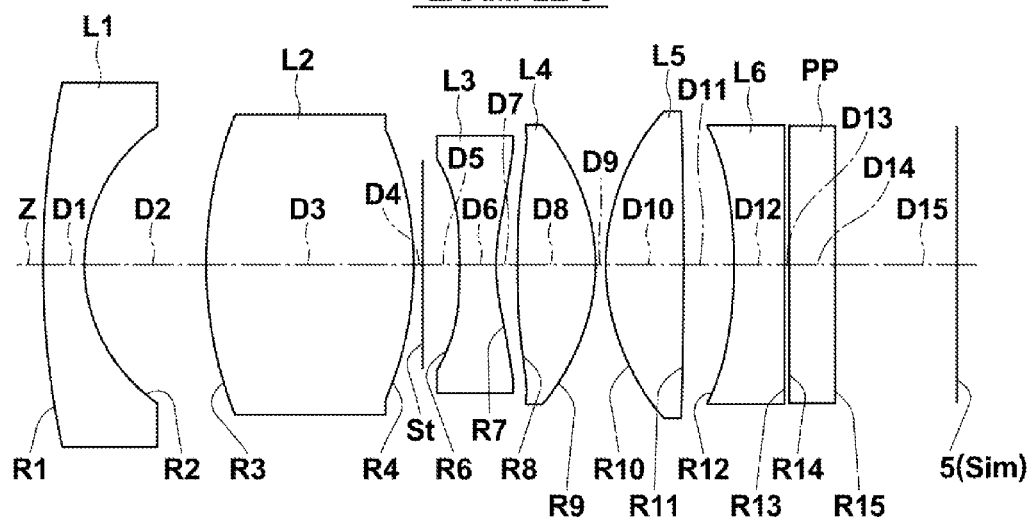
FIG. 9 is a cross-sectional view of an imaging lens of Example 8 of the present invention, illustrating the configuration thereof.
Figure 10:
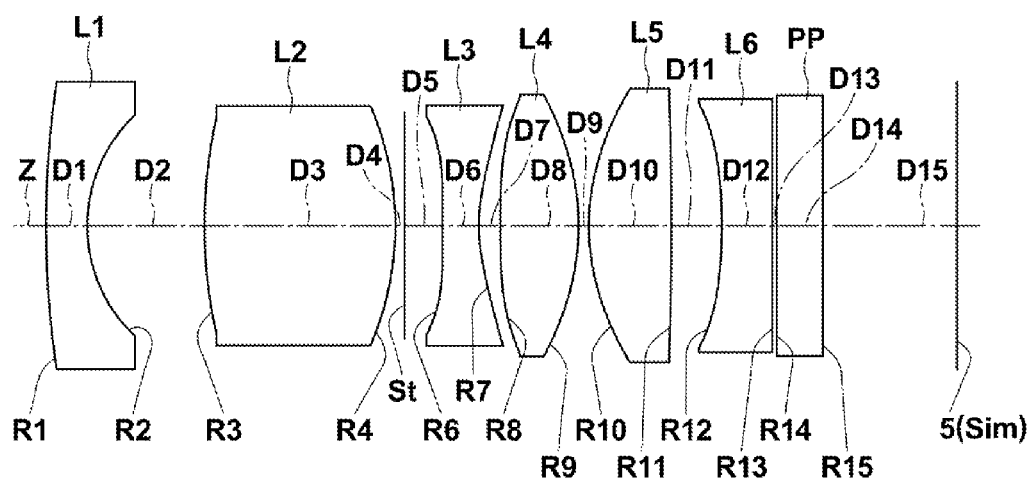
FIG. 10 is a cross-sectional view of an imaging lens of Example 9 of the present invention, illustrating the configuration thereof.
Figure 11:
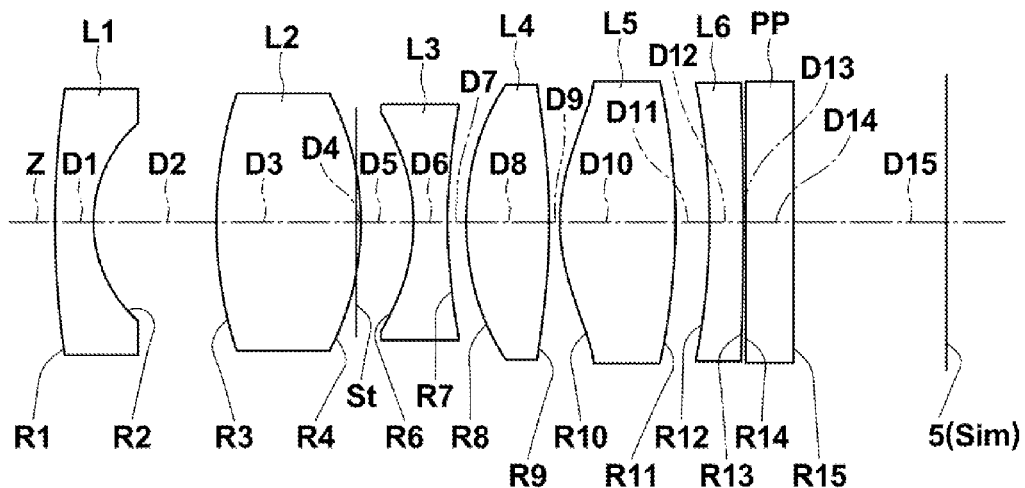
FIG. 11 is a cross-sectional view of an imaging lens of Example 10 of the present invention, illustrating the configuration thereof.
Figure 12:
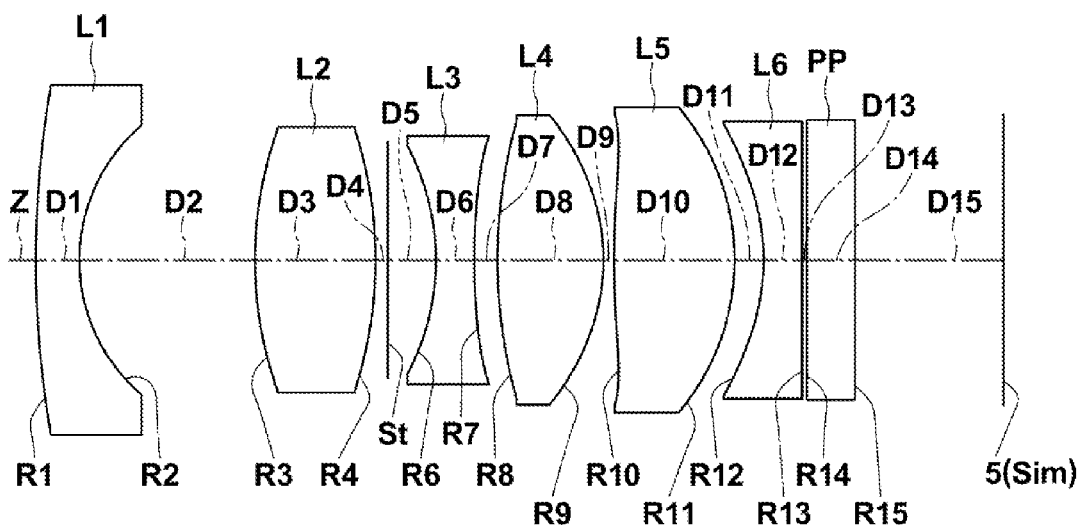
FIG. 12 is a cross-sectional view of an imaging lens of Example 11 of the present invention, illustrating the configuration thereof.
Figure 13:
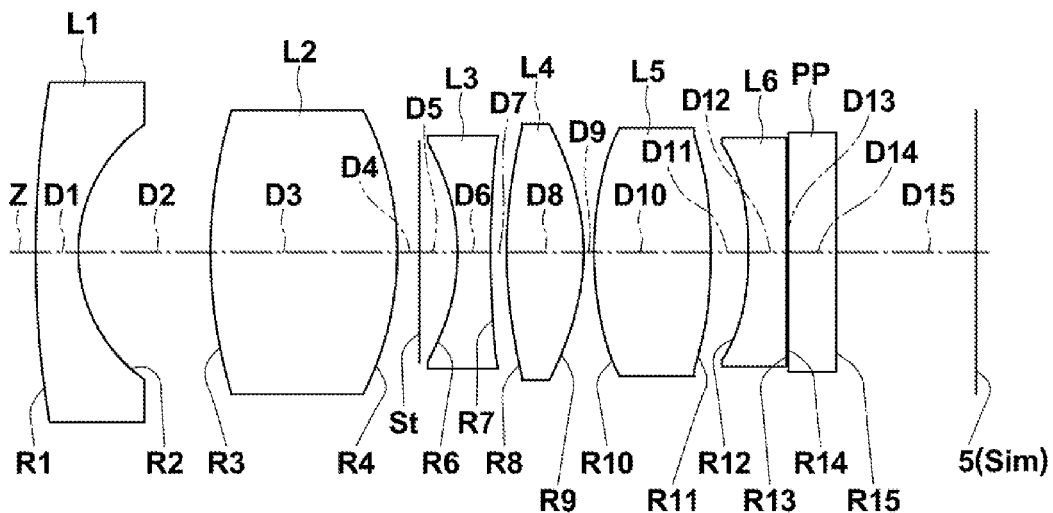
FIG. 13 is a cross-sectional view of an imaging lens of Example 12 of the present invention, illustrating the configuration thereof.
Figure 14:
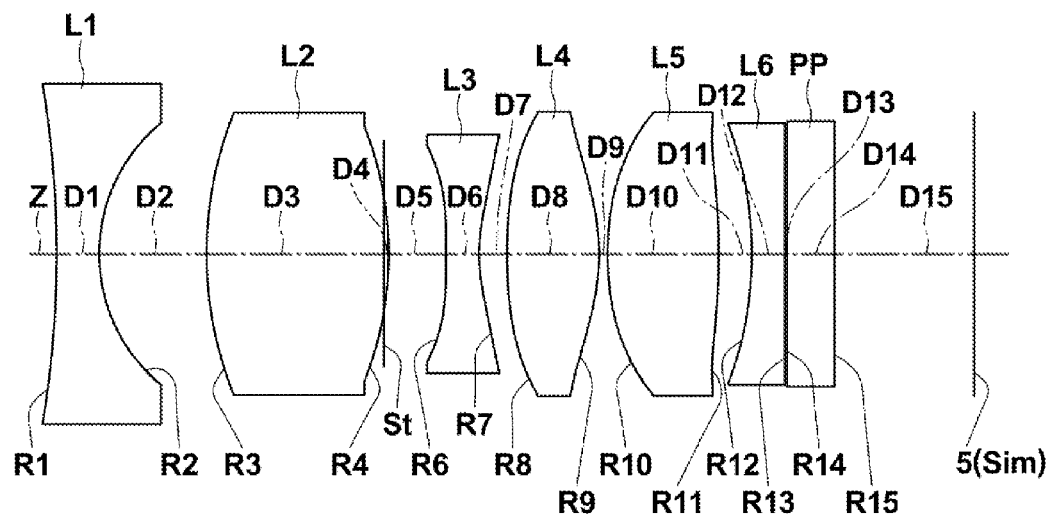
FIG. 14 is a cross-sectional view of an imaging lens of Example 13 of the present invention, illustrating the configuration thereof.
Figure 17:
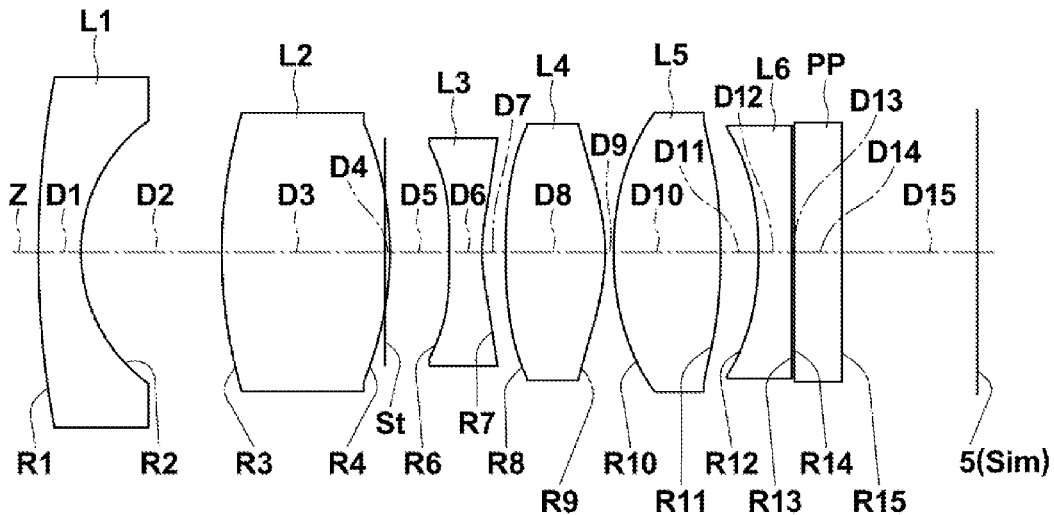
FIG. 17 is a cross-sectional view of an imaging lens of Example 16 of the present invention, illustrating the configuration thereof.
Figure 18:
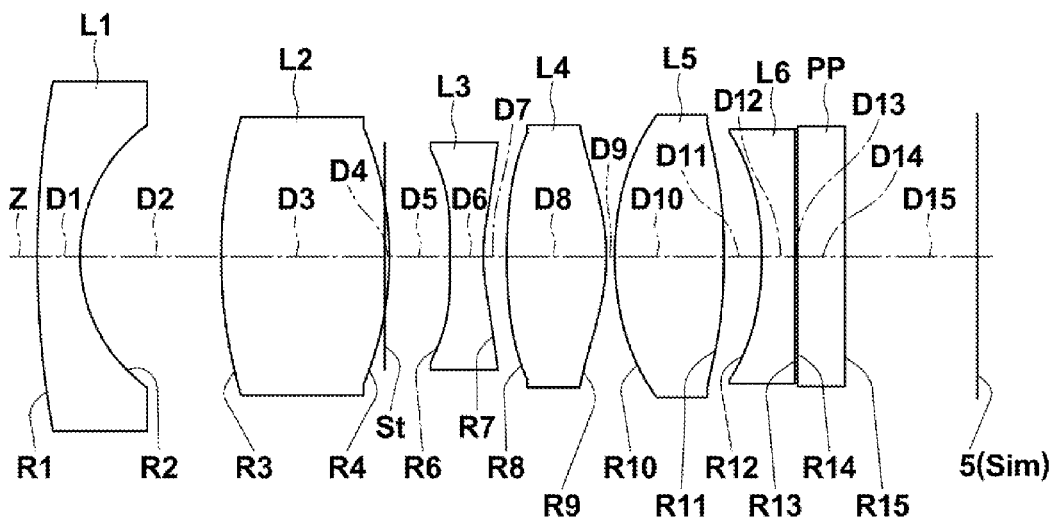
FIG. 18 is a cross-sectional view of an imaging lens of Example 17 of the present invention, illustrating the configuration thereof.
Figure 19:
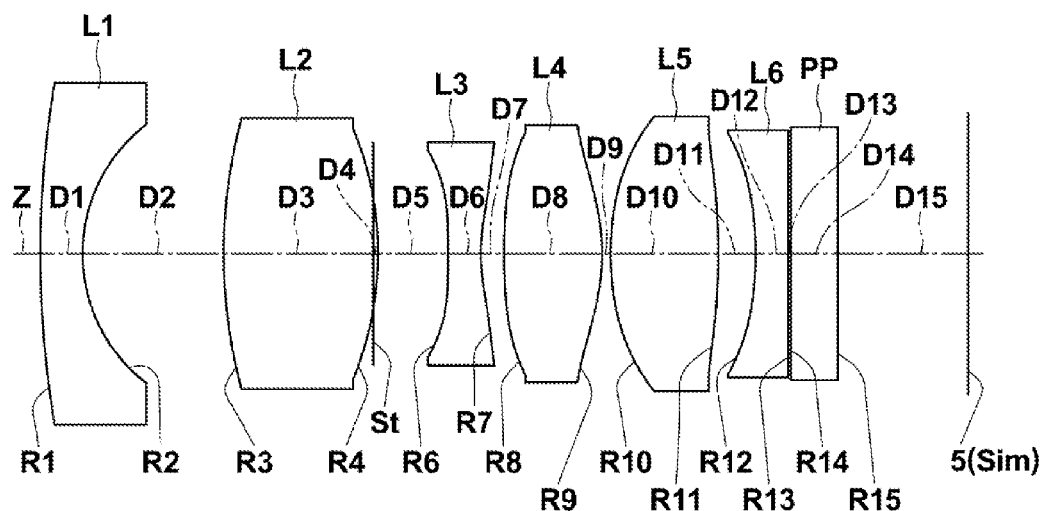
FIG. 19 is a cross-sectional view of an imaging lens of Example 18 of the present invention, illustrating the configuration thereof.
Figure 20:
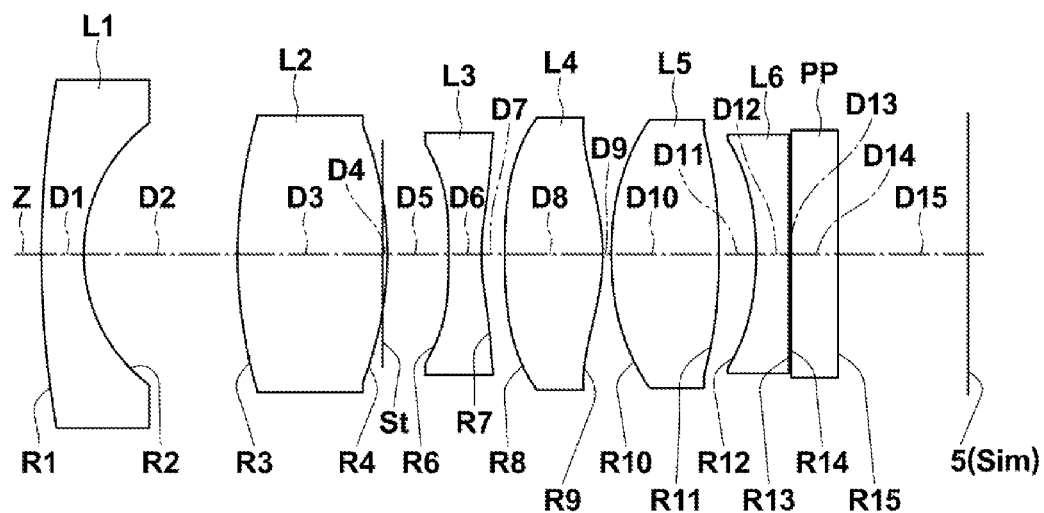
FIG. 20 is a cross-sectional view of an imaging lens of Example 19 of the present invention, illustrating the configuration thereof.
Figure 23:
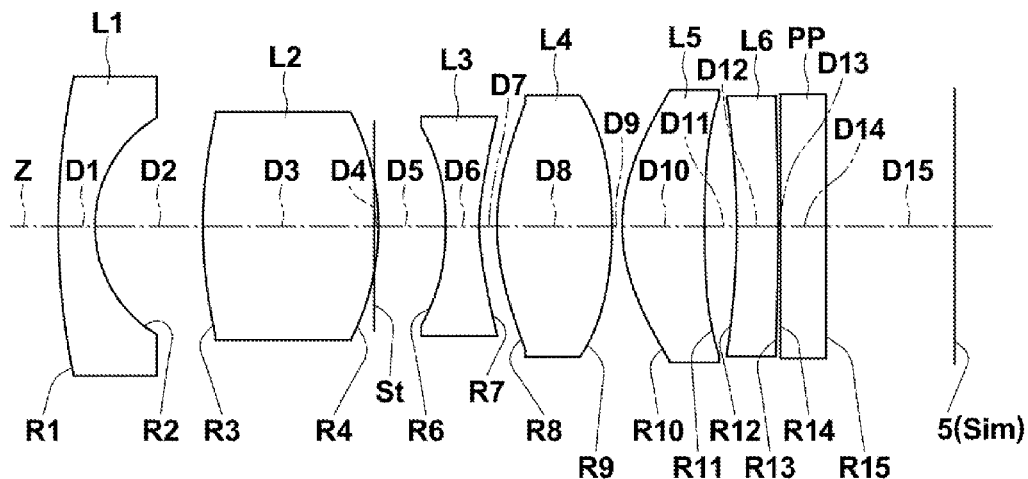
FIG. 23 is a cross-sectional view of an imaging lens of Example 22 of the present invention, illustrating the configuration thereof.
Figure 24:
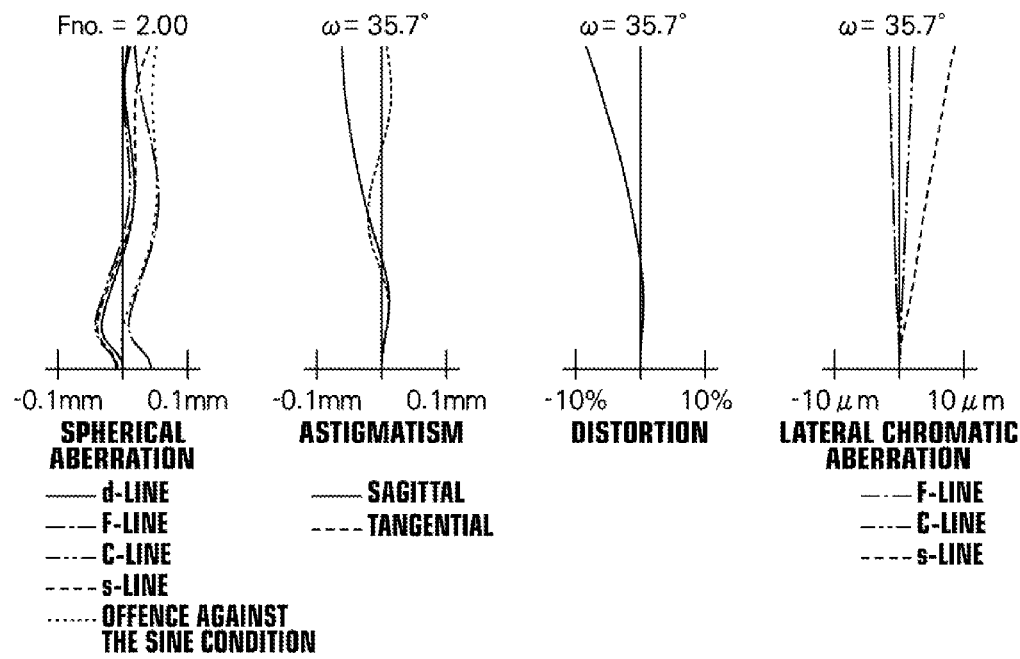
FIG. 24 shows aberration diagrams of the imaging lens of Example 1, in which diagrams of spherical aberration, astigmatism, distortion, and lateral chromatic aberration are arranged from the left in the drawing.
Figure 45:
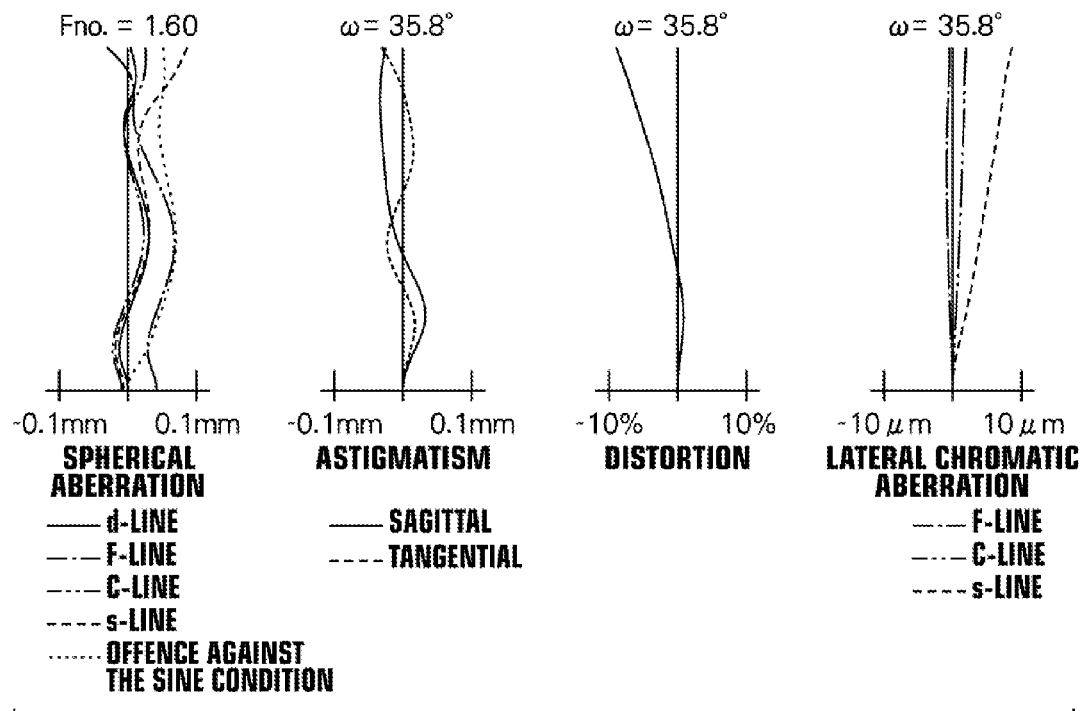
FIG. 45 shows aberration diagrams of the imaging lens of Example 22, in which diagrams of spherical aberration, astigmatism, distortion, and lateral chromatic aberration are arranged from the left in the drawing.

An imaging lens according to an embodiment of the present invention will be described first with reference to FIG. 1. FIG. 1 illustrates a configuration and optical paths of an imaging lens 1 according to one embodiment of the present invention. Note that the imaging lens 1 illustrated in FIG. 1 corresponds to an imaging lens according to Example 1 of the present invention, to be described later. In FIG. 1, the left side of the drawing is the object side and the right side is the image side, and an axial light beam 2 and maximum total angle of view off-axis light beams 3 and 4 from an object point at infinity are also illustrated.

In FIG. 1, an image sensor 5 disposed on the image plane Sim that includes the image point Pim of the imaging lens 1 is also illustrated, taking into account the case in which the imaging lens 1 is applied to an imaging apparatus. The image sensor 5 convers an optical image formed by the imaging lens 1 to an electrical signal and, for example, a CCD image sensor or a CMOS image sensor may be used.

When applying the imaging lens 1 to an imaging apparatus, a cover glass and a low-pass filter or an infrared cut filter are preferably provided according to the structure on the camera side, and FIG. 1 illustrates an example case in which a parallel plate optical member PP which assumes these is disposed between the most image side lens and the image sensor 5 (image plane Sim).

The imaging lens 1 substantially consists of six lenses, composed of a first lens L1 having a negative refractive power, a second lens L2 having a positive refractive power, a third lens L3 having a negative refractive power, a fourth lens L4 having a positive refractive power, a fifth lens L5 having a positive refractive power, and a sixth lens L6 having a negative refractive power, disposed in order from the object side. Note that FIG. 1 also illustrates an aperture stop St, but the illustrated aperture stop St does not represent the shape or size but indicates the position on the optical axis Z.

Disposition of the negative first lens L1 on the most object side is advantageous for increasing the angle of view. Formation of the third lens L3 and the fourth lens L4 as a negative lens and a positive lens respectively is advantageous for satisfactory correction of longitudinal chromatic aberration. Formation of the fifth lens L5 and the sixth lens L6 as a positive lens and a negative lens respectively is advantageous for satisfactory correction of lateral chromatic aberration. The power arrangement of negative, positive, negative, positive, positive, and negative in order from the object side is advantageous for realizing a small F-number, a wide angle of view, and satisfactory resolution performance.

The imaging lens 1 preferably satisfies any one or any combination of conditional expressions (1) to (21) given below:

$$1.0 < (Db12 + D3)/f \tag{1}$$

$$f2/f < 1.68 \tag{2}$$

$$1.0 < (R1f + R1r)/(R1f - R1r) \tag{3}$$

$$1.6 < f3456/f \tag{4}$$

$$0.0 < f4/f < 2.45 \tag{5}$$

$$vd6 < 30 \tag{6}$$

$$0.38 < Db12/f \tag{7}$$

$$f12/f < 2.5 \tag{8}$$

$$f5/f < 5.0 \tag{9}$$

$$-0.15 < (R2f + R2r)/(R2f - R2r) \tag{10}$$

$$-2.5 < (R5f + R5r)/(R5f - R5r) < -0.25 \tag{11}$$

$$-4.0 < (R6f + R6r)/(R6f - R6r) \tag{12}$$

$$0.0 < R1f/f \tag{13}$$

$$-3.0 < f1/f < -0.5 \tag{14}$$

$$0.1 < f12/f3456 < 2.0 \tag{15}$$

$$0.2 < (D3 + Db23)/f < 3.0 \tag{16}$$

$$-3.0 < f1/f2 < -0.2 \tag{17}$$

$$vd3 < 30 \tag{18}$$

$$0.3 < f4/f5 \tag{19}$$

$$0.3 < f56/f \tag{20}$$

$$0.17 < Db23/f \tag{21}$$

where
- R1f: paraxial radius of curvature of the object side surface of the first lens
- R1r: paraxial radius of curvature of the image side surface of the first lens
- R2f: paraxial radius of curvature of the object side surface of the second lens
- R2r: paraxial radius of curvature of the image side surface of the second lens
- R5f: paraxial radius of curvature of the object side surface of the fifth lens
- R5r: paraxial radius of curvature of the image side surface of the fifth lens
- R6f: paraxial radius of curvature of the object side surface of the sixth lens
- R6r: paraxial radius of curvature of the image side surface of the sixth lens
- D3: center thickness of the second lens
- Db12: air space on the optical axis between the first lens and the second lens
- Db23: air space on the optical axis between the second lens and the third lens f: focal length of the entire system
f1: focal length of the first lens
f2: focal length of the second lens
f4: focal length of the fourth lens
f5: focal length of the fifth lens
f12: combined focal length of the first lens and the second lens
f56: combined focal length of the fifth lens and the sixth lens
f3456: combined focal length of the third lens to the sixth lens
vd3: Abbe number of the material of the third lens with respect to the d-line
vd6: Abbe number of the material of the sixth lens with respect to the d-line Configuration of the imaging lens 1 so as not to fall to or below the lower limit of the conditional expression (1) allows the air space between the first lens L1 and the second lens L2, or the center thickness of the second lens L2 to be increased easily, whereby astigmatism and distortion may be corrected easily.

Configuration of the imaging lens 1 so as not to reach or exceed the upper limit of the conditional expression (2) allows the power of the second lens L2 to be increased easily, whereby astigmatism may be corrected easily.

Configuration of the imaging lens 1 so as not to fall to or below the lower limit of the conditional expression (3) allows the negative first lens L1 to be formed as a meniscus lens with a convex surface on the object side, whereby distortion may be corrected easily.

Configuration of the imaging lens 1 so as not to fall to or below the lower limit of the conditional expression (4) allows the combined power of the third lens L3 to the sixth lens L6 to be prevented easily from increasing excessively, whereby the back focus may be increased easily.

Configuration of the imaging lens 1 so as not to reach or exceed the upper limit of the conditional expression (5) allows the power of the fourth lens L4 to be increased easily, whereby longitudinal chromatic aberration may be corrected easily in cooperation of the third lens L3 and the fourth lens L4. Configuration of the imaging lens 1 so as not to fall to or below the lower limit of the conditional expression (5) allows the power of the fourth lens L4 to be prevented easily from increasing excessively, whereby the positive power is divided easily between the fourth lens L4 and the fifth lens L5, and spherical aberration may be corrected easily.

Configuration of the imaging lens 1 so as not to reach or exceed the upper limit of the conditional expression (6) allows the Abbe number of the sixth lens L6 to be reduced easily, whereby lateral chromatic aberration may be corrected easily.

Configuration of the imaging lens 1 so as not to fall to or below the lower limit of the conditional expression (7) allows the air space between the first lens L1 and the second lens L2 to be increased easily, whereby astigmatism and distortion may be corrected easily.

Configuration of the imaging lens 1 so as not to reach or exceed the upper limit of the conditional expression (8) allows the combined focal length of the first lens L1 and the second lens L2 to be kept small easily, whereby astigmatism may be corrected easily.

Configuration of the imaging lens 1 so as not to reach or exceed the upper limit of the conditional expression (9) allows the power of the fifth lens L5 to be increased easily, whereby lateral chromatic aberration may be corrected easily in cooperation of the fifth lens L5 and the sixth lens L6, or allows the angle of a peripheral ray incident on the image sensor to be prevented easily from increasing, whereby shading may be prevented easily.

Configuration of the imaging lens 1 so as not to fall to or below the lower limit of the conditional expression (10) allows the absolute value of the radius of curvature of the object side surface of the second lens L2 to be increased easily, whereby astigmatism may be corrected easily.

The fifth lens L5 is a positive lens and satisfaction of the conditional expression (11) allows the fifth lens L5 to be a lens with the radius of curvature of the object side surface being smaller than that of the image side surface. This allows spherical aberration and astigmatism to be corrected easily. Configuration of the imaging lens 1 so as not to reach or exceed the upper limit of the conditional expression (11) allows the fifth lens L5 to be easily made into a lens with the absolute value of the radius of curvature of the object side surface being smaller than that of the image side surface. Configuration of the imaging lens 1 so as not to fall to or below the lower limit of the conditional expression (11) allows the power of the fifth lens L5 to be increased easily, whereby the angle of a peripheral ray incident on the image sensor may be prevented easily from increasing.

Configuration of the imaging lens 1 so as not to fall to or below the lower limit of the conditional expression (12) allows the power of the sixth lens L6 to be prevented easily from decreasing excessively, whereby lateral chromatic aberration is corrected easily.

Configuration of the imaging lens 1 so as not to fall to or below the lower limit of the conditional expression (13) allows the first lens L1 to have a convex surface on the object side, whereby a ray is prevented easily from being refracted largely by the object side surface of the first lens L1 and distortion may be corrected easily.

Configuration of the imaging lens 1 so as not to reach or exceed the upper limit of the conditional expression (14) allows the power of the first lens L1 to be reduced easily, whereby field curvature and distortion may be corrected easy. Configuration of the imaging lens 1 so as not to fall to or below the lower limit of the conditional expression (14) allows the power of the first lens L1 to be secured easily, whereby the angle of view may be increased easily.

Configuration of the imaging lens 1 so as not to reach or exceed the upper limit of the conditional expression (15) allows the combined power of the first lens L1 and the second lens L2 to be increased easily, whereby the lens system may be downsized easily and astigmatism is corrected easily, or allows the combined power of the third lens L3 to the sixth lens L6 to be suppressed easily, whereby the back focus may be increased easily. Configuration of the imaging lens 1 so as not to fall to or below the lower limit of the conditional expression (15) allows the combined power of the first lens L1 and the second lens L2 to be suppressed easily, whereby the angle of view may be increased easily, or allows the combined power of the third lens L3 to the sixth lens L6 to be increased easily, whereby spherical aberration may be corrected easily and the angle of a peripheral ray incident on the image sensor may be prevented easily from increasing.

Configuration of the imaging lens 1 so as not to reach or exceed the upper limit of the conditional expression (16) allows the lens system to be downsized easily. Configuration of the imaging lens 1 so as not to fall to or below the lower limit of the conditional expression (16) allows the center thickness of the second lens L2 or the distance between the second lens L2 and the third lens L3 to be increased easily, whereby spherical aberration and astigmatism may be corrected easily.

Configuration of the imaging lens 1 so as not to reach or exceed the upper limit of the conditional expression (17) allows the power of the first lens L1 to be suppressed easily or the power of the second lens L2 to be increased easily, whereby spherical aberration and astigmatism may be corrected easily. Configuration of the imaging lens 1 so as not to fall to or below the lower limit of the conditional expression (17) allows the power of the first lens L1 to be increased easily, whereby the angle of view may be increased easily.

Configuration of the imaging lens 1 so as not to reach or exceed the upper limit of the conditional expression (18) allows longitudinal chromatic aberration to be corrected easily.

Configuration of the imaging lens 1 so as not to fall to or below the lower limit of the conditional expression (19) allows the power of the fourth lens L4 to be prevented easily from increasing excessively or the power of the fifth lens L5 to be prevented easily from decreasing excessively, whereby power shifting either to the fourth lens L4 or to the fifth lens L5 may be prevented easily and satisfactory correction of spherical aberration may be made easily.

Configuration of the imaging lens 1 so as not to fall to or below the lower limit of the conditional expression (20) allows the combined focal length of the fifth lens L5 and the sixth lens L6 to be increased easily in positive value, whereby the back focus may be increased easily.

Configuration of the imaging lens 1 so as not to fall to or below the lower limit of the conditional expression (21) allows the air space between the second lens L2 and the third lens L3 to be increased easily, whereby spherical aberration and astigmatism may be corrected easily.

In order to further enhance the operational advantages described above, the imaging lens 1 preferably satisfies modifications of each conditional expression described above in which the lower limit value or the upper limit value is modified in the following manner, or an upper limit or a lower limit is newly added. The preferred aspects are not limited to the satisfaction of those described as formulae, and may include the satisfaction of a conditional expression formed by combining the modified lower and upper limit values to be described herein below.

The value of the lower limit of the conditional expression (1) is preferably modified to 1.08, more preferably to 1.12, and further preferably to 1.18. An upper limit may be added to the conditional expression (1) and the value of which is preferably set to 5.0. This allows the air space between the first lens L1 and the second lens L2, and the center thickness of the second lens L2 to be reduced easily, whereby the lens system may be downsized easily. The value of the upper limit added to the conditional expression (1) is preferably modified to 3.0, more preferably to 2.0, and further preferably to 1.8. From the description above, the imaging lens 1 more preferably satisfies, for example, at least one of conditional expressions given below:

$$1.0 < (Db12+D3)/f < 5.0 \tag{1-1}$$

$$1.0 < (Db12+D3)/f < 3.0 \tag{1-2}$$

$$1.08 < (Db12+D3)/f < 2.0 \tag{1-3}$$

$$1.12 < (Db12+D3)/f < 1.8 \tag{1-4}$$

$$1.18 < (Db12+D3)/f < 3.0 \tag{1-5}$$

The value of the upper limit of the conditional expression (2) is preferably modified to 1.5, more preferably to 1.4, and further preferably to 1.3. A lower limit may be added to the conditional expression (2) and the value of which is preferably set to 0.3. This allows the power of the second lens L2 to be prevented easily from increasing excessively, whereby a permissible amount of manufacturing error of eccentricity may be increased and cost reduction may be achieved easily. The value of the lower limit added to the conditional expression (2) is preferably modified to 0.5 and more preferably to 0.8. From the description above, the imaging lens 1 more preferably satisfies, for example, at least one of conditional expressions given below:

$$0.3 < f2/f < 1.68 \tag{2-1}$$

$$0.3 < f2/f < 1.5 \tag{2-2}$$

$$0.5 < f2/f < 1.5 \tag{2-3}$$

$$0.8 < f2/f < 1.4 \tag{2-4}$$

$$0.3 < f2/f < 1.3 \tag{2-5}$$

The value of the lower limit of the conditional expression (3) is preferably modified to 1.1 and more preferably to 1.2. An upper limit may be added to the conditional expression (3) and the value of which is preferably set to 3.0. This allows the difference in absolute value of radius of curvature between the object side surface and the image side surface of the first lens L1 to be increased easily, whereby the angle of view may be increased easily. The value of the upper limit added to the conditional expression (3) is preferably modified to 2.7, more preferably to 2.4, further preferably to 2.2, particularly preferably to 2.0, and further particularly preferably to 1.8. From the description above, the imaging lens 1 more preferably satisfies, for example, at least one of conditional expressions given below:

$$1.2 < (R1f+R1r)/(R1f-R1r) \tag{3-1}$$

$$1.1 < (R1f+R1r)/(R1f-R1r) < 3.0 \tag{3-2}$$

$$1.1 < (R1f+R1r)/(R1f-R1r) < 2.2 \tag{3-3}$$

$$1.1 < (R1f+R1r)/(R1f-R1r) < 2.0 \tag{3-4}$$

$$1.1 < (R1f+R1r)/(R1f-R1r) < 1.8 \tag{3-5}$$

$$1.2 < (R1f+R1r)/(R1f-R1r) < 2.7 \tag{3-6}$$

$$1.2 < (R1f+R1r)/(R1f-R1r) < 2.4 \tag{3-7}$$

$$1.2 < (R1f+R1r)/(R1f-R1r) < 2.2 \tag{3-8}$$

The value of the lower limit of the conditional expression (4) is preferably modified to 1.7, more preferably to 1.9, and further preferably to 2.0. An upper limit may be added to the conditional expression (4) and the value of which is preferably set to 10.0. This allows the combined power of the third lens L3 to the sixth lens L6 to be increased easily, whereby spherical aberration and astigmatism may be corrected easily. The value of the upper limit added to the conditional expression (4) is preferably modified to 7.0, more preferably to 5.0, further preferably to 4.0, and still further preferably to 3.5. From the description above, the imaging lens 1 more preferably satisfies, for example, at least one of conditional expressions given below:

$$1.6 < f3456/f < 10.0 \tag{4-1}$$

$$1.7 < f3456/f < 7.0 \tag{4-2}$$

$$1.9 < f3456/f < 4.0 \tag{4-3}$$

$$2.0 < f3456/f < 3.5 \tag{4-4}$$

The value of the upper limit of the conditional expression (5) is preferably modified to 2.4, more preferably to 2.3, and further preferably to 2.2. The value of the lower limit of the conditional expression (5) is preferably modified to 0.4, more preferably to 0.6, further preferably to 0.9, and still further preferably to 1.1. From the description above, the imaging lens 1 more preferably satisfies, for example, at least one of conditional expressions given below:

$$0.4 < f4/f < 2.45 \tag{5-1}$$

$$0.6 < f4/f < 2.4 \tag{5-2}$$

$$0.9 < f4/f < 2.3 \tag{5-3}$$

$$1.1 < f4/f < 2.2 \tag{5-4}$$

The value of the upper limit of the conditional expression (6) is preferably modified to 28, more preferably to 26, and further preferably to 24. A lower limit may be added to the conditional expression (6) and the value of which is preferably set to 18. This allows the Abbe number of the sixth lens L6 to be prevented from decreasing excessively, whereby the cost of the material of the sixth lens L6 may be suppressed easily. The value of the lower limit added to the conditional expression (6) is preferably modified to 19 and more preferably to 20. From the description above, the imaging lens 1 more preferably satisfies, for example, at least one of conditional expressions given below:

$$vd6 < 28 \tag{6-1}$$

$$vd6 < 26 \tag{6-2}$$

$$vd6 < 24 \tag{6-3}$$

$$18 < vd6 < 28 \tag{6-4}$$

$$19 < vd6 < 26 \tag{6-5}$$

$$19 < vd6 < 24 \tag{6-6}$$

$$20 < vd6 < 30 \tag{6-7}$$

An upper limit may be added to the conditional expression (7) and the value of which is preferably set to 4.0. This allows the air space between the first lens L1 and the second lens L2 to be reduced easily, whereby the lens system may be downsized easily. The value of the upper limit added to the conditional expression (7) is preferably modified to 3.0, more preferably to 2.0, and further preferably to 1.0. From the description above, the imaging lens 1 more preferably satisfies, for example, at least one of conditional expressions given below:

$$0.38 < Db12/f < 4.0 \tag{7-1}$$

$$0.38 < Db12/f < 3.0 \tag{7-2}$$

$$0.38 < Db12/f < 2.0 \tag{7-3}$$

$$0.38 < Db12/f < 1.0 \tag{7-4}$$

The value of the upper limit of the conditional expression (8) is preferably modified to 3.0, more preferably to 2.5, further preferably to 2.0, and still further preferably to 1.8. A lower limit may be added to the conditional expression (8) and the value of which is preferably set to 0.5. This allows the combined focal length of the first lens L1 and the second lens L2 to be increased easily in positive value, whereby the angle of view may be increased easily. The value of the lower limit added to the conditional expression (8) is preferably modified to 0.8 and more preferably to 1.0. From the description above, the imaging lens 1 more preferably satisfies, for example, at least one of conditional expressions given below:

$$0.5 < f12/f < 2.5 \tag{8-1}$$

$$0.5 < f12/f < 2.0 \tag{8-2}$$

$$0.8 < f12/f < 3.0 \tag{8-3}$$

$$1.0 < f12/f < 2.5 \tag{8-4}$$

$$1.0 < f12/f < 2.0 \tag{8-5}$$

The value of the upper limit of the conditional expression (9) is preferably modified to 3.4, more preferably to 3.2, further preferably to 3.0, and still further preferably to 2.8. A lower limit may be added to the conditional expression (9) and the value of which is preferably set to 0.3. This allows the power of the fifth lens L5 to be prevented easily from increasing excessively, whereby the back focus may be increased easily or a permissible amount of manufacturing error of eccentricity may be increased and cost reduction may be achieved easily. The value of the lower limit value added to the conditional expression (9) is preferably modified to 0.5 and more preferably to 0.8. From the description above, the imaging lens 1 more preferably satisfies, for example, at least one of conditional expressions given below:

$$0.3 < f5/f < 5.0 \tag{9-1}$$

$$0.3 < f5/f < 3.4 \tag{9-2}$$

$$0.5 < f5/f < 3.2 \tag{9-3}$$

$$0.8 < f5/f < 3.0 \tag{9-4}$$

The value of the lower limit of the conditional expression (10) is preferably modified to −0.10, more preferably to −0.05, and further preferably to 0.00. An upper limit may be added to the conditional expression (10) and the value of which is preferably set to 0.9. This allows the power of the second lens L2 to be increased easily, whereby astigmatism may be corrected easily. The value of the upper limit added to the conditional expression (10) is preferably modified to 0.7, more preferably to 0.5, and further preferably to 0.4. From the description above, the imaging lens 1 more preferably satisfies, for example, at least one of conditional expressions given below:

$$-0.15 < (R2f+R2r)/(R2f-R2r) < 0.9 \tag{10-1}$$

$$-0.10 < (R2f+R2r)/(R2f-R2r) < 0.9 \tag{10-2}$$

$$-0.10 < (R2f+R2r)/(R2f-R2r) < 0.7 \tag{10-3}$$

$$-0.05 < (R2f+R2r)/(R2f-R2r) < 0.5 \tag{10-4}$$

The value of the upper limit of the conditional expression (11) is preferably modified to −0.26, more preferably to −0.27, and further preferably to −0.28. The value of the lower limit of the conditional expression (11) is preferably modified to −2.0, more preferably to −1.7, further preferably to −1.5, and still further preferably to −1.2. From the description above, the imaging lens 1 more preferably satisfies, for example, at least one of conditional expressions given below:

$$-2.0 < (R5f+R5r)/(R5f-R5r) < -0.26 \tag{11-1}$$

$$-1.7 < (R5f+R5r)/(R5f-R5r) < -0.26 \tag{11-2}$$

$$-1.4 < (R5f+R5r)/(R5f-R5r) < -0.27 \tag{11-3}$$

$$-1.2 < (R5f+R5r)/(R5f-R5r) < -0.28 \tag{11-4}$$

The value of the lower limit of the conditional expression (12) is preferably modified to −3.8, more preferably to −3.5, and further preferably to −3.0. An upper limit may be added to the conditional expression (12) and the value of which is preferably set to −0.1. This allows the absolute value of radius of curvature of the image side surface of the sixth lens L6 to be prevented from decreasing excessively in concave surface, whereby the angle of a peripheral ray incident on the image sensor may be prevented easily from increasing. The value of the upper limit added to the conditional expression (12) is preferably modified to −0.3, more preferably to −0.5, and further preferably to −0.6. From the description above, the imaging lens 1 more preferably satisfies, for example, at least one of conditional expressions given below:

$$-4.0 < (R6f+R6r)/(R6f-R6r) < -0.1 \quad (12\text{-}1)$$

$$-3.8 < (R6f+R6r)/(R6f-R6r) < -0.3 \quad (12\text{-}2)$$

$$-3.5 < (R6f+R6r)/(R6f-R6r) < -0.5 \quad (12\text{-}3)$$

$$-3.0 < (R6f+R6r)/(R6f-R6r) < -0.6 \quad (12\text{-}4)$$

The value of the lower limit of the conditional expression (13) is preferably modified to 0.3. This allows the radius of curvature of the object side surface of the first lens L1 to be prevented easily from decreasing excessively, whereby the power of the first lens L1 may be increased easily and the angle of view may be increased easily. The value of the lower limit of the conditional expression (13) is preferably modified to 0.8, more preferably to 1.0, and further preferably to 1.5. An upper limit may be added to the conditional expression (13) and the value of which is preferably set to 30. This allows the radius of curvature of the object side surface of the first lens L1 to be reduced easily, whereby distortion may be corrected easily. The value of the upper limit added to the conditional expression (13) is preferably modified to 20, more preferably to 10, and further preferably to 7. From the description above, the imaging lens 1 more preferably satisfies, for example, at least one of conditional expressions given below:

$$0.0 < R1f/f < 30 \quad (13\text{-}1)$$

$$0.3 < R1f/f < 20 \quad (13\text{-}2)$$

$$0.8 < R1f/f < 30 \quad (13\text{-}3)$$

$$1.5 < R1f/f < 10 \quad (13\text{-}4)$$

The value of the upper limit of the conditional expression (14) is preferably modified to −0.7, more preferably to −0.8, and more preferably to −0.9. The value of the lower limit of the conditional expression (14) is preferably modified to −2.8, more preferably to −2.5, and further preferably to −2.0. From the description above, the imaging lens 1 more preferably satisfies, for example, at least one of conditional expressions given below:

$$-2.8 < f1/f < -0.7 \quad (14\text{-}1)$$

$$-2.5 < f1/f < -0.8 \quad (14\text{-}2)$$

$$-2.0 < f1/f < -0.9 \quad (14\text{-}3)$$

The value of the upper limit of the conditional expression (15) is preferably modified to 1.5, more preferably to 1.0, and further preferably to 0.9. The value of the lower limit of the conditional expression (15) is preferably modified to 0.2, more preferably to 0.25, and further preferably to 0.3. From the description above, the imaging lens 1 more preferably satisfies, for example, at least one of conditional expressions given below:

$$0.1 < f12/f3456 < 1.5 \quad (15\text{-}1)$$

$$0.2 < f12/f3456 < 1.0 \quad (15\text{-}2)$$

$$0.3 < f12/f3456 < 0.9 \quad (15\text{-}3)$$

The value of the upper limit of the conditional expression (16) is preferably modified to 2.5, more preferably to 2.0, and further preferably to 1.5. The value of the lower limit of the conditional expression (16) is preferably modified to 0.4, more preferably to 0.6, and further preferably to 0.7. From the description above, the imaging lens 1 more preferably satisfies, for example, at least one of conditional expressions given below:

$$0.4 < (D3+Db23)/f < 2.5 \quad (16\text{-}1)$$

$$0.6 < (D3+Db23)/f < 2.0 \quad (16\text{-}2)$$

$$0.7 < (D3+Db23)/f < 1.5 \quad (16\text{-}3)$$

The value of the upper limit of the conditional expression (17) is preferably modified to −0.4, more preferably to −0.6, and further preferably to −0.8. The value of the lower limit of the conditional expression (17) is preferably modified to −2.5, more preferably to −2.0, and further preferably to −1.5. From the description above, the imaging lens 1 more preferably satisfies, for example, at least one of conditional expressions given below:

$$-2.5 < f1/f2 < -0.4 \quad (17\text{-}1)$$

$$-2.0 < f1/f2 < -0.6 \quad (17\text{-}2)$$

$$-1.5 < f1/f2 < -0.8 \quad (17\text{-}3)$$

The value of the upper limit of the conditional expression (18) is preferably modified to 27, more preferably to 26, further preferably to 25, and still further preferably to 24. A lower limit may be added to the conditional expression (18) and the value of which is preferably set to 19. This allows the cost of the material of the third lens L3 to be suppressed easily, whereby the lens system can be made inexpensive easily. The value of the lower limit added to the conditional expression (18) is preferably modified to 20. From the description above, the imaging lens 1 more preferably satisfies, for example, at least one of conditional expressions given below:

$$vd3 < 27 \quad (18\text{-}1)$$

$$vd3 < 26 \quad (18\text{-}2)$$

$$vd3 < 25 \quad (18\text{-}3)$$

$$vd3 < 24 \quad (18\text{-}4)$$

$$19 < vd3 < 27 \quad (18\text{-}5)$$

$$19 < vd3 < 26 \quad (18\text{-}6)$$

$$19 < vd3 < 25 \quad (18\text{-}7)$$

$$20 < vd3 < 24 \quad (18\text{-}8)$$

The value of the lower limit of the conditional expression (19) is preferably modified to 0.4, more preferably to 0.5, and further preferably to 0.6. An upper limit may be added to the conditional expression (19) and the value of which is preferably set to 3.0. This allows the power of the fifth lens L5 to be prevented easily from increasing excessively or the power of the fourth lens L4 to be prevented easily from decreasing excessively, whereby power shifting either to the fourth lens L4 or to the fifth lens L5 may be prevented easily and satisfactory correction of spherical aberration may be made easily. The value of the upper limit added to the conditional expression (19) is preferably modified to 2.7 and more preferably to 2.4. From the description above, the imaging lens 1 more preferably satisfies, for example, at least one of conditional expressions given below:

$$0.4 < f4/f5 \quad (19\text{-}1)$$

$$0.3 < f4/f5 < 3.0 \quad (19\text{-}2)$$

$$0.5 < f4/f5 < 2.7 \quad (19\text{-}3)$$

$$0.6 < f4/f5 < 2.4 \quad (19\text{-}4)$$

The value of the lower limit of the conditional expression (20) is preferably modified to 0.5, more preferably to 1.0, and further preferably to 1.4. An upper limit may be added to the conditional expression (20) and the value of which is preferably set to 30. This allows the combined refractive power of the fifth lens L5 and the sixth lens L6 to be increased easily, whereby the angle of a peripheral ray incident on the image sensor may be prevented easily from increasing. The value of the upper value added to the conditional expression (20) is preferably modified to 25, more preferably to 20, and further preferably to 15. From the description above, the imaging lens 1 more preferably satisfies, for example, at least one of conditional expressions given below:

$$0.3 < f56/f < 30 \quad (20\text{-}1)$$

$$0.5 < f56/f < 25 \quad (20\text{-}2)$$

$$1.0 < f56/f < 20 \quad (20\text{-}3)$$

$$1.4 < f56/f < 15 \quad (20\text{-}4)$$

The value of the lower limit of the conditional expression (21) is preferably modified to 0.18 and more preferably to 0.19. An upper limit may be added to the conditional expression (21) and the value of which is preferably set to 3.0. This allows the air space between the second lens L2 and the third lens L3 to be prevented easily from increasing excessively, whereby downsizing may be achieved easily. The value of the upper limit added to the conditional expression (21) is preferably modified to 2.5, more preferably to 2.0, further preferably to 1.0, and still further preferably to 0.8. From the description above, the imaging lens 1 more preferably satisfies, for example, at least one of conditional expressions given below:

$$0.17 < Db23/f < 3.0 \quad (21\text{-}1)$$

$$0.18 < Db23/f < 2.0 \quad (21\text{-}2)$$

$$0.19 < Db23/f < 1.0 \quad (21\text{-}3)$$

When the Abbe number of the material of the first lens L1 with respect to the d-line is taken as vd1, the vd1 is preferably greater than 40. This allows satisfactory correction of longitudinal chromatic aberration and lateral chromatic aberration to be made easily. The vd1 is more preferably greater than 45, and further preferably greater than 50.

When the Abbe number of the material of the second lens L2 with respect to the d-line is taken as vd2, the vd2 is preferably greater than 30. This allows satisfactory correction of longitudinal chromatic aberration to be made easily. The vd2 is more preferably greater than 35, and further preferably greater than 38. Further, the vd2 is preferably smaller than 60. This allows the cost of the material of the second lens L2 to be suppressed easily and lateral chromatic aberration to be corrected easily. The vd2 is more preferably smaller than 55 and further preferably smaller than 50.

Preferably, vd1/vd2 is 1.0 or greater. This allows the Abbe number of the first lens L1 to be increased easily, whereby longitudinal chromatic aberration may be corrected easily or the Abbe number of the material of the second lens L2 is prevented easily from increasing excessively and lateral chromatic aberration may be corrected easily. The vd1/vd2 is preferably 1.6 or less. This allows the Abbe number of the material of the second lens L2 to be prevented easily from decreasing excessively, whereby longitudinal chromatic aberration may be corrected easily.

The preferable range of the Abbe number of the material of the third lens L3 with respect to the d-line is as described above in the conditional expression (18) and in the related description.

When the Abbe number of the material of the fourth lens L4 with respect to the d-line is taken as vd4, the vd4 is preferably greater than 40. This allows longitudinal chromatic aberration and lateral chromatic aberration to be corrected easily. The vd4 is more preferably greater than 45 and further preferably greater than 50. Further, the vd4 is preferably smaller than 70. This allows the cost of the fourth lens L4 to be suppressed easily, whereby the lens system can be made inexpensive easily. The vd4 is preferably smaller than 65 and more preferably smaller than 60.

When the Abbe number of the material of the fifth lens L5 with respect to the d-line is taken as vd5, the vd5 is preferably greater than 40. This allows longitudinal chromatic aberration and lateral chromatic aberration to be corrected easily. The vd5 is more preferably greater than 45 and further preferably greater than 50. Further, the vd5 is preferably smaller than 70. This allows the cost of the material of the fifth lens L5 to be suppressed easily, whereby the lens system can be made inexpensive easily. The vd5 is preferably smaller than 65 and more preferably smaller than 60.

The preferable range of the Abbe number of the material of the sixth lens L6 with respect to the d-line is as described above in the conditional expression (6) and in the related description.

When the refractive index of the material of the first lens L1 with respect to the d-line is taken as Nd1, the Nd1 is preferably greater than 1.5. This allows the refractive index of the first lens L1 to be increased easily, whereby the angle of view of the lens system is increased easily. The Nd1 is more preferably greater than 1.51 and further preferably greater than 1.55. Further, the Nd1 is preferably smaller than 1.85. This allows the cost of the material of the first lens L1 to be reduced easily. The Nd1 is more preferably smaller than 1.82 and further preferably smaller than 1.80.

When the refractive index of the material of the second lens L2 with respect to the d-line is taken as Nd2, the Nd2 is preferably greater than 1.70. This allows field curvature to be corrected easily. The Nd2 is more preferably greater than 1.72 and further preferably greater than 1.75. Further, the Nd2 is preferably smaller than 1.95. This allows the cost of the material of the second lens L2 to be reduced easily. The Nd2 is more preferably smaller than 1.90.

When the refractive index of the material of the third lens L3 with respect to the d-line is taken as Nd3, the Nd3 is preferably greater than 1.50. This allows the power of the third lens L3 to be increased easily, whereby longitudinal chromatic aberration may be corrected easily. The Nd3 is more preferably greater than 1.55 and further preferably greater than 1.58. Further, the Nd3 is preferably smaller than 1.70. This allows the refractive index of the material of the third lens L3 with respect to the d-line to be reduced easily, whereby the cost of the third lens L3 may be suppressed easily. The Nd3 is more preferably smaller than 1.68 and further preferably smaller than 1.65. From the description above, the third lens L3 more preferably satisfies, for example, at least one of conditional expressions given below:

$$Nd3<1.7 \quad (22)$$

$$Nd3<1.68 \quad (22\text{-}1)$$

$$1.50<Nd3<1.65 \quad (22\text{-}2)$$

$$1.55<Nd3<1.68 \quad (22\text{-}3)$$

$$1.58<Nd3<1.7 \quad (22\text{-}4)$$

When the refractive index of the material of the fourth lens L4 with respect to the d-line is taken as Nd4, the Nd4 is preferably greater than 1.45. This allows field curvature to be corrected easily. The Nd4 is more preferably greater than 1.48, further preferably greater than 1.49, and still further preferably greater than 1.50. Further, the Nd4 is preferably smaller than 1.60. This allows the refractive index of the material of the fourth lens L4 with respect to the d-line to be reduced, whereby the cost of the fourth lens L4 may be suppressed easily, and the Abbe number of the fourth lens L4 may be increased easily so that longitudinal chromatic aberration and lateral chromatic aberration may be corrected easily. The Nd4 is more preferably smaller than 1.58 and further preferably smaller than 1.55. From the description above, the fourth lens L4 more preferably satisfies, for example, at least one of conditional expressions given below:

$$Nd4<1.6 \quad (23)$$

$$Nd4<1.55 \quad (23\text{-}1)$$

$$1.45<Nd4<1.6 \quad (23\text{-}2)$$

$$1.48<Nd4<1.58 \quad (23\text{-}3)$$

$$1.50<Nd4<1.58 \quad (23\text{-}4)$$

When the refractive index of the material of the fifth lens L5 with respect to the d-line is taken as Nd5, the Nd5 is preferably greater than 1.45. This allows the power of the fifth lens L5 to be increased easily, whereby field curvature may be corrected easily or the angle of a peripheral ray incident on the image sensor may be prevented easily from increasing and shading may be prevented easily. The Nd5 is more preferably greater than 1.48, further preferably greater than 1.50. Further, the Nd5 is more preferably smaller than 1.60. This allows the refractive index of the material of the fifth lens L5 with respect to the d-line to be reduced easily, whereby the cost of the fifth lens L5 may be suppressed easily and the Abbe number of the fifth lens L5 may be increased easily, so that longitudinal chromatic aberration and lateral chromatic aberration may be corrected easily. The Nd5 is more preferably smaller than 1.58 and further preferably smaller than 1.55. From the description above, the fifth lens L5 more preferably satisfies, for example, at least one of conditional expressions given below:

$$Nd5<1.6 \quad (24)$$

$$Nd5<1.55 \quad (24\text{-}1)$$

$$1.45<Nd5<1.6 \quad (24\text{-}2)$$

$$1.48<Nd5<1.58 \quad (24\text{-}3)$$

$$1.50<Nd5<1.58 \quad (24\text{-}4)$$

When the refractive index of the material of the sixth lens L6 with respect to the d-line is taken as Nd6, the Nd6 is preferably greater than 1.50. This allows the power of the sixth lens L6 to be increased easily, whereby lateral chromatic aberration may be corrected easily. The Nd6 is more preferably greater than 1.55, further preferably greater than 1.58. Further, Nd6 is preferably smaller than 1.89. This allows the refractive index of the material of the sixth lens L6 with respect to the d-line to be made relative low, whereby the cost of the sixth lens L6 may be suppressed easily. The Nd6 is more preferably smaller than 1.86, more preferably smaller than 1.70, further preferably smaller than 1.68 and still further preferably smaller than 1.65. From the description above, the sixth lens L6 more preferably satisfies, for example, at least one of conditional expressions given below:

$$Nd6<1.89 \quad (25)$$

$$Nd6<1.86 \quad (25\text{-}1)$$

$$1.50<Nd6<1.70 \quad (25\text{-}2)$$

$$1.55<Nd6<1.68 \quad (25\text{-}3)$$

$$1.58<Nd6<1.65 \quad (25\text{-}4)$$

Preferably, the object side surface of the first lens L1 is a convex surface. As the first lens L1 is a negative lens, if the object side surface is a convex surface, the first lens L1 is a meniscus lens. Formation of the first lens L1 as a meniscus lens with a convex surface on the object side allows distortion to be corrected easily.

Preferably, the image side surface of the first lens L1 is a concave surface. This allows the angle of view to be increased easily.

Preferably, the object side surface of the second lens L2 is a convex surface. This allows the power of the second lens L2 to be increased easily, whereby astigmatism may be corrected easily.

Preferably, the image side surface of the second lens L2 is a convex surface. This allows the power of the second lens L2 to be increased easily, whereby astigmatism may be corrected easily.

Preferably, the second lens L2 is a biconvex lens. This allows the power of the second lens L2 to be increased easily, whereby astigmatism may be corrected easily.

Preferably, the second lens L2 is formed such that the absolute value of the radius of curvature of the object side surface is greater than that of the image side surface. This allows distortion to be corrected easily.

Preferably, the object side surface of the third lens L3 is a concave surface. This allows the power of the third lens L3 to be increased easily, whereby longitudinal chromatic aberration may be corrected easily.

Preferably, the image side surface of the third lens L3 is a concave surface. This allows the power of the third lens L3 to be increased easily, whereby longitudinal chromatic aberration may be corrected easily.

Preferably, the third lens L3 is a biconcave lens. This allows the power of the third lens L3 to be increased easily, whereby longitudinal chromatic aberration may be corrected easily.

The third lens L3 may be formed such that the absolute value of the radius of curvature of the object side surface is smaller than that of the image side surface. This allows astigmatism to be corrected easily.

The third lens L3 may be formed such that the absolute value of the radius of curvature of the object side surface is greater than that of the image side surface. This allows longitudinal aberration to be corrected easily in cooperation of the third lens L3 and the fourth lens L4.

Preferably, the object side surface of the fourth lens L4 is a convex surface. This allows the power of the fourth lens L4 to be increased easily, whereby longitudinal aberration may be corrected easily in cooperation of the third lens L3 and the fourth lens L4.

Preferably, the image side surface of the fourth lens L4 is a convex surface. This allows astigmatism to be corrected easily.

Preferably, the fourth lens L4 is a biconvex lens. This allows the power of the fourth lens L4 to be increased easily, whereby longitudinal aberration may be corrected easily in cooperation of the third lens L3 and the fourth lens L4.

Preferably, the object side surface of the fifth lens L5 is a convex surface. This allows the power of the fifth lens L5 to be increased easily, whereby the angle of a peripheral ray incident on the image sensor may be prevented easily from increasing and shading may be prevented easily.

The image side surface of the fifth lens L5 may be a convex surface or a plane surface. Formation of the image side surface of the fifth lens L5 in a convex surface or a plane surface allows the angle of a peripheral ray incident on the image sensor to be prevented more easily from increasing in comparison with a case in which the image side surface of the fifth lens L5 is formed as a concave surface, whereby shading may be prevented easily.

The image side surface of the fifth lens L5 may be a concave surface. Formation of the image side surface of the fifth lens L5 as a concave surface allows field curvature to be corrected easily.

The fifth lens L5 may be a biconvex lens or a plano-convex lens with a convex surface on the object side. Formation of the fifth lens L5 as a biconvex lens or a plano-convex lens with a convex surface on the object side allows the power of the fifth lens L5 to be increased easily, whereby the angle of a peripheral ray incident on the image sensor may be prevented easily from increasing and shading may be prevented easily.

The fifth lens L5 may be a meniscus lens with a convex surface on the object side. Formation of the fifth lens L5 as a meniscus lens with a convex surface on the object side allows field curvature to be corrected easily.

Preferably, the object side surface of the sixth lens L6 is a concave surface. This allows the power of the sixth lens L6 to be increased easily, whereby lateral chromatic aberration image corrected easily.

The image side surface of the sixth lens L6 may be a convex surface or a plane surface. Formation of the image side surface of the sixth lens L6 as a convex surface or a plane surface allows the angle of a peripheral ray incident on the image sensor to be prevented easily from increasing.

The image side surface of the sixth lens L6 may be a concave surface.

Formation of the image side surface of the sixth lens L6 as a concave surface allows field curvature and distortion to be corrected easily.

The sixth lens L6 may be a negative meniscus lens with a concave surface on the object side or a plano-concave lens. Formation of the sixth lens L6 as a negative meniscus lens with a concave surface on the object side or a plano-concave lens allows the angle of a peripheral ray incident on the image sensor to be prevented easily from increasing.

The sixth lens L6 may be a biconcave lens. Formation of the sixth lens L6 as a biconcave lens allows lateral chromatic aberration to be corrected easily and field curvature to be corrected easily.

Preferably, the absolute value of the radius of curvature of the object side surface of the sixth lens L6 is smaller than that of the image side surface. This allows the angle of a peripheral ray incident on the image sensor to be prevented easily from increasing.

Each of the first lens L1 to the sixth lens L6 may have an aspherical surface on either one of the sides. This allows satisfactory correction of various types of aberrations to be made easily.

Preferably, the object side surface of the third lens L3 is an aspherical surface. The object side surface of the third lens L3 may be formed in a shape having a negative power near the optical axis and a stronger negative power at the end of the effective diameter in comparison with that near the optical axis. Formation of the object side surface of the third lens L3 in such a shape allows satisfactory correction of spherical aberration to be made easily.

The object side surface of the third lens L3 may have an aspherical shape having a positive power near the optical axis and a negative power at the end of the effective diameter. Formation of the object side surface of the third lens L3 in such a shape allows satisfactory correction of spherical aberration to be made easily.

Preferably, the image side surface of the third lens L3 is an asphercial surface. Preferably, the image side surface of the third lens L3 has a shape having a negative power near the optical axis and a weaker negative power at the end of the effective diameter in comparison with that near the optical axis. Formation of the image side surface of the third lens L3 in such a shape allows the lens system to be downsized easily or satisfactory correction of astigmatism and coma aberration to be made easily.

Preferably, the object side surface of the fourth lens L4 is an aspherical surface. Preferably, the object side surface of the fourth lens L4 has a shape having a positive power near the optical axis and a weaker positive power at the end of the effective diameter in comparison with that near the optical axis. Formation of the object side surface of the fourth lens L4 in such a shape allows satisfactory correction of spherical aberration to be made easily.

Preferably, the image side surface of the fourth lens L4 is an aspherical surface. Preferably, the image side surface of the fourth lens L4 has a shape having a positive power near the optical axis and a stronger positive power at the end of the effective diameter in comparison with that near the optical axis. Formation of the image side surface of the fourth lens L4 in such a shape allows satisfactory correction of astigmatism to be made easily.

Preferably, the object side surface of the fifth lens L5 is an aspherical surface. Preferably, the object side surface of the fifth lens L5 has a shape having a positive power near the optical axis and a weaker positive power at the end of the effective diameter in comparison with that near the optical axis. Formation of the object side surface of the fifth lens L5 in such a shape allows satisfactory correction of spherical aberration and astigmatism to be made easily.

Preferably, the image side surface of the fifth lens L5 is an aspherical surface. Preferably, the image side surface of the fifth lens L5 has a shape having a positive power near the optical axis and a weaker positive power at the end of the effective diameter in comparison with that near the optical axis. Formation of the image side surface of the fifth lens L5 in such a shape allows satisfactory correction of spherical aberration and astigmatism to be made easily.

Preferably, the object side surface of the sixth lens L6 is an aspherical surface. Preferably, the object side surface of the sixth lens L6 has a shape having a negative power near the optical axis and a stronger negative power at the end of the effective diameter in comparison with that near the optical axis. Formation of the object side surface of the sixth lens L6 in such a shape allows satisfactory correction of spherical aberration and astigmatism to be made easily.

Preferably, the image side surface of the sixth lens L6 is an aspherical surface. The image side surface of the sixth lens L6 may have a shape having a positive power near the optical axis and a weaker positive power at the end of the effective diameter in comparison with that near the optical axis. Formation of the image side surface of the sixth lens L6 in such a shape allows satisfactory correction of spherical aberration and astigmatism to be made easily.

The term "effective diameter of a surface" as used herein refers to the diameter of a circle formed of outermost points (most remote points from the optical axis) in a diameter direction where all rays contributing to imaging intersect with the lens surface, and the term "end of the effective diameter" as used herein refers to the outermost points. For example, if the lens system is used in combination with an image sensor, the effective diameter may be determined based on the imaging surface of the image sensor. For a system in which the imaging surface is rectangular and the optical axis of the system passes through the intersection of the two diagonal lines of the imaging surface, the effective diameter may be determined by considering ½ of the diagonal line as the maximum image height.

The power at a point on a surface other than on the optical axis is defined by considering a normal line of the surface passing through the point, and determining whether the intersection between the normal line and the optical axis (hereinafter, the intersection between the normal line and the optical axis) is located on the object side or on the image side in comparison with the intersection between the surface and the optical axis (hereinafter, the intersection between the surface and the optical axis). In the case in which the lens surface is an object side surface, if the intersection between the normal line and the optical axis is located on the image side of the intersection between the surface and the optical axis, the power at the point is positive, while if the intersection between the normal line and the optical axis is located on the object side of the intersection between the surface and the optical axis, the power at the point is negative. In the case in which the lens surface is an image side surface, if the intersection between the normal line and the optical axis is located on the object side of the intersection between the surface and the optical axis, the power at the point is positive, while if the intersection between the normal line and the optical axis is located on the image side of the intersection between the surface and the optical axis, the power at the point is negative.

In the example illustrated in FIG. 1, all of the lenses are single lenses. In this way, all of the lenses of a lens system may be non-cemented lenses. For example, if the imaging lens is used as a vehicle-mounted lens, high heat resistance and high environment resistance are required for the lens system. If a cemented lens is used, a special cementing agent may possibly be used for enhancing the heat resistance and environment resistance depending on the conditions, resulting in high cost due to such processing for enhancing the environment resistance. In such a case, all of the first lens L1 to the sixth lens L6 may be single lenses.

But, mutual cementing of lenses allows axial misalignment between the lenses to be minimized, thereby contributing to secure favorable performance. Therefore, the lens system may be formed to include a cemented lens if the cementing agent does not cause any problem. For example, the third lens L3 and the fourth lens L4 may be cemented or the fifth lens L5 and the sixth lens L6 may be cemented, or the two sets of the cemented lenses may be included in the lens system at the same time.

In the imaging lens 1 of the present invention, the aperture stop St which is a stop that determines the F-number of the lens system is preferably disposed on the object side of the image side surface of the fourth lens L4. This allows the aperture diameter of the first lens L1 to be reduced easily, whereby the lens system may be downsized easily. For example, if the imaging lens 1 is used in a vehicle camera, only a small portion of the lens is allowed to be exposed to the outside in order not to impair the appearance. Further, the disposition of the aperture stop St on the object side of the image side surface of the fourth lens L4 allows the angle of a peripheral ray incident on the image sensor to be prevented easily from increasing, whereby shading may be prevented easily.

The aperture stop St is more preferably disposed on the object side of the image side surface of the third lens L3. This allows the aperture diameter of the first lens L1 to be further reduced easily. Further, the aperture stop St is preferably disposed on the image side of the object side surface of the second lens L2. This allows the lens diameter of the fifth lens L5 to be reduced easily. In particular, the aperture stop St is preferably disposed between the object side surface of the third lens L3 and the object side surface of the second lens L2. This allows the lens diameters of the first lens L1 to the fifth lens L5 to be balanced easily, whereby the diameter of the entire lens may be downsized easily.

Preferably, the material of the first lens L1 is glass. For example, in a case in which the imaging lens 1 is used in severe environments such as, for example, in a vehicle camera or in a surveillance camera, a material which is resistant to surface degradation by wind and rain, temperature change by direct sunlight, and chemicals, such as grease, detergent, and the like, that is, a material which is highly resistant to moistures, weathers, acids, chemicals, and the like is required for the first lens L1 which is disposed on the most object side. Further, the use of a hard and less breakable material may sometimes be required. These requirements may be satisfied by the used of glass as the material of the first lens L1. Further, transparent ceramics may be used as the material of the first lens L1.

In order to make a high environment resistant optical system, materials of all of the lenses are preferably glass. For example, if the imaging lens 1 is used in a surveillance camera or in a vehicle camera, the optical system may possibly be used under various conditions such as, for example, under a wide temperature range from a low temperature of open air in a cold weather region to a high temperature inside a vehicle in summer in a tropical region, or under high humidity. In order to make an optical system which is highly resistant to these conditions, the materials of all of the lenses are preferably glass.

Preferably, the material of the second lens L2 is glass. The use of glass for the second lens L2 allows the refractive index of the material of the second lens L2 to be increased easily, whereby field curvature may be corrected easily.

Note that plastic may be used as the material of any of the first lens L1 to the sixth lens L6. Preferably, plastic is used, in particular, as the material of any one of the third lens L3 to the sixth lens L6 or of any combination of the lenses. In this way, if a lens made of plastic is formed as an aspherical lens, the aspherical lens may be produced inexpensively and highly accurately, so that various aberrations may be corrected satisfactorily, while suppressing the lens cost.

As for plastic materials, for example, acrylic, polyolefin materials, polycarbonate materials, epoxy resins, PET (Polyethylene Terephthalate), PES (Poly Ether Sulphone), and polyester materials may be used. Further, a so-called nano-composite material which is a plastic mixed with particles smaller than a wavelength of light may be used.

Depending on the intended use of the imaging lens 1, a filter that transmits or reflects a specific wavelength region, such as an UV filter, an IR filter, or the like, may be inserted between the lens system and the image sensor 5 or between each lens. Otherwise, a coating having identical characteristics to those of the filter described above may be applied to a lens surface of any of the lenses. Further, a material that absorbs ultraviolet light, blue light, infrared light, or the like may be used as the material of any of the lenses.

Note that a light beam passing the outside of the effective diameter between each lens may reach the image plane as stray light and may become a ghost. Therefore, a light shielding member that shields the stray light is preferably provided. The light shielding member may be, for example, an opaque coating material or an opaque plate material applied to a portion outside the effective diameter of a lens. The light shielding member may be disposed between any of the lenses, as required. Otherwise, a something like a hood may be provided on the object side of the first lens L1 for shielding the stray light. FIG. 1 illustrates an example in which shielding members 11 and 12 are provided outside the effective diameters of the image side surfaces of the first lens L1 and the third lens L3 respectively. Note that the place where the shielding member can be provided is not limited to the example shown in FIG. 1 and the shielding member may be disposed on other lenses or between lenses.

Further, a member such as, for example, a stop that shields peripheral rays within a degree that causes no practical problem in relative illumination may be disposed between each lens. Such a member may improve the image quality at a peripheral region of the imaging area.

The aforementioned preferable configurations may be combined in any way and are preferably selected, as appropriate, according to the specifications required for the imaging lens 1. Proper selection of a preferable configuration allows an optical system having more satisfactory optical performance and being capable of meeting higher specifications to be realized.

[Combination Examples of Conditional Expressions and their Operations and Effects]

Here, in the present embodiment, four preferable configuration examples considering the conditional expressions described above and their effects will be described.

The first configuration example substantially consists of six lenses, composed of a first lens L1 having a negative refractive power, a second lens L2 having a positive refractive power, a third lens L3 having a negative refractive power, a fourth lens L4 having a positive refractive power, a fifth lens L5 having a positive refractive power, and a sixth lens L6 having a negative refractive power, disposed in order from the object side, and satisfies the conditional expressions (1), (2), and (3-3) given below:

$$1.0 < (Db12 + D3)/f \tag{1}$$

$$f2/f < 1.68 \tag{2}$$

$$1.1 < (R1f + R1r)/(R1f - R1r) < 2.2 \tag{3-3}$$

According to the first configuration example, the lens system is advantageous for increasing the angle of view, excellent in correcting astigmatism and distortion satisfactorily, and may obtain a high resolution image from the center of the image to the periphery, while being configured compact with a relatively small number of lenses of six lenses.

The second configuration example substantially consists of six lenses, composed of a first lens L1 having a negative refractive power, a second lens L2 having a positive refractive power, a third lens L3 having a negative refractive power, a fourth lens L4 having a positive refractive power, a fifth lens L5 having a positive refractive power, and a sixth lens L6 having a negative refractive power, disposed in order from the object side, and satisfies the conditional expressions (3-4), (4), (5) and (6) given below:

$$1.1 < (R1f + R1r)/(R1f - R1r) < 2.0 \tag{3-4}$$

$$1.6 < f3456/f \tag{4}$$

$$0.0 < f4/f < 2.45 \tag{5}$$

$$vd6 < 30 \tag{6}$$

According to the second configuration example, the lens system is advantageous for increasing the angle of view and capable of ensuring a long back focus and correcting chromatic aberration and spherical aberration satisfactorily, while being configured compact with a relatively small number of lenses of six lenses.

The third configuration example substantially consists of six lenses, composed of a first lens L1 having a negative refractive power, a second lens L2 having a positive refractive power, a third lens L3 having a negative refractive power, a fourth lens L4 having a positive refractive power, a fifth lens L5 having a positive refractive power, and a sixth lens L6 having a negative refractive power, disposed in order from the object side, and satisfies the conditional expressions (6) to (9) given below:

$$0.38 < Db12/f \tag{7}$$

$$f12/f < 2.5 \tag{8}$$

$$f5/f < 5.0 \tag{9}$$

$$vd6 < 30 \tag{6}$$

According to the third configuration example, the lens system is excellent in correcting astigmatism, distortion, and lateral chromatic aberration satisfactorily and may obtain a high resolution image from the center of the image to the periphery, while being configured compact with a relatively small number of lenses of six lenses.

The fourth configuration example substantially consists of six lenses, composed of a first lens L1 having a negative refractive power, a second lens L2 having a positive refractive power, a third lens L3 having a negative refractive power, a fourth lens L4 having a positive refractive power, a fifth lens L5 having a positive refractive power, and a sixth lens L6 having a negative refractive power, disposed in order from the object side, and satisfies the conditional expressions (10) to (12) given below:

$$-0.15 < (R2f + R2r)/(R2f - R2r) \tag{10}$$

$$-2.5 < (R5f + R5r)/(R5f - R5r) < -0.25 \tag{11}$$

$$-4.0 < (R6f + R6r)/(R6f - R6r) \tag{12}$$

According to the fourth configuration example, the lens system is excellent in correcting spherical aberration, astigmatism, and lateral chromatic aberration satisfactorily and may obtain a high resolution image from the center of the image to the periphery, while being configured compact with a relatively small number of lenses of six lenses.

[Numerical Examples of Imaging Lens]

Next, numerical examples of the imaging lens of the present invention will be described. Lens cross-sectional views of imaging lenses of Example 1 to Example 22 are shown in FIGS. 2 to 23 respectively. In FIGS. 2 to 23, the left side of the drawing is the object side and the right side is the image side, and the aperture stop St and the optical member PP are also indicated. The aperture stop St shown in each drawing does not represent the size or the shape but indicates the position on the optical axis Z. In each Example, the symbols Ri and Di (i=1, 2, 3, . . . ) in the lens cross-sectional view correspond to Ri and Di in the lens data to be described herein below.

Tables 1 to 22 show lens data of imaging lenses of Examples 1 to 22 respectively. Basic lens data are shown in the upper left of each table, various types of data are shown in the upper right, and the aspherical surface data are shown in the bottom.

In the basic lens data, the Si column indicates $i^{th}$ surface number in which a number i (i=1, 2, 3, . . . ) is given to each surface in a serially increasing manner toward the image side with the object side surface of the most object side constituent element being taken as the first surface. The Ri column indicates the radius of curvature of $i^{th}$ surface and the Di column indicates the surface distance on the optical axis Z between $i^{th}$ surface and $(i+1)^{th}$ surface. The sign of the radius of curvature is positive if the surface shape is convex on the object side and negative if it is convex on the image side. The Ndj column indicates the refractive index of $j^{th}$ optical element with respect to the d-line (wavelength of 587.6 nm) in which a number j (j=1, 2, 3, . . . ) is given to each optical element in a serially increasing manner toward the image side and the vdj column indicates the Abbe number of $j^{th}$ optical element with respect to the d-line. Note that the basic lens data also include the aperture stop St and the optical member PP. The terms of (St) and (IMG) are included in the rows of the surface number column corresponding to the aperture stop St and image plane Sim respectively in addition to the surface numbers.

In the basic lens data, the mark * is attached to the surface number of an aspherical surface and a numerical value of the paraxial radius of curvature is indicated as the radius of curvature of the aspherical surface. The aspherical surface coefficient table indicates the surface numbers of aspherical surfaces and aspherical surface coefficients of each aspherical surface. The numerical value "E-n" (n: integer) in an aspherical surface coefficient refers to "×10$^{-n}$". The aspherical surface coefficients are the values of each of coefficients K and $RB_m$ (m=3, 4, 5, . . . , and 10) in an aspherical surface expression represented by a formula given below.

$$Zd = \frac{C \times Y^2}{1 + \sqrt{1 - K \times C^2 \times Y^2}} + \sum_m RB_m Y^m$$

where:
Zd: depth of aspheric surface (length of vertical line from a point on the aspheric surface at a height Y to a flat surface orthogonal to the optical axis to which the aspherical surface vertex contacts)
Y: height (distance from the optical axis to lens surface)
C: paraxial curvature
K, $RB_m$: aspherical surface coefficients (m=3, 4, 5, . . . , and 10).

In the various types of data, L (in Air) represents the distance on the optical axis Z from the object side surface of the first lens L1 to the image plane Sim (air equivalent length for the back focus portion), Bf (in Air) represents the distance on the optical axis from the image side surface of the most image side lens to the image plane Sim (corresponding to the back focus in terms of air equivalent length), f represents the focal length of the entire system, f1 represents the focal length of the first lens L1, f2 represents the focal length of the second lens L2, f3 represents the focal length of the third lens L3, f4 represents the focal length of the fourth lens L4, f5 represents the focal length of the fifth lens L5, f6 represents the focal length of the sixth lens L6, f12 represents the combined focal length of the first lens L1 and the second lens L2, f56 represents the combined focal length of the fifth lens L5 and the sixth lens L6, and f3456 represents the combined focal length of the third lens L3 to the sixth lens L6.

Tables shown herein indicate values rounded to a predetermined digit. As for the unit of each numerical value, "mm" is used for length. But, this is only an example and other appropriate units may also be used, as optical systems can be used by proportionally enlarged or reduced.

TABLE 1

Example 1

Basic Lens Data

| Si | Ri | Di | Ndj | vdj | Glass |
|---|---|---|---|---|---|
| 1 | 10.5166 | 0.80027 | 1.75500 | 52.3 | S-YGH51 |
| 2 | 2.7793 | 2.47777 | | | |
| 3 | 7.1182 | 3.00020 | 1.80400 | 46.6 | S-LAH55V |
| 4 | −5.8352 | −0.10000 | | | |
| 5(St) | ∞ | 1.18104 | | | |
| 6 * | −4.3129 | 0.70000 | 1.63360 | 23.6 | |
| 7 * | 6.5013 | 0.40004 | | | |
| 8 * | 6.2188 | 1.48887 | 1.53114 | 55.4 | |
| 9 * | −9.7747 | 0.22000 | | | |
| 10 * | 3.7636 | 2.40000 | 1.53114 | 55.4 | |
| 11 * | −9.9245 | 0.70000 | | | |
| 12 | −8.5326 | 0.70000 | 1.84666 | 23.8 | S-TIH53 |
| 13 | ∞ | 0.05000 | | | |
| 14 | ∞ | 1.00000 | 1.51680 | 64.2 | |
| 15 | ∞ | 2.47155 | | | |
| 16(IMG) | ∞ | | | | |

TABLE 1-continued

Example 1

Various Types of Data

| | |
|---|---|
| L(in Air) | 17.1 |
| Bf(in Air) | 3.2 |
| f | 4.56 |
| f1 | −5.24 |
| f2 | 4.45 |
| f3 | −3.99 |
| f4 | 7.39 |
| f5 | 5.47 |
| f6 | −10.08 |
| f12 | 5.66 |
| f56 | 8.46 |
| f3456 | 15.11 |

Aspherical Surface Coefficient

| Si | K | RB3 | RB4 | RB5 | RB6 |
|---|---|---|---|---|---|
| 6 | 1.0000000E+00 | 1.5944206E−03 | −2.6956458E−02 | 1.0285745E−02 | 8.0445005E−03 |
| 7 | 0.0000000E+00 | −6.4237063E−03 | −2.2133015E−02 | 4.6318394E−04 | 1.2358985E−02 |
| 8 | 1.0000000E+00 | 0.0000000E+00 | 1.0245133E−03 | 0.0000000E+00 | 0.0000000E+00 |
| 9 | 1.0000000E+00 | 0.0000000E+00 | 8.2044733E−04 | 0.0000000E+00 | 0.0000000E+00 |
| 10 | 0.0000000E+00 | 2.8404966E−03 | −1.2699191E−02 | 6.0076873E−03 | −2.3047414E−03 |
| 11 | 1.0000000E+00 | 1.4811363E−02 | −1.6431627E−02 | 1.2073124E−02 | −3.9510643E−03 |

| Si | RB7 | RB8 | RB9 | RB10 |
|---|---|---|---|---|
| 6 | −5.3518994E−03 | 8.3972205E−04 | 0.0000000E+00 | 0.0000000E+00 |
| 7 | −5.7988200E−03 | 6.9811630E−04 | 7.7273291E−05 | −1.4400348E−05 |
| 8 | 0.0000000E+00 | 0.0000000E+00 | 0.0000000E+00 | 0.0000000E+00 |
| 9 | 0.0000000E+00 | 0.0000000E+00 | 0.0000000E+00 | 0.0000000E+00 |
| 10 | 6.1149115E−04 | −7.8965766E−05 | 0.0000000E+00 | 0.0000000E+00 |
| 11 | 4.9406085E−04 | 6.8508257E−05 | 0.0000000E+00 | 0.0000000E+00 |

TABLE 2

Example 2

Basic Lens Data

| Si | Ri | Di | Ndj | vdj | Glass |
|---|---|---|---|---|---|
| 1 | 16.0069 | 0.80007 | 1.58913 | 61.1 | S-BAL35 |
| 2 | 2.7182 | 2.05730 | | | |
| 3 | 10.3335 | 4.26649 | 1.80400 | 46.6 | S-LAH65V |
| 4 | −5.1359 | −0.10000 | | | |
| 5(St) | ∞ | 1.50674 | | | |
| 6 * | −7.2330 | 0.75000 | 1.63360 | 23.6 | |
| 7 * | 3.8299 | 0.40000 | | | |
| 8 * | 4.9035 | 2.50000 | 1.53114 | 55.4 | |
| 9 * | −10.3465 | 0.22000 | | | |
| 10 * | 3.4476 | 1.80006 | 1.53114 | 55.4 | |
| 11 * | −535.1310 | 0.70000 | | | |
| 12 | −16.6369 | 0.90008 | 1.84666 | 23.8 | S-TIH53 |
| 13 | ∞ | 0.05000 | | | |
| 14 | ∞ | 1.00000 | 1.51680 | 64.2 | |
| 15 | ∞ | 2.61461 | | | |
| 16(IMG) | ∞ | | | | |

Various Types of Data

| | |
|---|---|
| L(in Air) | 19.1 |
| Bf(in Air) | 3.3 |
| f | 4.56 |
| f1 | −5.68 |
| f2 | 4.87 |
| f3 | −3.85 |
| f4 | 6.64 |
| f5 | 6.46 |
| f6 | −19.65 |
| f12 | 6.05 |
| f56 | 8.42 |
| f3456 | 10.87 |

TABLE 2-continued

Example 2

Aspherical Surface Coefficient

| Si | K | RB3 | RB4 | RB5 | RB6 |
|---|---|---|---|---|---|
| 6 | 1.0000000E+00 | 4.5799028E-03 | -3.7035867E-02 | 2.4720952E-03 | 1.7250243E-02 |
| 7 | 0.0000000E+00 | -6.6492821E-04 | -4.2272515E-02 | 1.0027804E-02 | 9.1877043E-03 |
| 8 | 1.0000000E+00 | 0.0000000E+00 | -3.5213113E-03 | 0.0000000E+00 | 0.0000000E+00 |
| 9 | 1.0000000E+00 | 0.0000000E+00 | -3.4699256E-03 | 0.0000000E+00 | 0.0000000E+00 |
| 10 | 0.0000000E+00 | 6.8625524E-03 | -1.0977517E-02 | 3.7818998E-03 | -7.8649204E-06 |
| 11 | 1.0000000E+00 | 2.3653613E-02 | -2.4183039E-02 | 1.8627470E-02 | -5.6266320E-03 |

| Si | RB7 | RB8 | RB9 | RB10 |
|---|---|---|---|---|
| 6 | -9.0086453E-03 | 1.3915523E-03 | 0.0000000E+00 | 0.0000000E+00 |
| 7 | -5.2056582E-03 | 6.7816127E-04 | 7.7273291E-05 | -1.4400348E-05 |
| 8 | 0.0000000E+00 | 0.0000000E+00 | 0.0000000E+00 | 0.0000000E+00 |
| 9 | 0.0000000E+00 | 0.0000000E+00 | 0.0000000E+00 | 0.0000000E+00 |
| 10 | -3.3680932E-04 | 5.6035090E-05 | 0.0000000E+00 | 0.0000000E+00 |
| 11 | 4.5458382E-04 | 4.3434307E-05 | 0.0000000E+00 | 0.0000000E+00 |

TABLE 3

Example 3

Basic Lens Data

| Si | Ri | Di | Ndj | vdj | Glass |
|---|---|---|---|---|---|
| 1 | 13.9661 | 0.80018 | 1.58913 | 61.1 | S-BAL35 |
| 2 | 2.8193 | 2.56969 | | | |
| 3 | 8.6404 | 3.00002 | 1.83481 | 42.7 | S-LAH55V |
| 4 | -5.8697 | -0.10000 | | | |
| 5(St) | ∞ | 1.26279 | | | |
| 6 * | -5.4410 | 0.70000 | 1.63360 | 23.6 | |
| 7 * | 4.0553 | 0.40002 | | | |
| 8 * | 5.0298 | 2.26274 | 1.53114 | 55.4 | |
| 9 * | -6.1814 | 0.19103 | | | |
| 10 * | 4.1583 | 1.89836 | 1.53114 | 55.4 | |
| 11 * | -36.0531 | 0.62096 | | | |
| 12 | -13.0947 | 0.80000 | 1.84666 | 23.8 | S-TIH53 |
| 13 | ∞ | 0.05000 | | | |
| 14 | ∞ | 1.08000 | 1.51680 | 64.2 | |
| 15 | ∞ | 2.55039 | | | |
| 16(IMG) | ∞ | | | | |

Various Types of Data

| | |
|---|---|
| L(in Air) | 17.7 |
| Bf(in Air) | 3.3 |
| f | 4.56 |
| f1 | -6.16 |
| f2 | 4.62 |
| f3 | -3.57 |
| f4 | 5.61 |
| f5 | 7.14 |
| f6 | -15.47 |
| f12 | 5.64 |
| f56 | 10.95 |
| f3456 | 11.58 |

Aspherical Surface Coefficient

| Si | K | RB3 | RB4 | RB5 | RB6 |
|---|---|---|---|---|---|
| 6 | 1.0000000E+00 | 4.1205753E-03 | -4.1033987E-02 | 1.1257979E-02 | 1.1541728E-02 |
| 7 | 0.0000000E+00 | -4.0196132E-03 | -3.6346745E-02 | 5.3976885E-03 | 1.1965596E-02 |
| 8 | 1.0000000E+00 | 0.0000000E+00 | -7.4793868E-04 | 0.0000000E+00 | 0.0000000E+00 |
| 9 | 1.0000000E+00 | 0.0000000E+00 | 3.4687943E-03 | 0.0000000E+00 | 0.0000000E+00 |
| 10 | 0.0000000E+00 | 1.8101083E-03 | -5.5738647E-03 | 3.8824016E-03 | -1.6419975E-03 |
| 11 | 1.0000000E+00 | 1.3765815E-02 | -1.8868158E-02 | 1.3515484E-02 | -4.2771349E-03 |

| Si | RB7 | RB8 | RB9 | RB10 |
|---|---|---|---|---|
| 6 | -7.1107134E-03 | 1.1363212E-03 | 0.0000000E+00 | 0.0000000E+00 |
| 7 | -6.1242733E-03 | 7.7604204E-04 | 7.7273291E-05 | -1.4400348E-05 |

TABLE 3-continued

Example 3

| | | | | |
|---|---|---|---|---|
| 8 | 0.0000000E+00 | 0.0000000E+00 | 0.0000000E+00 | 0.0000000E+00 |
| 9 | 0.0000000E+00 | 0.0000000E+00 | 0.0000000E+00 | 0.0000000E+00 |
| 10 | 3.0038730E−04 | −1.9493057E−05 | 0.0000000E+00 | 0.0000000E+00 |
| 11 | 5.1301486E−04 | 7.5647934E−06 | 0.0000000E+00 | 0.0000000E+00 |

TABLE 4

Example 4

Basic Lens Data

| Si | Ri | Di | Ndj | vdj | Glass |
|---|---|---|---|---|---|
| 1 | 18.9973 | 0.90000 | 1.75500 | 52.3 | S-YGH51 |
| 2 | 3.7393 | 2.79978 | | | |
| 3 | 8.3494 | 3.80004 | 1.83481 | 42.7 | S-LAH55V |
| 4 | −7.7315 | 0.20000 | | | |
| 5(St) | ∞ | 0.80018 | | | |
| 6 * | −4.7516 | 1.27018 | 1.64200 | 22.0 | |
| 7 * | 166.8241 | 2.00000 | 1.53391 | 55.9 | |
| 8 * | −3.8513 | 0.22002 | | | |
| 9 * | 8.0730 | 2.94120 | 1.53391 | 55.9 | |
| 10 * | −4.5384 | 1.10002 | 1.64200 | 22.0 | |
| 11 | 29.9978 | 0.10000 | | | |
| 12 | ∞ | 1.00000 | 1.51680 | 64.2 | |
| 13 | ∞ | 2.76917 | | | |
| 14(IMG) | ∞ | 0.00000 | | | |

Various Types of Data

| | |
|---|---|
| L(in Air) | 19.6 |
| Bf(in Air) | 3.5 |
| f | 4.80 |
| f1 | −6.33 |
| f2 | 5.39 |
| f3 | −7.18 |
| f4 | 7.08 |
| f5 | 5.92 |
| f6 | −6.06 |
| f12 | 7.08 |
| f56 | 36.63 |
| f3456 | 12.37 |

Aspherical Surface Coefficient

| Si | K | RB3 | RB4 | RB5 | RB6 |
|---|---|---|---|---|---|
| 6 | 0.0000000E+00 | −3.8594121E−04 | −4.3518574E−03 | 3.1073592E−04 | 6.9542519E−05 |
| 7 | −3.1504000E+00 | −1.3887809E−02 | −8.8411041E−03 | 5.3214188E−05 | −4.2423141E−04 |
| 8 | 1.0000000E+00 | 0.0000000E+00 | 1.5011525E−03 | 0.0000000E+00 | 0.0000000E+00 |
| 9 | 0.0000000E+00 | −2.0232873E−03 | 1.3362412E−03 | −2.8778408E−03 | 1.5063517E−03 |
| 10 | 0.0000000E+00 | −1.9079291E−02 | 3.4003563E−02 | −1.8357425E−02 | 6.1921395E−03 |

| Si | RB7 | RB8 | RB9 | RB10 |
|---|---|---|---|---|
| 6 | 7.2939330E−06 | 3.7845918E−05 | 1.9301682E−05 | −1.2575834E−05 |
| 7 | 1.2052383E−03 | 5.1109027E−04 | −3.0708602E−04 | 2.7449176E−04 |
| 8 | 0.0000000E+00 | 0.0000000E+00 | 0.0000000E+00 | 0.0000000E+00 |
| 9 | −3.7590158E−04 | 5.0019241E−05 | 0.0000000E+00 | 0.0000000E+00 |
| 10 | −1.3201558E−03 | 6.2702021E−06 | 0.0000000E+00 | 0.0000000E+00 |

TABLE 5

Example 5

Basic Lens Data

| Si | Ri | Di | Ndj | vdj | Glass |
|---|---|---|---|---|---|
| 1 | 18.9955 | 0.90000 | 1.75500 | 523 | S-YGH51 |
| 2 | 3.6551 | 2.79976 | | | |
| 3 | 7.9209 | 3.80004 | 1.83481 | 427 | S-LAH55V |
| 4 | −7.8101 | 0.20000 | | | |

TABLE 5-continued

| Example 5 | | | | |
|---|---|---|---|---|
| 5(St) | ∞ | 0.80010 | | |
| 6 * | −4.8193 | 1.27050 | 1.63360 | 23.6 |
| 7 * | 131.9058 | 2.00000 | 1.53114 | 55.4 |
| 8 * | −4.2259 | 0.22002 | | |
| 9 * | 6.9079 | 2.85495 | 1.53114 | 55.4 |
| 10 * | −3.8300 | 1.10002 | 1.63360 | 23.6 |
| 11 | 29.9979 | 1.00000 | | |
| 12 | ∞ | 1.00000 | 1.51680 | 64.2 |
| 13 | ∞ | 1.86903 | | |
| 14(IMG) | ∞ | | | |

Various Types of Data

| | |
|---|---|
| L(in Air) | 19.5 |
| Bf(in Air) | 3.5 |
| f | 4.82 |
| f1 | −6.15 |
| f2 | 5.29 |
| f3 | −7.31 |
| f4 | 7.75 |
| f5 | 5.11 |
| f6 | −5.29 |
| f12 | 6.92 |
| f56 | 27.29 |
| f3456 | 12.93 |

Aspherical Surface Coefficient

| Si | K | RB3 | RB4 | RB5 | RB6 |
|---|---|---|---|---|---|
| 6 | 0.0000000E+00 | −9.5471146E−04 | −2.9092858E−03 | −5.5037828E−04 | 2.9282939E−04 |
| 7 | −3.1504000E+00 | −1.6904817E−02 | −9.9659199E−03 | −1.2175942E−03 | 7.3771743E−04 |
| 8 | 1.0000000E+00 | 0.0000000E+00 | 5.6374772E−04 | 0.0000000E+00 | 0.0000000E+00 |
| 9 | 0.0000000E+00 | −9.0740695E−04 | −9.2729786E−04 | −2.1192793E−03 | 1.4498944E−03 |
| 10 | 0.0000000E+00 | −2.4351784E−02 | 3.6806225E−02 | −1.8341991E−02 | 5.8708690E−03 |

| Si | RB7 | RB8 | RB9 | RB10 |
|---|---|---|---|---|
| 6 | 1.6364959E−04 | 4.2920124E−06 | −2.0140100E−05 | −6.5075978E−07 |
| 7 | 1.3364769E−03 | 4.0298565E−04 | −3.4438961E−04 | 3.9939404E−05 |
| 8 | 0.0000000E+00 | 0.0000000E+00 | 0.0000000E+00 | 0.0000000E+00 |
| 9 | −4.1873995E−04 | 5.7840005E−05 | 0.0000000E+00 | 0.0000000E+00 |
| 10 | −1.1283225E−03 | 3.9903254E−05 | 0.0000000E+00 | 0.0000000E+00 |

TABLE 6

| Example 6 | | | | | |
|---|---|---|---|---|---|
| Basic Lens Data | | | | | |
| Si | Ri | Di | Ndj | vdj | Glass |
| 1 | 20.0002 | 1.50000 | 1.77250 | 49.6 | S-LAH66 |
| 2 | 3.3452 | 1.90000 | | | |
| 3 | 7.1051 | 4.10001 | 1.83481 | 42.7 | S-LAH55V |
| 4 | −6.8837 | 0.85720 | | | |
| 5 * | 6.1290 | 0.75000 | 1.63360 | 23.6 | |
| 6 * | 2.2200 | 0.80000 | | | |
| 7(St) | ∞ | 0.20000 | | | |
| 8 * | −80.2669 | 1.80000 | 1.53391 | 55.9 | |
| 9 * | −4.7000 | 0.22000 | | | |
| 10 * | 4.2000 | 2.00000 | 1.53391 | 55.9 | |
| 11 | −324.0776 | 0.75000 | | | |
| 12 | −12.8347 | 0.80001 | 1.63360 | 23.6 | |
| 13 | ∞ | 2.50000 | | | |
| 14 | ∞ | 1.00000 | 1.51680 | 64.2 | |
| 15 | ∞ | 0.10729 | | | |
| 16(IMG) | ∞ | | | | |

Various Types of Data

| | |
|---|---|
| L(in Air) | 18.94 |
| Bf(in Air) | 3.27 |
| f | 4.91 |
| f1 | −5.41 |

TABLE 6-continued

| Example 6 | |
|---|---|
| f2 | 4.83 |
| f3 | −5.94 |
| f4 | 9.27 |
| f5 | 7.78 |
| f6 | −20.26 |
| f12 | 7.24 |
| f56 | 10.86 |
| f3456 | 10.52 |

Aspherical Surface Coefficient

| Si | K | RB3 | RB4 | RB5 | RB6 |
|---|---|---|---|---|---|
| 5 | 0.0000000E+00 | 3.4169763E−03 | −3.1714421E−02 | 1.8670079E−03 | 7.8590908E−04 |
| 6 | 0.0000000E+00 | −4.3147650E−04 | −2.3504837E−02 | −2.6845101E−03 | 2.7407621E−03 |
| 8 | −3.1504000E+00 | −3.9379912E−03 | 2.0273355E−02 | −5.3380333E−03 | −6.2987865E−04 |
| 9 | 1.0000000E+00 | 0.0000000E+00 | −8.8712382E−04 | 0.0000000E+00 | 0.0000000E+00 |
| 10 | 0.0000000E+00 | −6.8965972E−04 | −3.1259434E−03 | 4.8497297E−04 | 3.8438976E−05 |

| Si | RB7 | RB8 | RB9 | RB10 |
|---|---|---|---|---|
| 5 | 6.1665728E−04 | 1.1908016E−04 | −1.8895778E−04 | 2.6719614E−05 |
| 6 | 1.2946184E−03 | −6.3138359E−04 | 7.7273291E−05 | −1.4400348E−05 |
| 8 | 4.1133278E−04 | 5.5085265E−05 | −4.2957010E−05 | 4.5328967E−06 |
| 9 | 0.0000000E+00 | 0.0000000E+00 | 0.0000000E+00 | 0.0000000E+00 |
| 10 | 3.0339594E−05 | −1.2363358E−05 | 0.0000000E+00 | 0.0000000E+00 |

TABLE 7

| Example 7 | | | | | |
|---|---|---|---|---|---|
| Basic Lens Data | | | | | |
| Si | Ri | Di | Ndj | vdj | Glass |
| 1 | 20.4220 | 1.50000 | 1.77250 | 49.6 | S-LAH66 |
| 2 | 3.1972 | 1.90000 | | | |
| 3 | 6.6724 | 4.10001 | 1.80400 | 46.6 | S-LAH65V |
| 4 | −6.4391 | −0.10000 | | | |
| 5(St) | ∞ | 1.28207 | | | |
| 6 * | 17.0428 | 0.75000 | 1.63360 | 23.6 | |
| 7 * | 3.1446 | 0.58006 | | | |
| 8 * | −14.9007 | 1.80000 | 1.53391 | 55.9 | |
| 9 * | −4.7000 | 0.22000 | | | |
| 10 * | 4.2000 | 2.00000 | 1.53391 | 55.9 | |
| 11 | −11.4732 | 0.75000 | | | |
| 12 | −7.9596 | 0.80001 | 1.63360 | 23.6 | |
| 13 | ∞ | 3.00000 | | | |
| 14 | ∞ | 0.40000 | 1.51680 | 64.2 | |
| 15 | ∞ | 0.10325 | | | |
| 16(IMG) | ∞ | | | | |

Various Types of Data

| | |
|---|---|
| L(in Air) | 18.9 |
| Bf(in Air) | 3.4 |
| f | 4.88 |
| f1 | −5.10 |
| f2 | 4.74 |
| f3 | −6.22 |
| f4 | 12.11 |
| f5 | 6.03 |
| f6 | −12.56 |
| f12 | 7.01 |
| f56 | 9.14 |
| f3456 | 11.23 |

Aspherical Surface Coefficient

| Si | K | RB3 | RB4 | RB5 | RB6 |
|---|---|---|---|---|---|
| 6 | 0.0000000E+00 | 2.3480524E−03 | −3.1516276E−02 | 5.1931369E−03 | 1.2600088E−03 |
| 7 | 0.0000000E+00 | 2.9895114E−03 | −2.4702888E−02 | 2.3815738E−03 | 1.6772979E−03 |
| 8 | −3.1504000E+00 | 9.0075685E−04 | 1.4312690E−02 | −1.2929751E−03 | −1.4129453E−03 |

TABLE 7-continued

Example 7

| | | | | | |
|---|---|---|---|---|---|
| 9 | 1.0000000E+00 | 0.0000000E+00 | −9.9493303E−04 | 0.0000000E+00 | 0.0000000E+00 |
| 10 | 0.0000000E+00 | −2.9819624E−04 | −4.0093663E−03 | 4.6496668E−04 | 4.5356297E−04 |

| Si | RB7 | RB8 | RB9 | RB10 |
|---|---|---|---|---|
| 6 | −1.0176262E−03 | 5.3581872E−05 | 2.5287130E−04 | −7.7816986E−05 |
| 7 | 7.5498206E−05 | −2.0936224E−04 | 7.7273291E−05 | −1.4400348E−06 |
| 8 | −2.7112350E−04 | 1.5299819E−04 | 1.1064123E−04 | −3.2827752E−05 |
| 9 | 0.0000000E+00 | 0.0000000E+00 | 0.0000000E+00 | 0.0000000E+00 |
| 10 | −1.4998712E−04 | 1.4513250E−05 | 0.0000000E+00 | 0.0000000E+00 |

TABLE 8

Example 8

Basic Lens Data

| Si | Ri | Di | Ndj | νdj | Glass |
|---|---|---|---|---|---|
| 1 | 18.9746 | 0.90003 | 1.75500 | 52.3 | S-YGH51 |
| 2 | 3.6500 | 2.65514 | | | |
| 3 | 8.7989 | 4.52000 | 1.83481 | 42.7 | S-LAH55V |
| 4 | −7.3926 | 0.20003 | | | |
| 5(St) | ∞ | 0.80000 | | | |
| 6 * | −25.8058 | 0.80000 | 1.61400 | 25.5 | |
| 7 * | 3.7433 | 0.47001 | | | |
| 8 * | 3.12579 | 1.70000 | 1.51103 | 55.2 | |
| 9 * | −4.1022 | 0.22000 | | | |
| 10 * | 4.7307 | 1.70000 | 1.51103 | 55.2 | |
| 11 | −97.9996 | 1.10000 | | | |
| 12 * | −11.6006 | 1.10000 | 1.61400 | 25.5 | |
| 13 | ∞ | 0.10000 | | | |
| 14 | ∞ | 1.00000 | 1.51680 | 64.2 | |
| 15 | ∞ | 2.65493 | | | |
| 16(IMG) | ∞ | | | | |

Various Types of Data

| | |
|---|---|
| L(in Air) | 19.6 |
| Bf(in Air) | 3.4 |
| f | 4.79 |
| f1 | −6.14 |
| f2 | 5.51 |
| f3 | −5.27 |
| f4 | 7.21 |
| f5 | 8.88 |
| f6 | −18.89 |
| f12 | 7.21 |
| f56 | 13.76 |
| f3456 | 12.12 |

Aspherical Surface Coefficient

| Si | K | RB3 | RB4 | RB5 | RB6 |
|---|---|---|---|---|---|
| 6 | 0.0000000E+00 | −1.4612717E−08 | −2.9209012E−02 | 1.2578868E−02 | −7.6511154E−03 |
| 7 | 0.0000000E+00 | −1.3381019E−02 | −5.2170358E−03 | −8.3306447E−03 | 3.2679761E−03 |
| 8 | −3.1504000E+00 | −7.3062824E−03 | 1.6503448E−02 | −2.1360089E−03 | −2.1348492E−03 |
| 9 | 1.0000000E+00 | 0.0000000E+00 | 2.2496694E−03 | 0.0000000E+00 | 0.0000000E+00 |
| 10 | 0.0000000E+00 | 2.4619901E−03 | −4.7700202E−04 | −1.8454994E−03 | 1.5712771E−03 |
| 12 | 0.0000000E+00 | −1.6503018E−02 | 2.0090816E−02 | −1.5092578E−02 | 6.0489538E−03 |

| Si | RB7 | RB8 | RB9 | RB10 |
|---|---|---|---|---|
| 6 | 2.0287432E−03 | 1.3492612E−03 | −7.6244262E−04 | 9.4359405E−05 |
| 7 | 6.8167341E−04 | −4.0244547E−04 | 7.7273291E−05 | −1.4400348E−05 |
| 8 | −2.1950312E−04 | 3.1275634E−04 | 5.8970861E−05 | −3.0108743E−05 |
| 9 | 0.0000000E+00 | 0.0000000E+00 | 0.0000000E+00 | 0.0000000E+00 |
| 10 | −5.1806677E−04 | 6.8150196E−05 | 0.0000000E+00 | 0.0000000E+00 |
| 12 | −1.3016842E−03 | 1.1171704E−04 | 0.0000000E+00 | 0.0000000E+00 |

TABLE 9

Example 9

Basic Lens Data

| Si | Ri | Di | Ndj | vdj | Glass |
|---|---|---|---|---|---|
| 1 | 21.0002 | 0.90000 | 1.75500 | 52.3 | S-YGH51 |
| 2 | 3.3130 | 2.55374 | | | |
| 3 | 10.6418 | 4.16000 | 1.83481 | 42.7 | S-LAH55V |
| 4 | −6.5668 | 0.20000 | | | |
| 5(St) | ∞ | 0.81929 | | | |
| 6 * | 28.6024 | 0.80000 | 1.63360 | 23.6 | |
| 7 * | 3.7998 | 0.48000 | | | |
| 8 * | ∞ | 1.70000 | 1.53114 | 55.4 | |
| 9 * | −5.2000 | 0.22000 | | | |
| 10 * | 4.8000 | 1.80000 | 1.53114 | 55.4 | |
| 11 | −98.1358 | 1.10000 | | | |
| 12 * | −11.9493 | 1.10000 | 1.83360 | 23.6 | |
| 13 | ∞ | 0.10000 | | | |
| 14 | ∞ | 1.00000 | 1.51680 | 64.2 | |
| 15 | ∞ | 2.92185 | | | |
| 16(IMG) | ∞ | | | | |

Various Types of Data

| | |
|---|---|
| L(in Air) | 19.5 |
| Bf(in Air) | 3.7 |
| f | 4.75 |
| f1 | −5.33 |
| f2 | 5.47 |
| f3 | −7.00 |
| f4 | 9.79 |
| f5 | 8.67 |
| f6 | −18.86 |
| f12 | 7.48 |
| f56 | 13.16 |
| f3456 | 13.88 |

Aspherical Surface Coefficient

| Si | K | RB3 | RB4 | RB5 | RB6 |
|---|---|---|---|---|---|
| 6 | 0.0000000E+00 | 3.3716172E−03 | −2.8547855E−02 | 1.1839608E−02 | −8.1818448E−03 |
| 7 | 0.0000000E+00 | −2.4361437E−03 | −4.4602744E−03 | −8.5558468E−03 | 2.8136265E−03 |
| 8 | −3.1504000E+00 | −2.5683041E−03 | 2.0721562E−02 | −2.0523015E−02 | −2.2067308E−03 |
| 9 | 1.0000000E+00 | 0.0000000E+00 | 1.3690215E−03 | 0.0000000E+00 | 0.0000000E+00 |
| 10 | 0.0000000E+00 | 1.1080794E−03 | −1.3678436E−03 | −1.2793983E−03 | 1.2773071E−03 |
| 12 | 0.0000000E+00 | −1.1985746E−02 | 1.5686163E−02 | −1.4711635E−02 | 6.3978343E−03 |

| Si | RB7 | RB8 | RB9 | RB10 |
|---|---|---|---|---|
| 6 | 1.9816399E−03 | 1.4539959E−03 | −8.0185450E−04 | 1.0737593E−04 |
| 7 | 5.9662522E−04 | −3.1800576E−04 | 7.7273291E−05 | −1.4400348E−05 |
| 8 | −1.1891214E−04 | 2.8785780E−04 | 1.5946221E−05 | −1.6044540E−05 |
| 9 | 0.0000000E+00 | 0.0000000E+00 | 0.0000000E+00 | 0.0000000E+00 |
| 10 | −3.8225750E−04 | 4.1791568E−05 | 0.0000000E+00 | 0.0000000E+00 |
| 12 | −1.4966523E−03 | 1.3554089E−04 | 0.0000000E+00 | 0.0000000E+00 |

TABLE 10

Example 10

Basic Lens Data

| Si | Ri | Di | Ndj | vdj | Glass |
|---|---|---|---|---|---|
| 1 | 18.7618 | 0.80027 | 1.58913 | 61.1 | S-BAL35 |
| 2 | 2.7409 | 2.54268 | | | |
| 3 | 8.5466 | 3.00020 | 1.83481 | 42.7 | S-LAH65V |
| 4 | −5.7946 | −0.10000 | | | |
| 5(St) | ∞ | 1.19089 | | | |
| 6* | −4.3427 | 0.70000 | 1.63360 | 23.6 | |
| 7* | 6.2952 | 0.40004 | | | |
| 8* | 5.8772 | 1.72103 | 1.49100 | 57.6 | |
| 9* | −13.2944 | 0.22000 | | | |
| 10* | 3.7588 | 2.40000 | 1.49100 | 57.6 | |
| 11* | −10.1934 | 0.70000 | | | |

TABLE 10-continued

Example 10

| | | | | | |
|---|---|---|---|---|---|
| 12 | −14.7046 | 0.70000 | 1.84666 | 23.8 | S-TIH53 |
| 13 | −98.6031 | 0.05000 | | | |
| 14 | ∞ | 1.00000 | 1.51680 | 64.2 | |
| 15 | ∞ | 3.16500 | | | |
| 16(IMG) | ∞ | | | | |

Various Types of Data

| | |
|---|---|
| L(in Air) | 18.1 |
| Bf(in Air) | 3.9 |
| f | 4.72 |
| f1 | −5.55 |
| f2 | 4.57 |
| f3 | −3.96 |
| f4 | 8.55 |
| f5 | 5.93 |
| f6 | −20.49 |
| f12 | 5.63 |
| f56 | 7.39 |
| f3456 | 13.19 |

Aspherical Surface Coefficient

| Si | K | RB3 | RB4 | RB5 | RB6 |
|---|---|---|---|---|---|
| 6 | 1.0000000E+00 | 1.7387647E−03 | −2.6936635E−02 | 1.0314801E−02 | 8.0652395E−03 |
| 7 | 0.0000000E+00 | −6.4215337E−03 | −2.2108331E−02 | 4.4215554E−04 | 1.2337135E−02 |
| 8 | 1.0000000E+00 | 0.0000000E+00 | 1.3310999E−03 | 0.0000000E+00 | 0.0000000E+00 |
| 9 | 1.0000000E+00 | 0.0000000E+00 | 8.7386537E−04 | 0.0000000E+00 | 0.0000000E+00 |
| 10 | 0.0000000E+00 | 2.6557595E−03 | −1.2984995E−02 | 5.9062280E−03 | −2.3197350E−03 |
| 11 | 1.0000000E+00 | 1.4403434E−02 | −1.6569304E−02 | 1.1971202E−02 | −3.9646144E−03 |

| Si | RB7 | RB8 | RB9 | RB10 |
|---|---|---|---|---|
| 6 | −5.3427611E−03 | 8.4192896E−04 | 0.0000000E+00 | 0.0000000E+00 |
| 7 | −5.8089304E−03 | 6.9882512E−04 | 7.7273291E−05 | −1.4400348E−05 |
| 8 | 0.0000000E+00 | 0.0000000E+00 | 0.0000000E+00 | 0.0000000E+00 |
| 9 | 0.0000000E+00 | 0.0000000E+00 | 0.0000000E+00 | 0.0000000E+00 |
| 10 | 6.1141960E−04 | −9.0084740E−05 | 0.0000000E+00 | 0.0000000E+00 |
| 11 | 4.8708591E−04 | −3.1543440E−06 | 0.0000000E+00 | 0.0000000E+00 |

TABLE 11

Example 11

Basic Lens Data

| Si | Ri | Di | Ndj | νdj | Glass |
|---|---|---|---|---|---|
| 1 | 21.0391 | 0.90000 | 1.75500 | 52.3 | S-YGH51 |
| 2 | 3.6694 | 3.64233 | | | |
| 3 | 8.1091 | 2.50000 | 1.82080 | 42.7 | M-TAFD51 |
| 4 | −8.7420 | 0.25000 | | | |
| 5(St) | ∞ | 0.99982 | | | |
| 6* | −5.0354 | 0.80000 | 1.63360 | 23.6 | |
| 7* | 15.3194 | 0.48000 | | | |
| 8* | 10.8015 | 2.20000 | 1.53114 | 55.4 | |
| 9* | −4.2249 | 0.22000 | | | |
| 10* | 16.3997 | 2.50006 | 1.53114 | 55.4 | |
| 11 | −4.8924 | 0.60000 | | | |
| 12* | −4.5756 | 0.80000 | 1.63360 | 23.6 | |
| 13 | ∞ | 0.10000 | | | |
| 14 | ∞ | 1.00000 | 1.51680 | 64.2 | |
| 15 | ∞ | 3.07284 | | | |
| 16(IMG) | ∞ | | | | |

Various Types of Data

| | |
|---|---|
| L(in Air) | 19.7 |
| Bf(in Air) | 3.8 |
| f | 4.74 |
| f1 | −6.02 |
| f2 | 5.49 |
| f3 | −5.89 |
| f4 | 6.02 |

TABLE 11-continued

Example 11

| | |
|---|---|
| f5 | 7.40 |
| f6 | −7.22 |
| f12 | 6.94 |
| f56 | 65.40 |
| f3456 | 13.08 |

Aspherical Surface Coefficient

| Si | K | RB3 | RB4 | RB5 | RB6 |
|---|---|---|---|---|---|
| 6 | 1.0000000E+00 | −2.7025319E−04 | 4.5732506E−05 | 1.0233093E−05 | −5.5613762E−07 |
| 7 | 0.0000000E+00 | −2.2400561E−04 | 2.1549486E−03 | −3.3231863E−03 | 3.4511213E−03 |
| 8 | 1.0000000E+00 | 1.7287109E−04 | 2.9809328E−05 | 6.1412992E−06 | 1.7054721E−06 |
| 9 | 1.0000000E+00 | 0.0000000E+00 | 1.6242595E−03 | 0.0000000E+00 | 0.0000000E+00 |
| 10 | 0.0000000E+00 | −4.6940721E−04 | 1.9593801E−04 | −2.1283444E−03 | 9.4854193E−04 |
| 12 | 0.0000000E+00 | −1.0583237E−02 | 1.4889178E−02 | −9.1115910E−03 | 3.2282397E−03 |

| Si | RB7 | RB8 | RB9 | RB10 |
|---|---|---|---|---|
| 6 | −9.3846047E−07 | −2.6518652E−07 | 2.8230855E−08 | 8.2234130E−08 |
| 7 | −1.3665550E−03 | 9.7590836E−05 | 7.7273291E−05 | −1.4400348E−05 |
| 8 | 6.0205957E−07 | 2.2812878E−07 | 8.3937261E−08 | 2.6945473E−08 |
| 9 | 0.0000000E+00 | 0.0000000E+00 | 0.0000000E+00 | 0.0000000E+00 |
| 10 | −2.4922676E−04 | 1.8086987E−05 | 0.0000000E+00 | 0.0000000E+00 |
| 12 | −5.8394923E−04 | 4.1756415E−05 | 0.0000000E+00 | 0.0000000E+00 |

TABLE 12

Example 12

Basic Lens Data

| Si | Ri | Di | Ndj | νdj | Glass |
|---|---|---|---|---|---|
| 1 | 22.0071 | 0.90000 | 1.75500 | 52.3 | S-YGH51 |
| 2 | 3.2900 | 2.80000 | | | |
| 3 | 10.3224 | 3.95000 | 1.83481 | 42.7 | S-LAH55V |
| 4 | −6.5970 | 0.47156 | | | |
| 5(St) | ∞ | 0.80000 | | | |
| 6* | −5.0465 | 0.70000 | 1.63360 | 23.6 | |
| 7* | 11.5372 | 0.35000 | | | |
| 8* | 10.0061 | 1.62546 | 1.53114 | 55.4 | |
| 9* | −4.6653 | 0.22000 | | | |
| 10* | 7.2441 | 2.46926 | 1.53114 | 55.4 | |
| 11* | −13.0240 | 0.80000 | | | |
| 12* | −7.4535 | 0.80000 | 1.63360 | 23.6 | |
| 13 | ∞ | 0.05000 | | | |
| 14 | ∞ | 1.00000 | 1.51680 | 64.2 | |
| 15 | ∞ | 2.96217 | | | |
| 16(IMG) | ∞ | | | | |

Various Types of Data

| | |
|---|---|
| L(in Air) | 19.6 |
| Bf(in Air) | 3.7 |
| f | 4.53 |
| f1 | −5.23 |
| f2 | 5.39 |
| f3 | −5.45 |
| f4 | 6.23 |
| f5 | 9.15 |
| f6 | −11.76 |
| f12 | 7.03 |
| f56 | 23.95 |
| f3456 | 13.76 |

Aspherical Surface Coefficient

| Si | K | RB3 | RB4 | RB5 | RB6 |
|---|---|---|---|---|---|
| 6 | 1.0000000E+00 | 3.3275778E−03 | −2.1239013E−02 | 9.7236180E−03 | 1.7346277E−04 |
| 7 | 0.0000000E+00 | −1.8882858E−03 | −1.1748227E−02 | −3.3806754E−03 | 8.7317522E−03 |
| 8 | 1.0000000E+00 | 0.0000000E+00 | −6.5613214E−04 | 0.0000000E+00 | 0.0000000E+00 |
| 9 | 1.0000000E+00 | 0.0000000E+00 | 2.6140040E−03 | 0.0000000E+00 | 0.0000000E+00 |
| 10 | 0.0000000E+00 | 3.7508081E−03 | −3.2907857E−03 | −9.4596393E−04 | 1.4788590E−03 |

TABLE 12-continued

Example 12

| | | | | | |
|---|---|---|---|---|---|
| 11 | 1.0000000E+00 | 7.7315834E−03 | −1.4044560E−02 | 4.0061304E−03 | −1.0805812E−03 |
| 12 | 0.0000000E+00 | −1.7239987E−02 | 2.4841308E−02 | −2.8571859E−02 | 1.2187721E−02 |

| Si | RB7 | RB8 | RB9 | RB10 |
|---|---|---|---|---|
| 6 | −7.0859685E−04 | 1.0102240E−04 | 0.0000000E+00 | 0.0000000E+00 |
| 7 | −3.4178785E−03 | 3.4133697E−04 | 7.7273291E−05 | −1.4400348E−05 |
| 8 | 0.0000000E+00 | 0.0000000E+00 | 0.0000000E+00 | 0.0000000E+00 |
| 9 | 0.0000000E+00 | 0.0000000E+00 | 0.0000000E+00 | 0.0000000E+00 |
| 10 | −4.0416375E−04 | 6.3956718E−05 | 0.0000000E+00 | 0.0000000E+00 |
| 11 | 3.7206662E−04 | −2.5460806E−05 | 0.0000000E+00 | 0.0000000E+00 |
| 12 | −2.0959138E−03 | 5.1106690E−05 | 0.0000000E+00 | 0.0000000E+00 |

TABLE 13

Example 13

Basic Lens Data

| Si | Ri | Di | Ndj | vdj | Glass |
|---|---|---|---|---|---|
| 1 | −22.0052 | 0.90000 | 1.58913 | 61.1 | S-BAL35 |
| 2 | 3.5922 | 2.27409 | | | |
| 3 | 8.0363 | 3.85000 | 1.83481 | 42.7 | S-LAH55V |
| 4 | −7.3552 | −0.10000 | | | |
| 5(St) | ∞ | 1.31179 | | | |
| 6* | −732.6867 | 0.70000 | 1.63360 | 23.6 | |
| 7* | 3.4190 | 0.60000 | | | |
| 8* | 11.0368 | 1.94421 | 1.53114 | 55.4 | |
| 9* | −4.6112 | 0.18000 | | | |
| 10* | 6.3978 | 2.35000 | 1.53114 | 55.4 | |
| 11* | −16.0027 | 0.70000 | | | |
| 12* | −8.9468 | 0.70000 | 1.63360 | 23.6 | |
| 13 | ∞ | 0.05000 | | | |
| 14 | ∞ | 1.00000 | 1.51680 | 64.2 | |
| 15 | ∞ | 2.95348 | | | |
| 16(IMG) | ∞ | | | | |

Various Types of Data

| | |
|---|---|
| L(in Air) | 19.1 |
| Bf(in Air) | 3.7 |
| f | 4.69 |
| f1 | −5.17 |
| f2 | 5.19 |
| f3 | −5.37 |
| f4 | 6.40 |
| f5 | 8.93 |
| f6 | −14.12 |
| f12 | 7.52 |
| f56 | 17.94 |
| f3456 | 11.42 |

Aspherical Surface Coefficient

| Si | K | RB3 | RB4 | RB5 | RB6 |
|---|---|---|---|---|---|
| 6 | 1.0000000E+00 | 1.5400572E−02 | −5.6085666E−02 | 1.6207147E−02 | 3.0740710E−03 |
| 7 | 0.0000000E+00 | 4.2760434E−03 | −3.5861708E−02 | −4.1717543E−03 | 1.5729546E−02 |
| 8 | 1.0000000E+00 | 0.0000000E+00 | 3.0081458E−03 | 0.0000000E+00 | 0.0000000E+00 |
| 9 | 1.0000000E+00 | 0.0000000E+00 | 6.1762046E−03 | 0.0000000E+00 | 0.0000000E+00 |
| 10 | 1.0000000E+00 | 1.3367745E−03 | 7.8618033E−04 | 4.0502635E−03 | −2.6650290E−03 |
| 11 | 1.0000000E+00 | 6.0625583E−03 | −1.3742771E−02 | 1.0660019E−02 | −3.9508099E−03 |
| 12 | 0.0000000E+00 | −1.5730696E−02 | 2.7415285E−02 | −2.7875870E−02 | 1.4653916E−02 |

| Si | RB7 | RB8 | RB9 | RB10 |
|---|---|---|---|---|
| 6 | −2.2465912E−03 | 3.1729655E−04 | 0.0000000E+00 | 0.0000000E+00 |
| 7 | −6.1925687E−03 | 6.8377284E−04 | 7.7273291E−05 | −1.4400348E−05 |
| 8 | 0.0000000E+00 | 0.0000000E+00 | 0.0000000E+00 | 0.0000000E+00 |
| 9 | 0.0000000E+00 | 0.0000000E+00 | 0.0000000E+00 | 0.0000000E+00 |
| 10 | 7.2962556E−04 | −7.0745818E−05 | 0.0000000E+00 | 0.0000000E+00 |
| 11 | 8.6294777E−04 | −6.8442808E−05 | 0.0000000E+00 | 0.0000000E+00 |
| 12 | −3.8805195E−03 | 4.0964540E−04 | 0.0000000E+00 | 0.0000000E+00 |

TABLE 14

Example 14

Basic Lens Data

| Si | Ri | Di | Ndj | vdj | Glass |
|---|---|---|---|---|---|
| 1 | 17.8427 | 0.90000 | 1.75500 | 52.3 | S-YGH51 |
| 2 | 3.1986 | 2.80000 | | | |
| 3 | 10.8159 | 3.95014 | 1.83481 | 42.7 | S-LAH55V |
| 4 | −6.3103 | 0.43900 | | | |
| 5(St) | ∞ | 0.80000 | | | |
| 6* | −3.9964 | 0.70000 | 1.63360 | 23.6 | |
| 7* | 13.8006 | 0.35000 | | | |
| 8* | 6.1171 | 1.82069 | 1.53114 | 55.4 | |
| 9* | −4.9051 | 0.22000 | | | |
| 10* | 6.6200 | 2.22065 | 1.53114 | 55.4 | |
| 11* | −93.2879 | 0.80002 | | | |
| 12* | −9.0830 | 0.80000 | 1.63360 | 23.6 | |
| 13 | ∞ | 0.10000 | | | |
| 14 | ∞ | 1.00000 | 1.51680 | 64.2 | |
| 15 | ∞ | 2.99271 | | | |
| 16(IMG) | ∞ | | | | |

Various Types of Data

| | |
|---|---|
| L(in Air) | 19.6 |
| Bf(in Air) | 3.8 |
| f | 4.56 |
| f1 | −5.30 |
| f2 | 5.33 |
| f3 | −4.82 |
| f4 | 5.44 |
| f5 | 11.73 |
| f6 | −14.34 |
| f12 | 6.78 |
| f56 | 35.23 |
| f3456 | 14.47 |

Aspherical Surface Coefficient

| Si | K | RB3 | RB4 | RB5 | RB6 |
|---|---|---|---|---|---|
| 6 | 1.0000000E+00 | 1.3550773E−03 | −1.0538484E−02 | 5.4137498E−03 | 1.7537152E−03 |
| 7 | 0.0000000E+00 | −8.8747945E−04 | −1.1233833E−02 | −1.1709011E−04 | 5.4727636E−03 |
| 8 | 1.0000000E+00 | 0.0000000E+00 | −3.5135584E−03 | 0.0000000E+00 | 0.0000000E+00 |
| 9 | 1.0000000E+00 | 0.0000000E+00 | 1.4421204E−03 | 0.0000000E+00 | 0.0000000E+00 |
| 10 | 0.0000000E+00 | 5.4927580E−04 | −2.9072605E−03 | −2.0969180E−03 | 2.1888796E−03 |
| 11 | 1.0000000E+00 | 1.5471059E−03 | −8.9210973E−03 | −2.8509277E−04 | 5.5901329E−04 |
| 12 | 0.0000000E+00 | −8.9215636E−03 | 1.2334487E−02 | −2.0494752E−02 | 9.4610135E−03 |

| Si | RB7 | RB8 | RB9 | RB10 |
|---|---|---|---|---|
| 6 | −1.2549560E−03 | 1.8509594E−04 | 0.0000000E+00 | 0.0000000E+00 |
| 7 | −2.2965144E−03 | 1.9290639E−04 | 7.7273291E−05 | −1.4400348E−05 |
| 8 | 0.0000000E+00 | 0.0000000E+00 | 0.0000000E+00 | 0.0000000E+00 |
| 9 | 0.0000000E+00 | 0.0000000E+00 | 0.0000000E+00 | 0.0000000E+00 |
| 10 | −5.3242468E−04 | 7.9237522E−05 | 0.0000000E+00 | 0.0000000E+00 |
| 11 | 2.1191392E−04 | −4.8004228E−05 | 0.0000000E+00 | 0.0000000E+00 |
| 12 | −1.6279602E−03 | −1.4297309E−05 | 0.0000000E+00 | 0.0000000E+00 |

TABLE 15

Example 15

Basic Lens Data

| Si | Ri | Di | Ndj | vdj | Glass |
|---|---|---|---|---|---|
| 1 | 19.9694 | 0.90000 | 1.75500 | 52.3 | S-YGH51 |
| 2 | 3.1572 | 2.70954 | | | |
| 3 | 10.2261 | 3.35000 | 1.80400 | 46.6 | S-LAH65V |
| 4 | −6.2078 | −0.10000 | | | |
| 5(St) | ∞ | 1.46335 | | | |
| 6* | −46.5322 | 0.70000 | 1.63360 | 23.6 | |
| 7* | 3.5526 | 0.60000 | | | |
| 8* | 5.2381 | 2.45993 | 1.53114 | 55.4 | |
| 9* | −6.9230 | 0.18000 | | | |

TABLE 15-continued

Example 15

| Si | Ri | Di | Ndj | vdj |
|---|---|---|---|---|
| 10* | 6.1309 | 2.35000 | 1.53114 | 55.4 |
| 11* | −14.9534 | 0.72002 | | |
| 12* | −7.4084 | 0.70000 | 1.63360 | 23.6 |
| 13 | ∞ | 0.05000 | | |
| 14 | ∞ | 1.00000 | 1.51680 | 64.2 |
| 15 | ∞ | 2.72831 | | |
| 16(IMG) | ∞ | | | |

Various Types of Data

| | |
|---|---|
| L(in Air) | 19.5 |
| Bf(in Air) | 3.4 |
| f | 4.54 |
| f1 | −5.08 |
| f2 | 5.28 |
| f3 | −5.18 |
| f4 | 6.04 |
| f5 | 8.52 |
| f6 | −11.69 |
| f12 | 7.30 |
| f56 | 19.80 |
| f3456 | 12.24 |

Aspherical Surface Coefficient

| Si | K | RB3 | RB4 | RB5 | RB6 |
|---|---|---|---|---|---|
| 6 | 1.0000000E+00 | 7.3750729E−03 | −4.4875234E−02 | 8.7711092E−03 | 8.0823039E−03 |
| 7 | 0.0000000E+00 | −2.3059247E−03 | −3.4442646E−02 | −1.5084118E−03 | 1.4113649E−02 |
| 8 | 1.0000000E+00 | 0.0000000E+00 | −4.3404856E−04 | 0.0000000E+00 | 0.0000000E+00 |
| 9 | 1.0000000E+00 | 0.0000000E+00 | 2.3409448E−03 | 0.0000000E+00 | 0.0000000E+00 |
| 10 | 0.0000000E+00 | 2.8051830E−03 | −8.1637011E−03 | 7.6343195E−03 | −4.0411693E−03 |
| 11 | 1.0000000E+00 | 4.2705048E−03 | −1.0783004E−02 | 6.8119171E−03 | −3.0809802E−03 |
| 12 | 0.0000000E+00 | −1.4673569E−02 | 1.7277556E−02 | −1.4997680E−02 | 4.5033208E−03 |

| Si | RB7 | RB8 | RB9 | RB10 |
|---|---|---|---|---|
| 6 | −4.0228541E−03 | 5.2434158E−04 | 0.0000000E+00 | 0.0000000E+00 |
| 7 | −5.8142280E−03 | 6.3610471E−04 | 7.7273291E−05 | −1.4400348E−05 |
| 8 | 0.0000000E+00 | 0.0000000E+00 | 0.0000000E+00 | 0.0000000E+00 |
| 9 | 0.0000000E+00 | 0.0000000E+00 | 0.0000000E+00 | 0.0000000E+00 |
| 10 | 9.9029413E−04 | −7.8841258E−05 | 0.0000000E+00 | 0.0000000E+00 |
| 11 | 7.3972472E−04 | −3.2625399E−05 | 0.0000000E+00 | 0.0000000E+00 |
| 12 | −2.0173478E−04 | −6.0004660E−05 | 0.0000000E+00 | 0.0000000E+00 |

TABLE 16

Example 16

Basic Lens Data

| Si | Ri | Di | Ndj | vdj | Glass |
|---|---|---|---|---|---|
| 1 | 19.9928 | 0.90000 | 1.75500 | 52.3 | S-YGH51 |
| 2 | 3.3988 | 2.96789 | | | |
| 3 | 10.3382 | 3.55001 | 1.83481 | 42.7 | S-LAH55V |
| 4 | −6.9730 | −0.10000 | | | |
| 5(St) | ∞ | 1.34748 | | | |
| 6* | −99.9998 | 0.69500 | 1.63360 | 23.6 | |
| 7* | 3.6176 | 0.50000 | | | |
| 8* | 13.4972 | 2.10000 | 1.53114 | 55.4 | |
| 9* | −4.2196 | 0.18000 | | | |
| 10* | 6.5268 | 2.25176 | 1.53114 | 55.4 | |
| 11* | −14.9943 | 0.80671 | | | |
| 12* | −7.8118 | 0.70000 | 1.63360 | 23.6 | |
| 13 | ∞ | 0.05000 | | | |
| 14 | ∞ | 1.00000 | 1.51680 | 64.2 | |
| 15 | ∞ | 2.85953 | | | |
| 16(IMG) | ∞ | | | | |

Various Types of Data

| | |
|---|---|
| L (in Air) | 19.5 |
| Bf (in Air) | 3.6 |
| f | 4.44 |

TABLE 16-continued

| Example 16 | |
|---|---|
| f1 | −5.55 |
| f2 | 5.50 |
| f3 | −5.50 |
| f4 | 6.31 |
| f5 | 8.88 |
| f6 | −12.33 |
| f12 | 7.30 |
| f56 | 20.61 |
| f3456 | 11.39 |

Aspherical Surface Coefficient

| Si | K | RB3 | RB4 | RB5 | RB6 |
|---|---|---|---|---|---|
| 6 | 1.0000000E+00 | 1.5964733E−02 | −6.3086125E−02 | 2.4196158E−02 | −2.6192020E−03 |
| 7 | 0.0000000E+00 | −1.6724999E−03 | −2.9726092E−02 | −1.1728886E−02 | 2.0269519E−02 |
| 8 | 1.0000000E+00 | 0.0000000E+00 | 3.8856805E−03 | 0.0000000E+00 | 0.0000000E+00 |
| 9 | 1.0000000E+00 | 0.0000000E+00 | 7.7692601E−03 | 0.0000000E+00 | 0.0000000E+00 |
| 10 | 0.0000000E+00 | 1.7651962E−03 | −1.3601092E−03 | 5.7383139E−03 | −3.5339743E−03 |
| 11 | 1.0000000E+00 | 7.1038403E−03 | −2.1476480E−02 | 1.3957046E−02 | −5.3293377E−03 |
| 12 | 0.0000000E+00 | −2.5235960E−02 | 3.5222796E−02 | −3.5415311E−02 | 1.7481625E−02 |

| Si | RB7 | RB8 | RB9 | RB10 |
|---|---|---|---|---|
| 6 | −8.7978365E−05 | 1.0847608E−05 | 0.0000000E+00 | 0.0000000E+00 |
| 7 | −7.4422027E−03 | 8.2539200E−04 | 7.7273291E−05 | −1.4400348E−05 |
| 8 | 0.0000000E+00 | 0.0000000E+00 | 0.0000000E+00 | 0.0000000E+00 |
| 9 | 0.0000000E+00 | 0.0000000E+00 | 0.0000000E+00 | 0.0000000E+00 |
| 10 | 9.0078730E−04 | −7.6610790E−05 | 0.0000000E+00 | 0.0000000E+00 |
| 11 | 1.1965807E−03 | −9.9875420E−05 | 0.0000000E+00 | 0.0000000E+00 |
| 12 | −4.3801543E−03 | 4.4249238E−04 | 0.0000000E+00 | 0.0000000E+00 |

TABLE 17

Example 17

Basic Lens Data

| Si | Ri | Di | Ndj | vdj | Glass |
|---|---|---|---|---|---|
| 1 | 20.5999 | 0.90000 | 1.75500 | 52.3 | S-YGH51 |
| 2 | 3.4135 | 2.97891 | | | |
| 3 | 10.4494 | 3.55001 | 1.83481 | 42.7 | S-LAH55 |
| 4 | −6.9969 | −0.10000 | | | |
| 5(St) | ∞ | 1.38000 | | | |
| 6* | −99.9959 | 0.70000 | 1.63360 | 23.6 | |
| 7* | 3.7003 | 0.50000 | | | |
| 8* | 12.9967 | 2.10000 | 1.53114 | 55.4 | |
| 9* | −4.2950 | 0.18000 | | | |
| 10* | 6.5412 | 2.30007 | 1.53114 | 55.4 | |
| 11* | −15.1304 | 0.80000 | | | |
| 12* | −7.7038 | 0.70000 | 1.63360 | 23.6 | |
| 13 | ∞ | 0.05000 | | | |
| 14 | ∞ | 1.00000 | 1.51680 | 64.2 | |
| 15 | ∞ | 2.79563 | | | |
| 16(IMG) | ∞ | | | | |

Various Types of Data

| L(in Air) | 19.5 |
|---|---|
| Bf(in Air) | 3.5 |
| f | 4.44 |
| f1 | −5.54 |
| f2 | 5.53 |
| f3 | −5.62 |
| f4 | 6.35 |
| f5 | 8.93 |
| f6 | −12.16 |
| f12 | 7.37 |
| f56 | 21.20 |
| f3456 | 11.44 |

TABLE 17-continued

Example 17

Aspherical Surface Coefficient

| Si | K | RB3 | RB4 | RB5 | RB6 |
|---|---|---|---|---|---|
| 6 | 1.0000000E+00 | 1.6061852E−02 | −6.2717845E−02 | 2.4211204E−02 | −2.6727796E−03 |
| 7 | 0.0000000E+00 | −1.0607487E−03 | −2.9719159E−02 | −1.1799257E−02 | 2.0257194E−02 |
| 8 | 1.0000000E+00 | 0.0000000E+00 | 3.7246836E−03 | 0.0000000E+00 | 0.0000000E+00 |
| 9 | 1.0000000E+00 | 0.0000000E+00 | 7.6273398E−03 | 0.0000000E+00 | 0.0000000E+00 |
| 10 | 0.0000000E+00 | 1.7176991E−03 | −1.4137417E−03 | 5.7144066E−03 | −3.5246447E−03 |
| 11 | 1.0000000E+00 | 6.8467346E−03 | −2.1413364E−02 | 1.4012145E−02 | −5.3197703E−03 |
| 12 | 0.0000000E+00 | −2.5525786E−02 | 3.5200550E−02 | −3.5386728E−02 | 1.7506886E−02 |

| Si | RB7 | RB8 | RB9 | RB10 |
|---|---|---|---|---|
| 6 | −1.0258428E−04 | 1.5926879E−05 | 0.0000000E+00 | 0.0000000E+00 |
| 7 | −7.4407587E−03 | 8.2354787E−04 | 7.7273291E−05 | −1.4400348E−05 |
| 8 | 0.0000000E+00 | 0.0000000E+00 | 0.0000000E+00 | 0.0000000E+00 |
| 9 | 0.0000000E+00 | 0.0000000E+00 | 0.0000000E+00 | 0.0000000E+00 |
| 10 | 9.0484107E−04 | −7.8172878E−05 | 0.0000000E+00 | 0.0000000E+00 |
| 11 | 1.1947228E−03 | −1.0179250E−04 | 0.0000000E+00 | 0.0000000E+00 |
| 12 | −4.3749011E−03 | 4.3743798E−04 | 0.0000000E+00 | 0.0000000E+00 |

TABLE 18

Example 18

Basic Lens Data

| Si | Ri | Di | Ndj | vdj | Glass |
|---|---|---|---|---|---|
| 1 | 22.2198 | 0.90000 | 1.75500 | 52.3 | S-YGH51 |
| 2 | 3.4827 | 3.01295 | | | |
| 3 | 11.0245 | 3.30172 | 1.83481 | 42.7 | S-LAH55V |
| 4 | −7.0023 | −0.10000 | | | |
| 5(St) | ∞ | 1.59969 | | | |
| 6* | −87.5814 | 0.70000 | 1.63360 | 23.6 | |
| 7* | 3.7803 | 0.50000 | | | |
| 8* | 13.0414 | 2.10000 | 1.53114 | 55.4 | |
| 9* | −4.2848 | 0.18006 | | | |
| 10* | 6.4737 | 2.30000 | 1.53114 | 55.4 | |
| 11* | −16.1211 | 0.80000 | | | |
| 12* | −7.6061 | 0.70000 | 1.63360 | 23.6 | |
| 13 | ∞ | 0.05000 | | | |
| 14 | ∞ | 1.00000 | 1.51680 | 64.2 | |
| 15 | ∞ | 2.79196 | | | |
| 16(IMG) | ∞ | | | | |

Various Types of Data

| | |
|---|---|
| L(in Air) | 19.5 |
| Bf(in Air) | 3.5 |
| f | 4.52 |
| f1 | −5.59 |
| f2 | 5.60 |
| f3 | −5.70 |
| f4 | 6.34 |
| f5 | 9.01 |
| f6 | −12.00 |
| f12 | 7.61 |
| f56 | 22.08 |
| f3456 | 11.42 |

Aspherical Surface Coefficient

| Si | K | RB3 | RB4 | RB5 | RB6 |
|---|---|---|---|---|---|
| 6 | 1.0000000E+00 | 9.9762013E−03 | −5.0617743E−02 | 1.2087883E−02 | 3.3123807E−03 |
| 7 | 0.0000000E+00 | 2.0911130E−03 | −3.3193103E−02 | −8.6964808E−03 | 1.8040275E−02 |
| 8 | 1.0000000E+00 | 0.0000000E+00 | 4.3975160E−03 | 0.0000000E+00 | 0.0000000E+00 |
| 9 | 1.0000000E+00 | 0.0000000E+00 | 8.1894562E−03 | 0.0000000E+00 | 0.0000000E+00 |
| 10 | 0.0000000E+00 | 3.7917895E−03 | −5.4151220E−03 | 1.1106302E−02 | −6.2778849E−03 |
| 11 | 1.0000000E+00 | 8.1460301E−03 | −1.7750119E−02 | 7.7508743E−03 | 5.2388028E−04 |
| 12 | 0.0000000E+00 | 2.3295404E−03 | −1.4356519E−03 | −1.2013294E−02 | 1.1529120E−02 |

TABLE 18-continued

Example 18

| Si | RB7 | RB8 | RB9 | RB10 |
|---|---|---|---|---|
| 6 | −1.7779198E−03 | 2.3683976E−04 | 0.0000000E+00 | 0.0000000E+00 |
| 7 | −6.6867488E−03 | 7.3109468E−04 | 7.7273291E−05 | −1.4400348E−05 |
| 8 | 0.0000000E+00 | 0.0000000E+00 | 0.0000000E+00 | 0.0000000E+00 |
| 9 | 0.0000000E+00 | 0.0000000E+00 | 0.0000000E+00 | 0.0000000E+00 |
| 10 | 1.5904445E−03 | −1.4769377E−04 | 0.0000000E+00 | 0.0000000E+00 |
| 11 | −1.0044380E−03 | 1.9295855E−04 | 0.0000000E+00 | 0.0000000E+00 |
| 12 | −4.3554316E−03 | 5.8727703E−04 | 0.0000000E+00 | 0.0000000E+00 |

TABLE 19

Example 19

Basic Lens Data

| Si | Ri | Di | Ndj | νdj | Glass |
|---|---|---|---|---|---|
| 1 | 21.8269 | 0.90000 | 1.75500 | 52.3 | S-YGH51 |
| 2 | 3.5076 | 3.29083 | | | |
| 3 | 10.3982 | 3.20000 | 1.83481 | 42.7 | S-LAH55V |
| 4 | −7.4325 | −0.10000 | | | |
| 5(St) | ∞ | 1.41204 | | | |
| 6* | −46.2232 | 0.70000 | 1.63360 | 23.6 | |
| 7* | 4.2133 | 0.50000 | | | |
| 8* | 12.9394 | 2.10000 | 1.53114 | 55.4 | |
| 9* | −4.3026 | 0.18001 | | | |
| 10* | 6.8639 | 2.30000 | 1.53114 | 55.4 | |
| 11* | −17.1785 | 0.80000 | | | |
| 12* | −6.9481 | 0.70000 | 1.63360 | 23.6 | |
| 13 | ∞ | 0.05000 | | | |
| 14 | ∞ | 1.00000 | 1.51680 | 64.2 | |
| 15 | ∞ | 2.78096 | | | |
| 16(IMG) | ∞ | | | | |

Various Types of Data

| | |
|---|---|
| L(in Air) | 19.5 |
| Bf(in Air) | 3.5 |
| f | 4.52 |
| f1 | −5.65 |
| f2 | 5.65 |
| f3 | −6.06 |
| f4 | 6.35 |
| f5 | 9.55 |
| f6 | −10.97 |
| f12 | 7.44 |
| f56 | 31.49 |
| f3456 | 12.57 |

Aspherical Surface Coefficient

| Si | K | RB3 | RB4 | RB5 | RB6 |
|---|---|---|---|---|---|
| 6 | 1.0000000E+00 | 4.2268845E−04 | −2.9049413E−02 | −3.2913100E−03 | 7.9843926E−03 |
| 7 | 0.0000000E+00 | −5.7328594E−03 | −1.7099312E−02 | −1.6654641E−02 | 1.8011679E−02 |
| 8 | 1.0000000E+00 | 0.0000000E+00 | 5.0181260E−03 | 0.0000000E+00 | 0.0000000E+00 |
| 9 | 1.0000000E+00 | 0.0000000E+00 | 1.0122333E−02 | 0.0000000E+00 | 0.0000000E+00 |
| 10 | 0.0000000E+00 | 6.1616635E−03 | −8.1441051E−03 | 1.2772099E−02 | −6.6635126E−03 |
| 11 | 1.0000000E+00 | 1.6664907E−03 | −1.0318695E−02 | 9.0519784E−04 | 2.7390426E−03 |
| 12 | 0.0000000E+00 | −5.6860954E−03 | 7.0027198E−05 | −4.9227644E−03 | 3.6117474E−03 |

| Si | RB7 | RB8 | RB9 | RB10 |
|---|---|---|---|---|
| 6 | −2.0196475E−03 | 1.4281330E−04 | 0.0000000E+00 | 0.0000000E+00 |
| 7 | −5.6815260E−03 | 5.2836476E−04 | 7.7273291E−05 | −1.4400348E−05 |
| 8 | 0.0000000E+00 | 0.0000000E+00 | 0.0000000E+00 | 0.0000000E+00 |
| 9 | 0.0000000E+00 | 0.0000000E+00 | 0.0000000E+00 | 0.0000000E+00 |
| 10 | 1.5385749E−03 | −1.3074054E−04 | 0.0000000E+00 | 0.0000000E+00 |
| 11 | −1.2610988E−03 | 1.8479877E−04 | 0.0000000E+00 | 0.0000000E+00 |
| 12 | −1.2860910E−03 | 1.7939766E−04 | 0.0000000E+00 | 0.0000000E+00 |

TABLE 20

Example 20

Basic Lens Data

| Si | Ri | Di | Ndj | vdj | Glass |
|---|---|---|---|---|---|
| 1 | 21.6446 | 0.90000 | 1.71300 | 53.9 | S-LAL8 |
| 2 | 3.6544 | 3.49698 | | | |
| 3 | 11.7770 | 3.20000 | 1.88300 | 4.08 | S-LAH58 |
| 4 | −7.8662 | −0.10000 | | | |
| 5(St) | ∞ | 1.31830 | | | |
| 6* | −100.0113 | 0.70000 | 1.63360 | 23.6 | |
| 7* | 3.8260 | 0.50000 | | | |
| 8* | 12.8023 | 2.10000 | 1.53114 | 55.4 | |
| 9* | −4.2043 | 0.18000 | | | |
| 10* | 6.9458 | 2.30000 | 1.53114 | 55.4 | |
| 11* | −15.8253 | 0.80000 | | | |
| 12* | −7.1423 | 0.70000 | 1.63360 | 23.6 | |
| 13 | ∞ | 0.05000 | | | |
| 14 | ∞ | 1.00000 | 1.51680 | 64.2 | |
| 15 | ∞ | 2.68157 | | | |
| 16(IMG) | ∞ | | | | |

Various Types of Data

| | |
|---|---|
| L(in Air) | 19.5 |
| Bf(in Air) | 3.4 |
| f | 4.52 |
| f1 | −6.30 |
| f2 | 5.78 |
| f3 | −5.80 |
| f4 | 6.23 |
| f5 | 9.42 |
| f6 | −11.27 |
| f12 | 7.27 |
| f56 | 28.42 |
| f3456 | 12.27 |

Aspherical Surface Coefficient

| Si | K | RB3 | RB4 | RB5 | RB6 |
|---|---|---|---|---|---|
| 6 | 1.0000000E+00 | 2.5444635E−03 | −3.6862842E−02 | −1.9252974E−03 | 9.3904882E−03 |
| 7 | 0.0000000E+00 | −5.5573830E−03 | −2.6237183E−02 | −1.3483361E−02 | 1.7887641E−02 |
| 8 | 1.0000000E+00 | 0.0000000E+00 | 3.9640978E−03 | 0.0000000E+00 | 0.0000000E+00 |
| 9 | 1.0000000E+00 | 0.0000000E+00 | 1.0410642E−02 | 0.0000000E+00 | 0.0000000E+00 |
| 10 | 0.0000000E+00 | 6.4337695E−03 | −7.1379361E−03 | 1.1877928E−02 | −6.3239661E−03 |
| 11 | 1.0000000E+00 | −3.5602284E−04 | −3.8071905E−03 | −1.9214366E−03 | 3.1669223E−03 |
| 12 | 0.0000000E+00 | −8.0726145E−03 | 4.4389040E−03 | −4.3988120E−03 | 2.1650222E−03 |

| Si | RB7 | RB8 | RB9 | RB10 |
|---|---|---|---|---|
| 6 | −2.8052481E−03 | 2.6400828E−04 | 0.0000000E+00 | 0.0000000E+00 |
| 7 | −5.9332666E−03 | 5.7389730E−04 | 7.7273291E−05 | −1.4400349E−05 |
| 8 | 0.0000000E+00 | 0.0000000E+00 | 0.0000000E+00 | 0.0000000E+00 |
| 9 | 0.0000000E+00 | 0.0000000E+00 | 0.0000000E+00 | 0.0000000E+00 |
| 10 | 1.4586679E−03 | −1.3168741E−01 | 0.0000000E+00 | 0.0000000E+00 |
| 11 | −1.2081021E−03 | 1.4524116E−04 | 0.0000000E+00 | 0.0000000E+00 |
| 12 | −7.6617337E−04 | 1.0781079E−04 | 0.0000000E+00 | 0.0000000E+00 |

TABLE 21

Example 21

Basic Lens Data

| Si | Ri | Di | Ndj | vdj | Glass |
|---|---|---|---|---|---|
| 1 | 13.4203 | 0.80007 | 1.51680 | 64.2 | BSC7 |
| 2 | 2.8870 | 3.20320 | | | |
| 3 | 10.2034 | 3.01378 | 1.75500 | 52.3 | S-YGH51 |
| 4 | −5.7466 | −0.10000 | | | |
| 5(St) | ∞ | 1.54302 | | | |
| 6* | 60.0017 | 0.70000 | 1.65245 | 21.0 | |
| 7* | 3.7034 | 0.40000 | | | |
| 8* | −211.7981 | 2.13459 | 1.53391 | 55.9 | |
| 9* | −5.0156 | 0.22019 | | | |

TABLE 21-continued

Example 21

| | | | | | |
|---|---|---|---|---|---|
| 10* | 5.0361 | 1.80006 | 1.53391 | 55.9 | |
| 11* | −16.2368 | 0.70000 | | | |
| 12 | −13.0232 | 0.99893 | 1.95906 | 17.5 | S-NPH3 |
| 13 | −27.4321 | 0.05000 | | | |
| 14 | ∞ | 1.00000 | 1.51680 | 64.2 | |
| 15 | ∞ | 2.25153 | | | |
| 16(IMG) | ∞ | | | | |

Various Types of Data

| | |
|---|---|
| L(in Air) | 18.4 |
| Bf(in Air) | 3.0 |
| f | 4.50 |
| f1 | −7.31 |
| f2 | 5.30 |
| f3 | −6.08 |
| f4 | 9.59 |
| f5 | 7.42 |
| f6 | −26.76 |
| f12 | 6.19 |
| f56 | 9.69 |
| f3456 | 9.58 |

Aspherical Surface Coefficient

| Si | K | RB3 | RB4 | RB5 | RB6 |
|---|---|---|---|---|---|
| 6 | 1.0000000E−00 | 1.2878298E−03 | −4.4820866E−02 | 9.0853543E−04 | 1.6627778E−02 |
| 7 | 0.0000000E+00 | −5.5555060E−03 | −5.0736482E−02 | 8.9755869E−03 | 9.5387803E−03 |
| 8 | 1.0000000E+00 | 0.0000000E+00 | −5.9617656E−03 | 0.0000000E+00 | 0.0000000E+00 |
| 9 | 1.0000000E+00 | 0.0000000E+00 | −2.5775088E−03 | 0.0000000E+00 | 0.0000000E+00 |
| 10 | 0.0000000E+00 | 4.6202603E−03 | −3.7374220E−03 | 4.0301986E−03 | −3.8536766E−04 |
| 11 | 1.0000000E+00 | 1.8260699E−02 | −2.2655862E−02 | 1.7210593E−02 | −5.3966401E−03 |

| Si | RB7 | RB8 | RB9 | RB10 |
|---|---|---|---|---|
| 6 | −8.1674354E−03 | 1.1919922E−03 | 0.0000000E+00 | 0.0000000E+00 |
| 7 | −4.8796621E−03 | 5.6855664E−04 | 7.7273291E−05 | −1.4400348E−05 |
| 8 | 0.0000000E+00 | 0.0000000E+00 | 0.0000000E+00 | 0.0000000E+00 |
| 9 | 0.0000000E+00 | 0.0000000E+00 | 0.0000000E+00 | 0.0000000E+00 |
| 10 | −3.1454359E−04 | 7.5151608E−05 | 0.0000000E+00 | 0.0000000E+00 |
| 11 | 5.4674760E−04 | 2.9568436E−05 | 0.0000000E+00 | 0.0000000E+00 |

TABLE 22

Example 22

Basic Lens Data

| Si | Ri | Di | Ndj | vdj | Glass |
|---|---|---|---|---|---|
| 1 | 16.1014 | 0.80007 | 1.58913 | 61.1 | S-BAL35 |
| 2 | 2.7371 | 2.34988 | | | |
| 3 | 10.2741 | 3.83172 | 1.80400 | 46.6 | S-LAH65V |
| 4 | −5.3340 | −0.10000 | | | |
| 5(St) | ∞ | 1.55801 | | | |
| 6* | −7.3516 | 0.73000 | 1.63360 | 23.6 | |
| 7* | 3.6792 | 0.40000 | | | |
| 8* | 4.9118 | 2.50000 | 1.53114 | 55.4 | |
| 9* | −8.9758 | 0.22000 | | | |
| 10* | 3.5868 | 1.80006 | 1.53114 | 55.4 | |
| 11* | 90.3795 | 0.70004 | | | |
| 12 | −81.1276 | 0.90008 | 1.92286 | 18.9 | S-NPH2 |
| 13 | −81.5039 | 0.05000 | | | |
| 14 | ∞ | 1.00000 | 1.51680 | 64.2 | |
| 15 | ∞ | 2.79683 | | | |
| 16(IMG) | ∞ | | | | |

Various Types of Data

| | |
|---|---|
| L(in Air) | 19.2 |
| Bf(in Air) | 3.5 |
| f | 4.56 |
| f1 | −5.72 |
| f2 | 4.90 |

TABLE 22-continued

Example 22

| | |
|---|---|
| f3 | −3.77 |
| f4 | 6.38 |
| f5 | 6.98 |
| f6 | −25.43 |
| f12 | 6.06 |
| f56 | 8.78 |
| f3456 | 10.66 |

Aspherical Surface Coefficient

| Si | K | RB3 | RB4 | RB5 | RB6 |
|---|---|---|---|---|---|
| 6 | 1.0000000E+00 | 4.4247020E−03 | −3.6958885E−02 | 2.5377590E−03 | 1.7254895E−02 |
| 7 | 0.0000000E+00 | −7.6991589E−04 | −4.1947461E−02 | 1.0146805E−02 | 9.2008516E−03 |
| 8 | 1.0000000E+00 | 0.0000000E+00 | −3.5445245E−03 | 0.0000000E+00 | 0.0000000E+00 |
| 9 | 1.0000000E+00 | 0.0000000E+00 | −3.5492937E−03 | 0.0000000E+00 | 0.0000000E+00 |
| 10 | 0.0000000E+00 | 6.3789919E−03 | −1.1034078E−02 | 3.9142583E−03 | −9.1010433E−06 |
| 11 | 1.0000000E+00 | 2.1991053E−02 | −2.3984357E−02 | 1.8684442E−02 | −5.7115591E−03 |

| Si | RB7 | RB8 | RB9 | RB10 |
|---|---|---|---|---|
| 6 | −9.0220339E−03 | 1.3839890E−03 | 0.0000000E+00 | 0.0000000E+00 |
| 7 | −5.2117516E−03 | 6.7274328E−04 | 7.7273291E−05 | −1.4400348E−05 |
| 8 | 0.0000000E+00 | 0.0000000E+00 | 0.0000000E+00 | 0.0000000E+00 |
| 9 | 0.0000000E+00 | 0.0000000E+00 | 0.0000000E+00 | 0.0000000E+00 |
| 10 | −3.7636959E−04 | 6.3309783E−05 | 0.0000000E+00 | 0.0000000E+00 |
| 11 | 4.7732116E−04 | 4.0067628E−05 | 0.0000000E+00 | 0.0000000E+00 |

In the imaging lenses of Examples 1 to 3, 10, 21, and 22, the first lens L1, the second lens L2, and the sixth lens L6 are glass spherical lenses, while the third lens L3 to the fifth lens L5 are plastic lenses. In the imaging lenses of Examples 4 to 9 and 11 to 20, the first lens L1 and the second lens L2 are glass spherical lenses, while the third lens L3 to the sixth lens L6 are plastic lenses. In the basic lens data, a glass name is indicated in the glass column for a glass lens, but another type of glass may be used if it has comparable characteristics in refractive index, Abbe number, and the like.

For example, S-YGH51 that appears in the glass column of the basic lens data is S-YGH51 by OHARA, but glass materials of other manufactures having comparable characteristics may be used. For example, instead of S-YGH51, TAC6 by HOYA, K-LASKN1 by SUMITA, and H-LAK53A by CDGM Glass Co., Ltd. may be used. Likewise, instead of S-LAH66 by OHARA, TAF1 and M-TAF1 by HOYA, K-LAFK50 and K-LASFN7 by SUMITA, H-ZLAF50B by CDGM Glass Co., Ltd., N-LAF34 by SCHOTT, and the like may be used. Instead of S-LAH55V by OHARA, TAFD5F by HOYA, K-LASFN8 by SUMITA, H-ZLAF55A by CDGM Glass Co., Ltd., and the like may be used. Instead of S-BAL35 by OHARA, BACD5 by HOYA, K-SK5 by SUMITA, H-ZK3 by CDGM Glass Co., Ltd., and the like may be used. Instead of S-LAH65V by OHARA, TAF3 by HOYA, K-LASFN6 by SUMITA, H-ZLAF50D, and the like may be used. Instead of BSC7 by HOYA, S-BSL7 by OHARA, K-BK7 by SUMITA, H-K9L by CDGM Glass Co., Ltd., N-BK7 by SCHOTT, and the like may be used. Instead of S-LAL8 by OHARA, LAC8 by HOYA, K-LAK8 by SUMITA, H-LAK7A by CDGM Glass Co., Ltd., and the like may be used. Instead of M-TAFD51 by HOYA, Q-LASFH59S by HIKARI GLASS and the like may be used. Instead of S-LAH58 by OHARA, TAFD30 by HOYA, K-LASFN17 by SUMITA, H-ZLAF68 by CDGM Glass Co., Ltd., and the like may be used.

Values of the imaging lenses of Examples 1 to 22 corresponding to the conditional expressions (1) to (11) are shown in Table 23 and those corresponding to the conditional expressions (12) to (21) are shown in Table 24. In Examples 1 to 22, the d-line is used as the reference wavelength and Tables 23 and 24 show the values at the reference wavelength.

TABLE 23

| | Conditional Expression | | | | | | | | | | |
|---|---|---|---|---|---|---|---|---|---|---|---|
| Example | (1) Db12 + D3 / f | (2) f2/f | (3) R1f + R1r / R1f − R1r | (4) f3456 / f | (5) f4/f | (6) vd6 | (7) Db12/f | (8) f12/f | (9) f5/f | (10) R2f + R2r / R2f − R2r | (11) R5f + R5r / R5f − R5r |
| 1 | 1.20 | 0.98 | 1.72 | 3.32 | 1.62 | 23.78 | 0.54 | 1.24 | 1.20 | 0.10 | −0.45 |
| 2 | 1.39 | 1.07 | 1.41 | 2.38 | 1.46 | 23.78 | 0.45 | 1.33 | 1.42 | 0.34 | −0.99 |
| 3 | 1.22 | 1.01 | 1.51 | 2.54 | 1.23 | 23.78 | 0.56 | 1.24 | 1.56 | 0.19 | −0.79 |
| 4 | 1.38 | 1.12 | 1.49 | 2.58 | 1.48 | 22.00 | 0.58 | 1.48 | 1.23 | 0.04 | 0.28 |
| 5 | 1.37 | 1.10 | 1.48 | 2.68 | 1.61 | 23.61 | 0.58 | 1.44 | 1.06 | 0.01 | 0.29 |
| 6 | 1.22 | 0.98 | 1.40 | 2.14 | 1.89 | 23.61 | 0.39 | 1.48 | 1.59 | 0.02 | −0.97 |
| 7 | 1.23 | 0.97 | 1.37 | 2.30 | 2.48 | 23.61 | 0.39 | 1.44 | 1.23 | 0.02 | −0.46 |
| 8 | 1.50 | 1.15 | 1.48 | 2.53 | 1.51 | 25.50 | 0.55 | 1.51 | 1.85 | 0.09 | −0.91 |
| 9 | 1.41 | 1.15 | 1.37 | 2.92 | 2.06 | 23.61 | 0.54 | 1.57 | 1.82 | 0.24 | −0.91 |
| 10 | 1.18 | 0.97 | 1.34 | 2.80 | 1.81 | 23.78 | 0.54 | 1.19 | 1.26 | 0.19 | −0.46 |
| 11 | 1.30 | 1.16 | 1.42 | 2.76 | 1.27 | 23.61 | 0.77 | 1.46 | 1.56 | −0.04 | 0.54 |
| 12 | 1.49 | 1.19 | 1.35 | 3.04 | 1.38 | 23.61 | 0.62 | 1.55 | 2.02 | 0.22 | −0.29 |
| 13 | 1.30 | 1.11 | 0.72 | 2.43 | 1.36 | 23.61 | 0.48 | 1.60 | 1.90 | 0.04 | −0.43 |

TABLE 23-continued

| | Conditional Expression | | | | | | | | | | |
|---|---|---|---|---|---|---|---|---|---|---|---|
| Example | (1) $\frac{Db12 + D3}{f}$ | (2) f2/f | (3) $\frac{R1f + R1r}{R1f - R1r}$ | (4) $\frac{f3456}{f}$ | (5) f4/f | (6) vd6 | (7) Db12/f | (8) f12/f | (9) f5/f | (10) $\frac{R2f + R2r}{R2f - R2r}$ | (11) $\frac{R5f + R5r}{R5f - R5r}$ |
| 14 | 1.48 | 1.17 | 1.44 | 3.18 | 1.19 | 23.61 | 0.61 | 1.49 | 2.57 | 0.26 | −0.87 |
| 15 | 1.33 | 1.16 | 1.38 | 2.69 | 1.33 | 23.61 | 0.60 | 1.61 | 1.87 | 0.24 | −0.42 |
| 16 | 1.47 | 1.24 | 1.41 | 2.56 | 1.42 | 23.61 | 0.67 | 1.64 | 2.00 | 0.19 | −0.39 |
| 17 | 1.47 | 1.25 | 1.40 | 2.58 | 1.43 | 23.61 | 0.67 | 1.66 | 2.01 | 0.20 | −0.40 |
| 18 | 1.40 | 1.24 | 1.37 | 2.53 | 1.40 | 23.61 | 0.67 | 1.69 | 2.00 | 0.22 | −0.43 |
| 19 | 1.44 | 1.25 | 1.38 | 2.78 | 1.40 | 23.61 | 0.73 | 1.64 | 2.11 | 0.17 | −0.43 |
| 20 | 1.48 | 1.28 | 1.41 | 2.71 | 1.38 | 23.61 | 0.77 | 1.61 | 2.08 | 0.20 | −0.39 |
| 21 | 1.38 | 1.18 | 1.55 | 2.13 | 2.13 | 17.50 | 0.71 | 1.38 | 1.65 | 0.28 | −0.53 |
| 22 | 1.36 | 1.08 | 1.41 | 2.34 | 1.40 | 18.90 | 0.52 | 1.33 | 1.53 | 0.32 | −1.08 |

TABLE 24

| | Conditional Expression | | | | | | | | | |
|---|---|---|---|---|---|---|---|---|---|---|
| Example | (12) $\frac{R6f + R6r}{R6f - R6r}$ | (13) R1/f | (14) f1/f | (15) $\frac{f12}{f3456}$ | (16) $\frac{D3 + Db23}{f}$ | (17) f1/f2 | (18) vd3 | (19) f4/f5 | (20) f56/f | (21) $\frac{Db23}{f}$ |
| 1 | −1.00 | 2.31 | −1.15 | 0.37 | 0.90 | −1.18 | 23.61 | 1.35 | 1.86 | 0.24 |
| 2 | −1.00 | 3.51 | −1.25 | 0.56 | 1.24 | −1.17 | 23.61 | 1.03 | 1.85 | 0.31 |
| 3 | −1.00 | 3.06 | −1.35 | 0.49 | 0.91 | −1.33 | 23.61 | 0.79 | 2.40 | 0.25 |
| 4 | −0.74 | 3.96 | −1.32 | 0.57 | 1.00 | −1.17 | 22.00 | 1.20 | 7.63 | 0.21 |
| 5 | −0.77 | 3.94 | −1.28 | 0.54 | 1.00 | −1.16 | 23.61 | 1.52 | 5.66 | 0.21 |
| 6 | −1.00 | 4.07 | −1.10 | 0.69 | 1.16 | −1.12 | 23.61 | 1.19 | 2.21 | 0.33 |
| 7 | −1.00 | 4.18 | −1.05 | 0.62 | 1.08 | −1.08 | 23.61 | 2.01 | 1.87 | 0.24 |
| 8 | −1.00 | 3.96 | −1.28 | 0.60 | 1.15 | −1.11 | 25.50 | 0.81 | 2.87 | 0.21 |
| 9 | −1.00 | 4.42 | −1.12 | 0.54 | 1.09 | −0.97 | 23.61 | 1.13 | 2.77 | 0.21 |
| 10 | −1.35 | 3.98 | −1.18 | 0.43 | 0.87 | −1.21 | 23.61 | 1.44 | 1.57 | 0.23 |
| 11 | −1.00 | 4.44 | −1.27 | 0.53 | 0.79 | −1.10 | 23.61 | 0.81 | 13.80 | 0.26 |
| 12 | −1.00 | 4.86 | −1.16 | 0.51 | 1.15 | −0.97 | 23.61 | 0.68 | 5.29 | 0.28 |
| 13 | −1.00 | −4.69 | −1.10 | 0.66 | 1.08 | −1.00 | 23.61 | 0.72 | 3.82 | 0.26 |
| 14 | −1.00 | 3.92 | −1.16 | 0.47 | 1.14 | −0.99 | 23.61 | 0.46 | 7.73 | 0.27 |
| 15 | −1.00 | 4.40 | −1.12 | 0.60 | 1.04 | −0.96 | 23.61 | 0.71 | 4.36 | 0.30 |
| 16 | −1.00 | 4.50 | −1.25 | 0.64 | 1.08 | −1.01 | 23.61 | 0.71 | 4.64 | 0.28 |
| 17 | −1.00 | 4.64 | −1.25 | 0.64 | 1.09 | −1.00 | 23.61 | 0.71 | 4.77 | 0.29 |
| 18 | −1.00 | 4.92 | −1.24 | 0.67 | 1.06 | −1.00 | 23.61 | 0.70 | 4.89 | 0.33 |
| 19 | −1.00 | 4.83 | −1.25 | 0.59 | 1.00 | −1.00 | 23.61 | 0.66 | 6.96 | 0.29 |
| 20 | −1.00 | 4.79 | −1.39 | 0.59 | 0.98 | −1.09 | 23.61 | 0.66 | 6.28 | 0.27 |
| 21 | −2.81 | 2.99 | −1.63 | 0.65 | 0.99 | −1.38 | 21.00 | 1.29 | 2.16 | 0.32 |
| 22 | −1.57 | 3.53 | −1.26 | 0.57 | 1.16 | −1.17 | 23.61 | 0.91 | 1.92 | 0.32 |

Aberration diagrams of each of imaging lenses according to Examples 1 to 22 are shown in FIGS. 24 to 45. In each of FIGS. 24 to 45, diagrams of spherical aberration, astigmatism, distortion, and lateral chromatic aberration are shown from the left for each Example. The Fno. in the spherical aberration diagram represents F-number and ω in the other aberration diagrams represents half angle of view when an object at infinity is in focus. Each aberration diagram illustrates aberration with the d-line (wavelength 587.56 nm) as the reference wavelength, but the spherical aberration diagram also illustrates aberrations with respect to the F-line (wavelength 486.13 nm), the C-line (wavelength 656.27 nm), the s-line (wavelength 852.11 nm), and offence against the sine condition, while the lateral chromatic aberration diagram illustrates aberrations with respect to the F-line, the C-line, and the s-line.

As is known from the data shown above, the imaging lenses of Examples 1 to 22 can be made compact and inexpensive. Furthermore, they have small F-numbers in the range of 1.60 to 2.00, wide angles with maximum total angles of view in the range from 65° to 80°, and high optical performance with aberrations, including chromatic aberration, being corrected satisfactorily. These imaging lenses may be favorably used in applications, including but not limited to surveillance cameras, vehicle cameras for imaging the front side, the lateral sides, the rear side, and the like.

[Embodiments of Imaging Apparatus]

Figure 46:
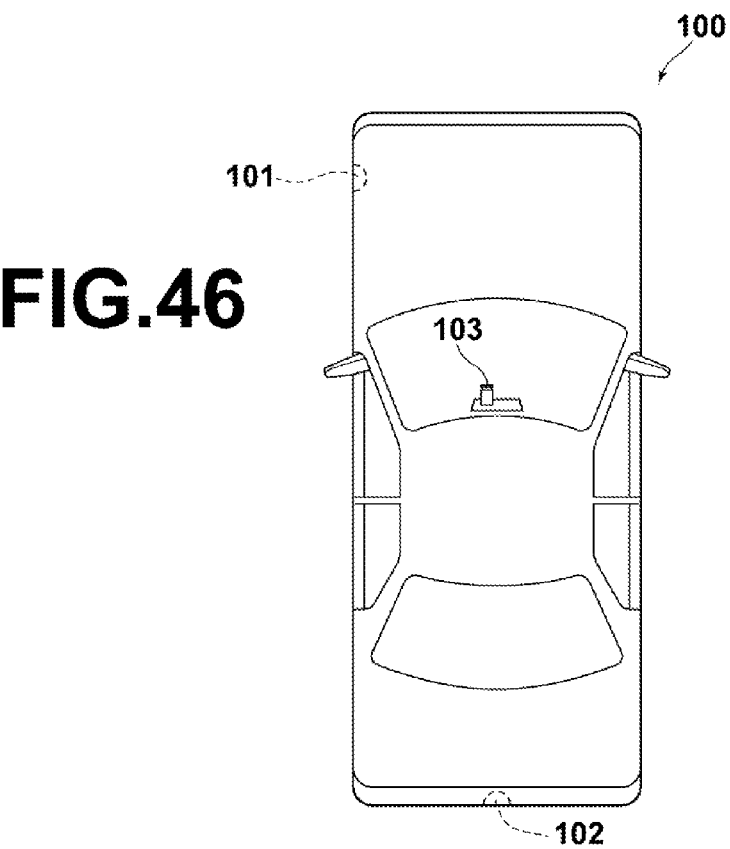
FIG. 46 illustrates an arrangement of vehicle imaging apparatuses according to an embodiment of the present invention.

FIG. 46 illustrates, as a usage example, a car 100 equipped with imaging apparatuses having imaging lenses of the present embodiment. In FIG. 46, the car 100 includes an out-vehicle camera 101 for imaging the dead area of the lateral side on the passenger side, an out-vehicle camera 102 for imaging the dead area on the rear side, and an in-vehicle camera 103, attached to the rear side of the rearview mirror, for imaging the same visual field range as that of the driver. Each of the out-vehicle cameras 101 and 102, and the in-vehicle camera 103 is an imaging apparatus according the present embodiment and includes an imaging lens according to an embodiment of the present invention and an image sensor that converts an optical image formed by the imaging lens to an electrical signal.

As the imaging lens according to an embodiment of the present invention has aforementioned advantages, the out-vehicle cameras 101 and 102, and the in-vehicle camera 103 may be made compact and inexpensive, yet having a wide angle and being capable of obtaining a good image, without impairing the appearance of the car.

Note that an image obtained by an imaging apparatus equipped with an imaging lens according to an embodiment of the present invention may be displayed on a cell phone. For example, there may be a case in which an imaging apparatus equipped with an imaging lens according to an embodiment of the present invention is installed on a car as a vehicle camera, then the rear side or around the car is imaged by the vehicle camera, and an image obtained by the imaging is displayed on a display device. In such a case, if the car is equipped with a car navigation system (hereinafter, "car-navigation"), the image obtained by the imaging may be displayed on the display device of the car-navigation, while if the car is not equipped with a car-navigation, a dedicated display device, for example, a liquid crystal display needs to be installed in the car. But, the display device is expensive. In the meantime, recent cell phones are equipped with high performance display devices capable of displaying motion pictures, browsing the Web, and the like. The use of a cell phone as the display device of a vehicle camera may eliminate the need to install a dedicated display device for a car without a car-navigation, thereby allowing the vehicle camera to be installed inexpensively.

Here, the image obtained by the vehicle camera may be transmitted to the cell phone by wire using a cable or the like, or by wireless such as infrared communication or the like. Further, an arrangement may be adopted in which an image of the vehicle camera may be displayed automatically on the display device of the cell phone when, for example, the gear of the car is shifted to the rear position or a turn signal is given by associating the cell phone with the operation state of the car.

As for the display device for displaying an image of the vehicle camera, not only the cell phone but also a handheld terminal, such as a PDA, a tablet terminal, a small personal computer, or a small portable car-navigation may be used.

Further, a cell phone (including a smartphone) equipped with an imaging lens of the present invention may be fixed to a car and used as a vehicle camera. As recent smartphones have processing powers comparable to those of personal computers, a camera of a cell phone may be used in the same manner as a vehicle camera by fixing the cell phone, for example, to a dashboard of a car and orienting the camera to the front side. As an application of the smartphone, a function that recognizes a white line or a road sign and issues a warning may be provided. Further, the smartphone may be used as a warning system in which the camera is directed to the driver and a warning is issued when the driver is drowsy or inattentive. Still further, the smartphone may be associated with a car and used as a part of the wheel steering system of the car. As a car is exposed to high and low temperature environments, a vehicle camera is required to have strict environment resistance. In a case in which an imaging lens of the present invention is installed in a cell phone, the cell phone is brought outside the car with the driver other than during the driving, so that the environment resistance of the imaging lens may be relaxed, whereby a vehicle-installed system may be introduced inexpensively.

So far, the present invention has been described by way of embodiments and Examples, but it should be understood that the present invention is not limited to the embodiments and Examples described above, and various changes and modifications may be made. For example, values of radius of curvature, surface distance, refractive index, Abbe number, and aspherical surface coefficient of each lens are not limited to those shown in each Numerical Example and may take other values.

Note that all of the lenses in the Examples described above are formed of a uniform material, but a gradient index lens may be used. Further, some of the Examples described above include an aspherical refractive lens, but a diffractive optical element may be formed on one or more surfaces.

In the embodiment of the imaging apparatus, the description has been made of a case in which the present invention is applied to a vehicle camera by illustrating a drawing thereof, but the present invention is not limited to such application and may also be applied, for example, to cameras of portable terminals, surveillance cameras, and the like.

The invention claimed is:

1. An imaging lens, substantially consisting of six lenses, composed of a first lens having a negative refractive power, a second lens having a positive refractive power, a third lens having a negative refractive power, a fourth lens having a positive refractive power, a fifth lens having a positive refractive power, and a sixth lens having a negative refractive power, disposed in order from the object side, wherein the imaging lens satisfies conditional expressions given below:

$$1.0 < (Db12 + D3)/f \quad (1)$$

$$f2/f < 1.68 \quad (2)$$

$$1.1 < (R1f + R1r)/(R1f - R1r) < 2.2 \quad (3\text{-}3)$$

where
Db12: air space on the optical axis between the first lens and the second lens,
D3: center thickness of the second lens,
f2: focal length of the second lens,
f: focal length of the entire system,
R1f: paraxial radius of curvature of the object side surface of the first lens, and
R1r: paraxial radius of curvature of the image side surface of the first lens.

2. The imaging lens as claimed in claim 1, wherein the imaging lens satisfies a conditional expression given below:

$$0.2 < (D3 + Db23)/f < 3.0 \quad (16)$$

where
D3: center thickness of the second lens,
Db23: air space on the optical axis between the second lens and the third lens, and
f: focal length of the entire system.

3. The imaging lens as claimed in claim 1, wherein the imaging lens satisfies a conditional expression given below:

$$-3.0 < f1/f2 < -0.2 \quad (17)$$

where
f1: focal length of the first lens, and
f2: focal length of the second lens.

4. An imaging apparatus, comprising the imaging lens as claimed in claim 1.

5. The imaging lens as claimed in claim 1, wherein the imaging lens satisfies a conditional expression given below:

$$0.0 < R1f/f \quad (13)$$

where
R1f: paraxial radius of curvature of the object side surface of the first lens, and
f: focal length of the entire system.

6. The imaging lens as claimed in claim 1, wherein the imaging lens satisfies a conditional expression given below:

$$-3.0 < f1/f < -0.5 \quad (14)$$

where
f1: focal length of the first lens, and
f: focal length of the entire system.

7. The imaging lens as claimed in claim 1, wherein the imaging lens satisfies a conditional expression given below:

$$-0.15 < (R2f + R2r)/(R2f - R2r) \quad (10)$$

where
- R2f: paraxial radius of curvature of the object side surface of the second lens, and
- R2r: paraxial radius of curvature of the image side surface of the second lens.

8. The imaging lens as claimed in claim 1, wherein the imaging lens satisfies a conditional expression given below:

$$1.1<(R1f+R1r)/(R1f-R1r)<2.0 \qquad (3\text{-}4)$$

where
- R1f: paraxial radius of curvature of the object side surface of the first lens, and
- R1r: paraxial radius of curvature of the image side surface of the first lens.

9. The imaging lens as claimed in claim 1, wherein the imaging lens satisfies a conditional expression given below:

$$f12/f<2.5 \qquad (8)$$

where
- f12: combined focal length of the first lens and the second lens, and
- f: focal length of the entire system.

10. The imaging lens as claimed in claim 1, wherein the imaging lens satisfies a conditional expression given below:

$$0.0<f4/f<2.45 \qquad (5)$$

where
- f4: focal length of the fourth lens, and
- f: focal length of the entire system.

11. The imaging lens as claimed in claim 1, wherein the imaging lens satisfies a conditional expression given below:

$$0.1<f12/f3456<2.0 \qquad (15)$$

where
- f12: combined focal length of the first lens and the second lens, and
- f3456: combined focal length of the third lens to the sixth lens.

12. The imaging lens as claimed in claim 1, wherein the imaging lens satisfies a conditional expression given below:

$$-2.5<(R5f+R5r)/(R5f-R5r)<-0.25 \qquad (11)$$

wherein
- R5f: paraxial radius of curvature of the object side surface of the fifth lens, and
- R5r: paraxial radius of curvature of the image side surface of the fifth lens.

13. The imaging lens as claimed in claim 1, wherein the imaging lens satisfies a conditional expression given below:

$$f2/f<1.68 \qquad (2)$$

where
- f2: focal length of the second lens, and
- f: focal length of the entire system.

14. An imaging lens, substantially consisting of six lenses, composed of a first lens having a negative refractive power, a second lens having a positive refractive power, a third lens having a negative refractive power, a fourth lens having a positive refractive power, a fifth lens having a positive refractive power, and a sixth lens having a negative refractive power, disposed in order from the object side, wherein the imaging lens satisfies conditional expressions given below:

$$1.1<(R1f+R1r)/(R1f-R1r)<2.0 \qquad (3\text{-}4)$$

$$1.6<f3456/f \qquad (4)$$

$$0.0<f4/f<2.45 \qquad (5)$$

$$vd6<30 \qquad (6)$$

where
- R1f: paraxial radius of curvature of the object side surface of the first lens,
- R1r: paraxial radius of curvature of the image side surface of the first lens,
- f4: focal length of the fourth lens,
- f3456: combined focal length of the third lens to the sixth lens,
- f: focal length of the entire system, and
- vd6: Abbe number of the material of the sixth lens with respect to the d-line.

15. An imaging apparatus, comprising the imaging lens as claimed in claim 14.

16. An imaging lens, substantially consisting of six lenses, composed of a first lens having a negative refractive power, a second lens having a positive refractive power, a third lens having a negative refractive power, a fourth lens having a positive refractive power, a fifth lens having a positive refractive power, and a sixth lens having a negative refractive power, disposed in order from the object side, wherein the imaging lens satisfies conditional expressions given below:

$$0.38<Db12/f \qquad (7)$$

$$f12/f<2.5 \qquad (8)$$

$$f5/f<5.0 \qquad (9)$$

$$vd6<30 \qquad (6)$$

$$vd3<30 \qquad (18)$$

where
- Db12: air space on the optical axis between the first lens and the second lens,
- f: focal length of the entire system,
- f5: focal length of the fifth lens,
- f12: combined focal length of the first lens and the second lens,
- vd6: Abbe number of the material of the sixth lens with respect to the d-line, and
- vd3: Abbe number of the material of the third lens with respect to the d-line.

17. An imaging apparatus, comprising the imaging lens as claimed in claim 16.

18. An imaging lens, substantially consisting of six lenses, composed of a first lens having a negative refractive power, a second lens having a positive refractive power, a third lens having a negative refractive power, a fourth lens having a positive refractive power, a fifth lens having a positive refractive power, and a sixth lens having a negative refractive power, disposed in order from the object side, wherein the imaging lens satisfies conditional expressions given below:

$$-0.15<(R2f+R2r)/(R2f-R2r) \qquad (10)$$

$$-2.5<(R5f+R5r)/(R5f-R5r)<-0.25 \qquad (11)$$

$$-4.0<(R6f+R6r)/(R6f-R6r) \qquad (12)$$

where
- R2f: paraxial radius of curvature of the object side surface of the second lens,
- R2r: paraxial radius of curvature of the image side surface of the second lens,
- R5f: paraxial radius of curvature of the object side surface of the fifth lens,
- R5r: paraxial radius of curvature of the image side surface of the fifth lens, R6f: paraxial radius of curvature of the object side surface of the sixth lens, and R6r: paraxial radius of curvature of the image side surface of the sixth lens.

19. An imaging apparatus, comprising the imaging lens as claimed in claim 18.

\* \* \* \* \*